United States Patent
Ozaki et al.

(10) Patent No.: US 9,557,536 B2
(45) Date of Patent: Jan. 31, 2017

(54) ZOOM LENS AND IMAGE PICKUP DEVICE

(71) Applicant: KONICA MINOLTA, INC., Chiyoda-ku (JP)

(72) Inventors: Yuichi Ozaki, Hino (JP); Atsushi Yamashita, Sagamihara (JP)

(73) Assignee: Konica Minolta, Inc., Tokyo (JP)

( * ) Notice: Subject to any disclaimer, the term of this patent is extended or adjusted under 35 U.S.C. 154(b) by 168 days.

(21) Appl. No.: 14/517,503

(22) Filed: Oct. 17, 2014

(65) Prior Publication Data

US 2015/0109485 A1  Apr. 23, 2015

(30) Foreign Application Priority Data

Oct. 18, 2013 (JP) ................. 2013-217921

(51) Int. Cl.
  *G02B 15/14* (2006.01)
  *G02B 13/00* (2006.01)
  *G02B 15/177* (2006.01)
  *G02B 27/64* (2006.01)

(52) U.S. Cl.
  CPC ......... *G02B 13/0065* (2013.01); *G02B 13/009* (2013.01); *G02B 15/177* (2013.01); *G02B 27/646* (2013.01)

(58) Field of Classification Search
  CPC . G02B 13/0065; G02B 13/009; G02B 15/177; G02B 17/08; G02B 17/0896
  USPC ................. 359/676–706, 745–795, 819–830
  See application file for complete search history.

(56) References Cited

U.S. PATENT DOCUMENTS

| | | | | |
|---|---|---|---|---|
| 7,952,818 B1* | 5/2011 | Huang | ................. | G02B 13/004 359/715 |
| 2009/0073572 A1* | 3/2009 | Atsuumi | .............. | G02B 15/173 359/672 |
| 2009/0225438 A1* | 9/2009 | Kubota | ................ | G02B 15/177 359/694 |

FOREIGN PATENT DOCUMENTS

| | | |
|---|---|---|
| JP | 2007-093955 | 4/2007 |
| JP | 2007-156078 | 6/2007 |
| JP | 2008-096787 | 4/2008 |
| JP | 2009-216941 | 9/2009 |

* cited by examiner

*Primary Examiner* — Mahidere Sahle
(74) *Attorney, Agent, or Firm* — Cozen O'Connor

(57) ABSTRACT

A first lens group includes a plano-concave and negative first lens, a catoptric element having a flat object side surface and a flat image side surface, and a first cemented lens, for example. Here, the first cemented lens includes a negative second lens and a positive third lens in order from an object side. A second lens group includes an aperture stop and a positive second cemented lens, for example. The second cemented lens includes a positive fourth lens, a negative fifth lens, and a positive sixth lens in order from the object side. A zoom lens satisfies a conditional expression $1.59 < n21 < 2.20$, assuming that a value $n21$ indicates refractive index of the fourth lens on a side closest to an object in the second lens group.

23 Claims, 23 Drawing Sheets

ZOOM LENS AND IMAGE PICKUP DEVICE

This application claims a priority under the Paris Convention of Japanese patent application No. 2013-217921 filed on Oct. 18, 2013, the entirety of which is incorporated herein by references.

TECHNICAL FIELD

The present invention relates to a zoom lens composed of a plurality of lens groups and performing magnification change by changing intervals between the lens groups in an optical direction and an image pickup device provided with the zoom lens.

BACKGROUND ART

With recent performance improvement and size reduction of an image pickup device using a solid-state imaging element such as a CCD (Charge Coupled Device) type image sensor or a CMOS (Complementary Metal Oxide Semiconductor) type image sensor and the like, a mobile phone and a portable information terminal provided with an image pickup device has begun to spread in recent years. Since restriction on size and cost is extremely strict in these devices, an image pickup device provided with a small-sized solid-state imaging element with the number of pixels smaller than that of a normal digital still camera and the like, and a single focus optical system composed of 1 to 4 plastic lenses is generally used. In rapid progress of higher pixelation and higher functions of the image pickup device mounted on the portable information terminal and the like, a small-sized zoom lens not only capable of handling a high-pixel image pickup element and of picking up an image of an object apart from a photographer but also capable of photographing even if a distance from the object cannot be set away as in indoor photographing and of being mountable on a mobile phone and the like is in demand.

In order to mount a zoom lens on a mobile phone or a portable information terminal, reduction in size or particularly in a thickness direction is in demand. As a zoom lens of this thin type, a bending optical system in which an optical axis is bent by 90 degrees by using a catoptric element such as a prism and the like is used in many cases. Specifically, a variable-magnification optical system with the purpose of size reduction in a thickness direction by using the catoptric element in a first lens group is disclosed in the following Patent Literatures 1 to 4.

In general, a variable-magnification optical system having the first lens group having a negative refractive power and a second lens group having a positive refractive power as in Patent Literatures 1 to 4 is advantageous in points that the thickness of the first lens group can be made small, that the number of constituting lenses can be made small, and that F-number of a wide-angle end can be made bright or fast, but since the first lens group has a negative refractive power, an effective diameter of the second lens group tends to become larger, and there is a problem that an increase in the effective diameter in a bending optical system portion directly leads to an increase of the thickness. Particularly, the second lens group is often accompanied with an aperture stop and is a spot where an axial ray passes thickly, and thus, a thinning method used in the bending optical system portion in many cases in which a lens shape obtained by cutting an area not in use or a so-called oval shape is used instead of a circular shape symmetrical to the optical axis cannot be employed.

Moreover, since the second lens group has a large light beam diameter passing through the lens and moves for a long distance during magnification change from the wide-angle end to a telephoto end, decentration error sensitivity of the second lens group needs to be made as small as possible. Thus, when the second lens group is composed of a plurality of lens elements as in Patent Literatures 1 and 2, axial coma aberration or asymmetrical blur in an image area called one-side blur generated in the second lens group is reduced in many cases by centering a partial lens or lenses in the second lens group. However, since the centering is an action for reducing axial coma aberration or one-side blur by decentering the lens with respect to the optical axis, a space needs to be ensured for centering in the second lens group, and there is a problem of size increase of the second lens group and hence thickening of a variable-magnification optical system.

On the other hand, in Patent Literatures 3 and 4, by constituting the second lens group by one lens element, the total thickness of the lens is reduced, and optical adjustment such as centering is no longer necessary, and thus, the effective diameter of the second lens group can be made small. However, in the variable-magnification optical system in Patent Literature 3, since the second lens group is constituted by one cemented lens of a lens having a positive refractive power and a lens having a negative refractive power, an aberration correcting capacity is low, and as a result, F-number becomes dark or slow. Moreover, in Patent Literature 4, the second lens group is constituted by a cemented lens of a lens having a positive refractive power, a lens having a negative refractive power, and a lens having a positive refractive power in order from the object side, but since freedom of a lens surface is made small due to the cementing, a burden on an optical surface in contact with air becomes large, and the decentration error sensitivity of the surface becomes extremely high.

CITATION LIST

Patent Literature

[Patent Literature 1] Japanese Patent Laid-Open No. 2008-96787
[Patent Literature 2] Japanese Patent Laid-Open No. 2007-156078
[Patent Literature 3] Japanese Patent Laid-Open No. 2007-93955
[Patent Literature 4] Japanese Patent Laid-Open No. 2009-216941

SUMMARY OF INVENTION

The present invention was made in view of these problems and has an object to provide a zoom lens which achieves size reduction particularly in a thickness direction and has various aberrations favorably corrected, and an image pickup device using such zoom lens.

In order to achieve the above-described object, a zoom lens according to the present invention is a zoom lens including at least a first lens group having a negative refractive power and a second lens group having a positive refractive power in order from an object side and performing magnification change by changing an interval between each of the lens groups, in which the interval between the first lens group and the second lens group is reduced during magnification change from a wide-angle end to a telephoto end, the first lens group includes a catoptric element or reflecting optical element having a function of bending an optical path by reflecting a light ray, the second lens group is composed of a cemented lens in which three lenses are cemented, and the following condition is satisfied:

$$1.59 < n21 < 2.20 \qquad (1)$$

where n21: refractive index of a lens on a side closest to an object in the second lens group The zoom lens according to the present invention is provided, as a configuration for obtaining a zoom lens which is small-sized and has aberration favorably corrected, with the first lens group having a negative refractive power and having a catoptric element having a function of bending an optical path by reflecting a light ray and the second lens group having a positive refractive power in order from the object side. By employing a negative configuration for the first lens group, the light ray incident by a large angle from the object side can be alleviated as soon as possible, which is advantageous in suppressing an optical use range of the first lens group.

Moreover, by providing the catoptric element in the first lens group, a size of an image pickup device in a depth direction can be reduced.

Moreover, by using three lenses for the second lens group, each aberration can be suppressed more effectively than a single-lens configuration or a two-lens configuration. However, if many lenses are used in the second lens group, a total thickness of the second lens group becomes large, and a peripheral ray tends to pass outer side in many cases. Moreover, the second lens group has a large light beam diameter passing through the lens and moves for a long distance during magnification change from the wide-angle end to the telephoto end, and thus, decentration error sensitivity of the second lens group needs to be made as small as possible. Thus, if the second lens group is composed of a plurality of lenses, the axial coma aberration or asymmetric blur in an image area called one-side blur generated in the second lens group is preferably reduced by centering a part of lenses in the second lens group. However, centering or alignment is an action for reducing the axial coma aberration or the one-side blur by decentering the lens with respect to the optical axis, and thus, a space needs to be ensured for centering in the second lens group. From these reasons, there is a problem that, if many lenses are used for the second lens group, the second lens group increases in size and hence the variable-magnification optical system is thickened.

Thus, by cementing three lenses constituting the second lens group so as to have a single cemented lens, the total thickness of the group is reduced, and the lenses can be assembled with much higher accuracy than assembling the individual lenses by using a lens frame. As a result, optical adjustment such as centering or the like is no longer necessary and the effective diameter of the second lens group is made small, while three lenses are used for the second lens group, efficient correction of various aberrations and thinning of the image pickup device can be both realized.

The conditional expression (1) specifies a refractive index of a lens on the side closest to the object of the second lens group. By constituting the second lens group by cementing three lenses, an effect of thinning can be obtained, but surface freedom is lost, and refractive powers of the cemented surfaces are lowered, and thus, strong refractive power is needed on the surface in contact with air. However, if curvature of the surface is made large, an incident angle of the light ray becomes large, and aberration occurs. Particularly, on the surface on the side closest to the object in the second lens group, since diffusion light enters from the first lens group having a negative refractive power, if the passing light beam diameter is large and the curvature of the surface is large, decentration error sensitivity becomes large. On the other hand, by exceeding the lower limit of the conditional expression (1), the refractive power can be made larger while the curvature of the surface is suppressed, and thus, occurrence of various aberrations or a rise of the decentration error sensitivity can be suppressed. On the other hand, by falling under the upper limit of the conditional expression (1), the lens can be made of an easily obtainable glass material.

In a specific aspect of the present invention, the above-described zoom lens satisfies the following condition:

$$0.6 < d2g/fW < 1.6 \qquad (2)$$

where d2g: axial thickness of a cemented lens of the second lens group fW: focal length of the entire system at a wide-angle end The conditional expression (2) specifies a ratio between an axial thickness of the cemented lens of the second lens group and a focal length of the entire system at a wide-angle end. By falling under the upper limit of the conditional expression (2), the total thickness of the second lens group can be suppressed, and an optical path length of the light ray in the periphery of passage through the second lens group is reduced, and thus, the effective diameter of the second lens group can be reduced, and thinning of the image pickup device can be realized. On the other hand, by exceeding the lower limit of the conditional expression (2), excessive thinning of each of the lenses constituting the second lens group can be prevented, and machining is facilitated.

In another aspect of the present invention, the second lens group is constituted by two lenses each having a positive refractive power and one lens having a negative refractive power.

Since the second lens group has a positive refractive power, by using two lenses each having a positive refractive power, various aberrations such as spherical aberration, field curvature, chromatic aberration and the like generated in the second lens group can be effectively corrected by adding a lens having a negative refractive power while a positive refractive power is shared.

In still another aspect of the present invention, the second lens group has an aperture stop on the side closest to the object.

By arranging the aperture stop between the first lens group and the second lens group, the effective diameters of the first lens group and the second lens group can be made small, whereby thinning can be realized. Moreover, if the aperture stop is arranged on the side closest to the object of the second lens group and moved integrally with the second lens group during magnification change, for example, the number of actuators can be kept lower than that in a case where the aperture stop is moved independently, and the aperture stop is arranged relatively closer to the first lens group and can suppress a difference in the F-number between the wide-angle end and the telephoto end.

In still another aspect of the present invention, the second lens group is constituted by a lens having a positive refractive power, a lens having a negative refractive power, and a lens having a positive refractive power in order from the object side.

By constituting the second lens group by the positive lens, the negative lens, and the positive lens in order from the object side, it becomes so-called triplet arrangement, whereby each of the aberrations can be effectively corrected, and since the lenses having the refractive power with the same sign are not arranged continuously, constitution of a cemented lens including three lenses can be facilitated while the refractive power of each lens is ensured.

In still another aspect of the present invention, the following condition is satisfied:

$$0.1 < n2p1 - n2n < 0.3 \quad (3)$$

where
n2p1: refractive index of a lens having a positive refractive power on the object side in the second lens group
n2n: refractive index of a lens having a negative refractive power of the second lens group The conditional expression (3) specifies a difference in refractive index between a lens having a positive refractive power on the object side and a lens having a negative refractive power of the second lens group. Since the second lens group has a positive refractive power, by exceeding the lower limit of the conditional expression (3), a Petzval sum becomes small by combining a positive lens with high refractive index and a negative lens with low refractive index, and occurrence of field curvature can be suppressed. On the other hand, by falling under the upper limit of the conditional expression (3), the second lens group can be made of an easily obtainable glass material.

In still another aspect of the present invention, the following condition is satisfied:

$$25 < v2p2 - v2n < 50 \quad (4)$$

where
v2p2: Abbe number of a lens having a positive refractive power on an image side in the second lens group
v2n: Abbe number of a lens having a negative refractive power in the second lens group The conditional expression (4) specifies a difference in Abbe number between the lens having a positive refractive power on an image side and the lens having a negative refractive power of the second lens group. By exceeding the lower limit of the conditional expression (4), a negative lens with large distribution and a positive lens with small distribution are combined, whereby chromatic aberration can be effectively corrected. On the other hand, by falling under the upper limit of the conditional expression (4), the second lens group can be made of an easily available glass material.

In still another aspect of the present invention, a negative lens having a negative refractive power on the object side of the catoptric element is provided and the negative lens is moved in a direction perpendicular to the optical axis so as to correct motion blur of image formation on an image plane.

By arranging a lens having a negative refractive power on the object side of the catoptric element, a wide angle of view can be ensured at the wide-angle end while the effective diameter of the first lens group is suppressed. Moreover, when a lens on a side closer to an image than the catoptric element is moved in the direction perpendicular to the optical axis so as to correct camera shake, a shift space for camera shake correction is needed, which results in thickening of the image pickup device, but by using the lens on the object side of the catoptric element for camera-shake correction, the camera-shake correction can be performed while thickening of the image pickup device is prevented.

In still another aspect of the present invention, the following condition is satisfied:

$$0.45 < d11/fW < 1.10 \quad (5)$$

where
d11: distance from a vertex of a surface on a side closest to an object in the first lens group to an intersection between a reflective surface of the catoptric element and the optical axis
fW: focal length of the entire system at the wide-angle end The conditional expression (5) specifies a ratio of a distance from a vertex of the surface on the side closest to the object of the first lens group to an intersection between a reflective surface of the catoptric element and the optical axis to a focal length of the entire system at the wide-angle end. By falling under the upper limit of the conditional expression (5), a thickness in the vicinity of the catoptric element which determines the thickness of the image pickup device in many cases can be thinned, whereby the image pickup device can be thinned. On the other hand, by exceeding the lower limit of the conditional expression (5), in excessive thinning of the catoptric element, a rapid drop in a peripheral light amount caused by cutting of a peripheral pencil of light for maintaining feasibility of optical path bending can be prevented.

Moreover, it is more preferable that the following conditional expression (5)' is satisfied:

$$0.55 < d11/fW < 1.05 \quad (5)'$$

In still another aspect of the present invention, the following condition is satisfied:

$$1.60 < nprm < 2.20 \quad (6)$$

where
nprm: refractive index of the catoptric element

The conditional expression (6) specifies the refractive index of the catoptric element. By exceeding the lower limit of the conditional expression (6), a refractive angle of the pencil of light incident to the catoptric element becomes small and tends to pass a position closer to the optical axis, and thus, the effective diameter of the first lens group becomes small, which is advantageous in size reduction. On the other hand, by falling under the upper limit of the conditional expression (6), constitution with an easily available glass material is made possible.

In still another aspect of the present invention, the first lens group has a cemented lens composed of a lens having a negative refractive power and a lens having a positive refractive power on the image side of the catoptric element.

By arranging the lens having the negative refractive power on the image side of the catoptric element, the light ray emitted from the catoptric element can be alleviated as soon as possible, whereby an optical use range of the first lens group can be suppressed while occurrence of aberration is suppressed. Moreover, by arranging the lens having the positive refractive power on the image side of the lens having the negative refractive power, chromatic aberration of magnification at the wide-angle end and axial chromatic aberration at the telephoto end can be effectively corrected. An air interval between the lens having the negative refractive power and the lens having the positive refractive power can be extremely small, and an optical performance can be easily influenced by a manufacturing error of the lens, and thus, cementing is preferable.

In still another aspect of the present invention, the following condition is satisfied:

$$15 < v1n - v1p < 65 \quad (7)$$

where
v1n: Abbe number of a lens having a negative refractive power in the cemented lens of the first lens group
v1p: Abbe number of a lens having a positive refractive power in the cemented lens of the first lens group The conditional expression (7) specifies a difference in the Abbe numbers of the cemented lens of the first lens group. By exceeding the lower limit of the conditional expression (7), a negative lens with small distribution and a positive lens with large distribution are combined, and the entire first lens group has the negative refractive power, and thus, chromatic aberration can be efficiently corrected by this combination. On the other hand, by falling under the upper limit of the conditional expression (7), constitution with the easily available glass material becomes possible.

In still another aspect of the present invention, the zoom lens is composed of the first lens group having a negative refractive power, the second lens group having a positive refractive power, a third lens group having a negative refractive power, and a fourth lens group having a positive refractive power in order from the object side.

By arranging the negative third lens group and the positive fourth lens group on the image side of the second lens group, the third lens group has the negative refractive power, and power arrangement of the composite positive refractive power of the first and second lens groups and the negative refractive power of the third lens becomes "positive-negative" which is a telephoto arrangement. Therefore, the zoom lens can suppress the optical entire length while ensuring a relatively long focal length. Moreover, since the fourth lens group has the positive refractive power, a principal ray incident angle (angle formed by a principal ray and the optical axis) of a pencil of light forming an image in a peripheral portion on the image pickup surface of the image pickup element can be kept small, and a so-called telecentric characteristic can be ensured.

In still another aspect of the present invention, the zoom lens has at least the first lens group having a negative refractive power, the second lens group having a positive refractive power, and the third lens group having a positive refractive power in order from the object side.

By having the third lens group having the positive refractive power on the image side of the second lens group, magnification change burden of the lens groups having the positive refractive power during magnification change is shared by the second lens group and the third lens group, and thus, a movement amount during magnification change of the second lens group can be suppressed, whereby the optical entire length can be suppressed.

In still another aspect of the present invention, the zoom lens performs focusing by moving the third lens group.

By performing focusing by the third lens group, a clear image can be obtained even from a short-distance object without incurring an increase in an optical entire length caused by feeding-out or an increase in a front lens diameter.

In still another aspect of the present invention, the third lens group is a single lens.

By constituting the third lens group by a single lens, an increase in size of the entire third lens group can be suppressed, whereby a space of magnification change can be ensured, and a cost can be further suppressed. Moreover, since the weight of the entire third lens group can be reduced, a load of an actuator during magnification change can be suppressed.

In still another aspect of the present invention, the single lens of the third lens group satisfies the following condition:

$$50 < v3 < 95 \quad (8)$$

where $v3$: Abbe number of a single lens of the third lens group

The conditional expression (8) specifies the Abbe number of the single lens of the third lens group. When the third lens group is constituted by a single lens, if a material with large chromatic dispersion is used, chromatic aberration occurs in the third lens group. On the other hand, by exceeding the lower limit of the conditional expression (8), a material with sufficiently small chromatic dispersion can be selected, and chromatic aberration occurring in the third lens group can be kept small. On the other hand, by falling under the upper limit of the conditional expression (8), constitution by an easily available material is made possible.

In still another aspect of the present invention, the third lens group is made of plastic and has at least one aspherical surface.

Since the second lens group has a positive refractive power, a light ray height passing through the third lens group is relatively small, and the third lens group can have a lens with a relatively small outer diameter. Therefore, as compared with a glass lens manufactured with cumbersome polishing, by constituting the third lens group by a plastic lens manufactured by injection molding, inexpensive mass production is made possible. Moreover, since the injection molding is capable of easy manufacture of an aspherical lens, each of the aberrations can be effectively corrected by the aspherical lens. Furthermore, since the plastic lens can have a low press temperature, wear of a mold can be suppressed, and as a result, the numbers of replacements and maintenance services of the mold can be decreased, and cost reduction can be realized.

In still another aspect of the present invention, the fourth lens group does not move in the optical axis direction both during magnification change and focusing.

The fourth lens group is a lens group which is the closest to the image pickup element, and if the fourth lens group moves during magnification change and focusing, a distance to the image pickup element becomes short, and even a final lens becomes susceptible to foreign substances and scratches. Particularly in a small-sized zoom lens, a distance between the final lens and the image pickup element is brought closer, and thus, the tendency becomes remarkable. On the other hand, since the fourth lens group is not moved, the distance between the final lens and the image pickup element is fixed, and the influence of the foreign substances or scratches can be suppressed. Moreover, since the image pickup element is brought into a sealed state, entering of foreign substances such as dusts and the like into the image pickup element can be reliably prevented.

In still another aspect of the present invention, the fourth lens group is a single lens made of plastic and has at least one aspherical surface.

The fourth lens group is the lens group which is the closest to the image pickup element and has a light beam diameter passing through the lens smaller than those of the other lens groups. Thus, an influence of a change in the refractive power on the entirety is smaller than the other lens groups, and even if a single lens by plastic is used, an influence by a temperature change on the optical performance can be suppressed. Moreover, since the aspherical lens can be easily manufactured from a plastic lens by injection molding, each of the aberrations such as field curvature, distortion aberration and the like can be effectively corrected by the aspherical lens.

In still another aspect of the present invention, an optical element substantially not having a power is further provided.

The image pickup device according to the present invention is provided with the above-described zoom lens and the image pickup element for photoelectrically converting an image formed on an image pickup surface by the zoom lens. By using the zoom lens of the present invention, the image pickup device which achieves size reduction mainly in the thickness direction and favorably suppresses various aberrations can be obtained.

DESCRIPTION OF EMBODIMENT

Figure 1:
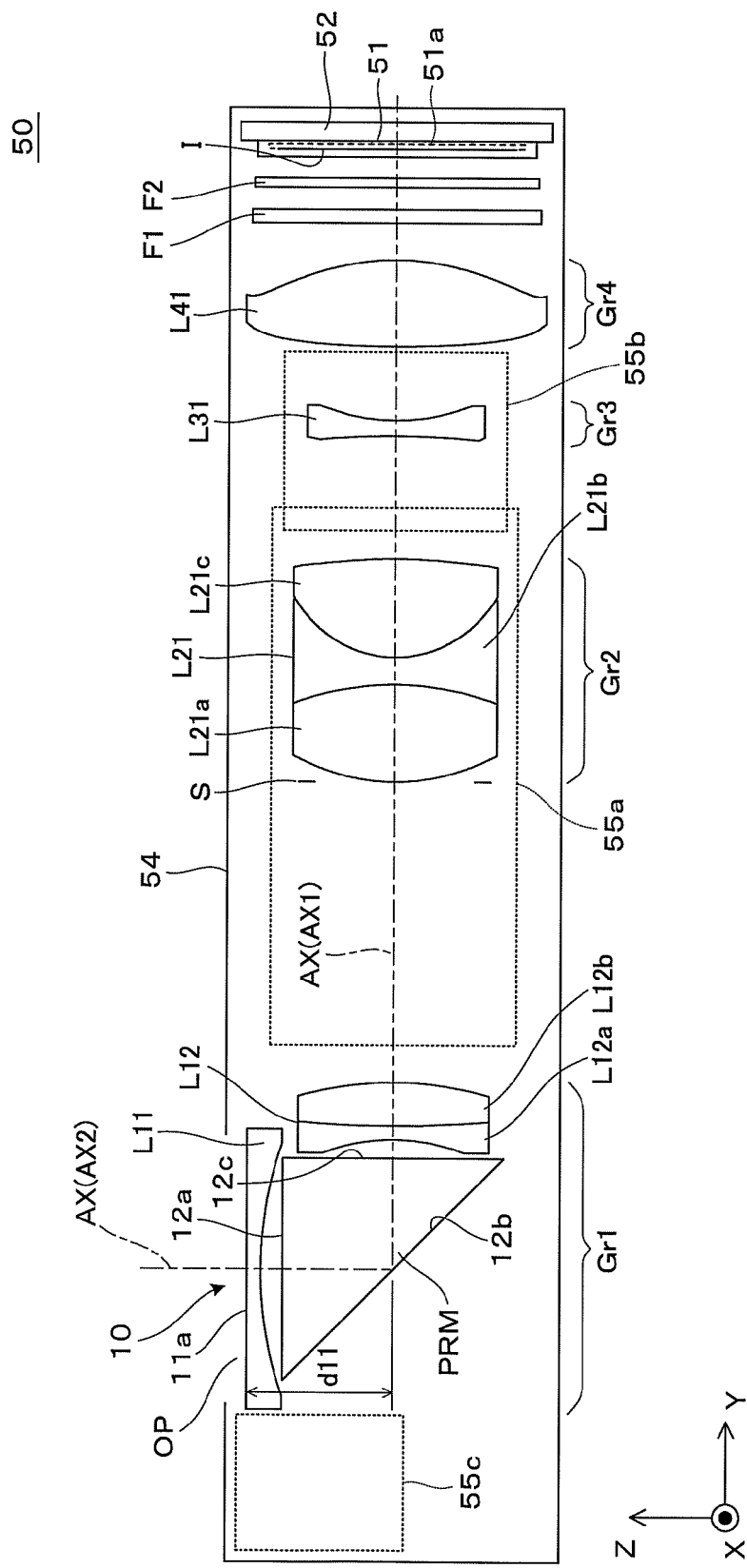
FIG. 1 is a diagram for illustrating an image pickup device or a module provided with a zoom lens of an embodiment according to the present invention.

FIG. 1 is a sectional view for illustrating a camera module as an image pickup device provided with a zoom lens of an embodiment according to the present invention.

The camera module (image pickup device) 50 includes a zoom lens 10 for forming an object image, an image pickup element 51 for photoelectrically converting the object image formed by the zoom lens 10, a wiring substrate 52 holding this image pickup element 51 from behind and having a wiring and the like, and a lens-barrel portion 54 holding the zoom lens 10 and the like and having an opening portion OP through which a light ray from an object side is made to enter the zoom lens 10. The zoom lens 10 has a function of forming an image of the object on an image pickup surface (or a projected surface) I of the image pickup element 51. This camera module 50 is used by being incorporated in a portable terminal, for example.

The zoom lens 10 includes a first lens group Gr1, a second lens group Gr2 (including an aperture stop S), a third lens group Gr3, and a fourth lens group Gr4 in order from the object side. Here, in the first lens group Gr1, a catoptric element (prism mirror) PRM having a triangular prism shape for bending an optical path by reflection is incorporated, and by reflecting a light ray toward the −Z direction by an inclined inner surface (or a reflective surface) 12b, the light ray is bent by 90° and directed toward the +Y direction. That is, an optical axis AX has an axis AX1 in parallel with the Y axis and an axis AX2 in parallel with the Z axis extending at a right angle by sandwiching the reflective surface 12b. The second lens group Gr2 is composed of one cemented lens, and the other lens groups Gr1, Gr3, and Gr4 may be made of a single or a plurality of lenses. In the first lens group Gr1, a negative first lens L11 is arranged by facing an object side 12a of the catoptric element PRM. In place of this first lens L11, the catoptric element PRM may have a concave surface for the object side 12a.

The zoom lens 10 exemplified in FIG. 1 has the same configuration as that of a zoom lens 11 in an example 1 which will be described later.

The image pickup element 51 is a sensor chip made of a solid-state imaging element. A photoelectric conversion portion 51a of the image pickup element 51 is composed of a CCD (Charge Coupled Device) or a CMOS (Complementary Metal Oxide Semiconductor), photoelectrically converts incident light to each of RGB pixels and outputs its analog signals. A surface of the photoelectric conversion portion 51a as a light receiving portion is the image pickup surface (projected surface) I.

The wiring substrate 52 has a role of aligning and fixing the image pickup element 51 through a support body with respect to the other members (the lens-barrel portion 54, for example). The wiring substrate 52 is capable of reception of supply of a voltage or a signal for driving the image pickup element 51 and first and second driving mechanisms 55a and 55b from an external circuit and output of a detection signal to the external circuit.

On the zoom lens 10 side of the image pickup element 51, a pair of parallel flat plates F1 and F2 is arranged and fixed so as to cover the image pickup element 51 and the like by a holder member, not shown. The parallel flat plates F1 and F2 are an IR cut filter, an optical low-pass filter, a seal glass of the image pickup element 51 and the like, for example.

The lens-barrel portion 54 accommodates and holds the zoom lens 10. The lens-barrel portion 54 has the first and second driving mechanisms 55a and 55b in order to enable operations of magnification change and focusing of the zoom lens 10 by moving the second and third lens groups Gr2 and Gr3 in the lens groups Gr1 to Gr4 constituting the zoom lens 10 along the optical axis AX. Moreover, the lens-barrel portion 54 has a third driving mechanism 55c in order to enable an operation of camera-shake correction of the zoom lens 10 by moving the first lens L11 on the object side in the lens group Gr1 in a direction perpendicular to the optical axis AX. The first and second driving mechanisms 55a and 55b are capable of independent operation, as the first driving mechanism 55a reciprocates and moves the second lens group Gr2 along the optical axis AX (axis AX1) while the other second driving mechanism 55b reciprocates and moves the third lens group Gr3 along the optical axis AX (axis AX1). The third driving mechanism 55c two-dimensionally and slightly moves the first lens L11 of the lens group Gr1 in the direction perpendicular to the optical axis AX (axis AX2). The first driving mechanism 55a includes a stepping motor, a tangent-screw type power transmission member, and a slide guide, for example. The second driving mechanism 55b includes a voice-coil motor and a guide, for example. The third driving mechanism 55c includes a voice-coil motor, a guide and the like.

The driving mechanism is not limited to the above, and the first driving mechanism 55a may be constituted by an actuator (see U.S. Pat. No. 5,589,723, for example) using a piezoelectric element instead of the stepping motor or a voice-coil motor and the like, and the second driving mechanism 55b may be similarly constituted by an actuator using the piezoelectric element or a stepping motor and the like instead of the voice-coil motor. The third driving mechanism 55c may use a piezo element or the like.

The zoom lens 10 will be explained below in detail. The zoom lens 10 in FIG. 1 is to form an image of the object on the image pickup surface I of the image pickup element 51 and is substantially composed of the first lens group Gr1 having a negative refractive power, the second lens group Gr2 having a positive refractive power, the third lens group Gr3 having a negative refractive power, and the fourth lens group Gr4 having a positive refractive power in order from the object side. Here, the first lens group Gr1 includes the plano-concave and negative first lens L11, the catoptric element PRM having the object side 12a and an image side 12c which are flat, and a cemented lens L12, for example. The cemented lens L12 includes a biconcave and negative second lens L12a and a biconvex and positive third lens L12b in order from the object side. The second lens group Gr2 includes the aperture stop S and a positive cemented lens L21. The cemented lens L21 includes a biconvex and positive fourth lens L21a, a biconcave and negative fifth lens L21b, and a biconvex and positive sixth lens L21c in order from the object side. The third lens group Gr3 includes a biconcave and negative seventh lens L31, for example, and the fourth lens group Gr4 includes a biconvex and positive eighth lens L41, for example. Optical surfaces on the object side and the image side of the cemented lens L21 may be an aspherical surface, for example. Moreover, the seventh lens L3 and the eighth lens L41 and the like may also have an aspherical surface.

The zoom lens 10 in FIG. 1 changes a position of the second lens group Gr2 and a position of the third lens group Gr3 in the first to fourth lens groups Gr1 to Gr4 during magnification change from a wide-angle end to a telephoto end. Specifically, during magnification change from the wide-angle end to the telephoto end, the first and fourth lens groups Gr1 and Gr4 are fixed with the image pickup surface I and the like as a reference and are not moved, while the second lens group Gr2 is moved to the object side, and the third lens group Gr3 is moved to the object side, for example.

In the above, it is assumed that the third lens group Gr3 has a negative refractive power, and the fourth lens group Gr4 has a positive refractive power, but the present invention is not limited to that, and the third lens group Gr3 may have a positive refractive power, and the fourth lens group Gr4 may have a negative refractive power.

In the above, the zoom lens 10 is composed of the first lens group Gr1, the second lens group Gr2, the third lens group Gr3, and the fourth lens group Gr4 in order from the object side, but the zoom lens 10 may be composed of the first lens group, the second lens group, and the third lens group in order from the object side. In this case, it is assumed that the first lens group has the negative refractive power and the second lens group has the positive refractive power, but the third lens group may have a positive or negative refractive power. This 3-group type zoom lens 10 changes the positions of the second and third lens groups during magnification change from the wide-angle end to the telephoto end. Specifically, during magnification change from the wide-angle end to the telephoto end, the first lens group is fixed with the image pickup surface I and the like as a reference and is not moved, the second lens group is moved to the object side, the third lens group is moved to the image side, for example, or it is moved to the object side once and then, moved to the image side.

Figure 2:
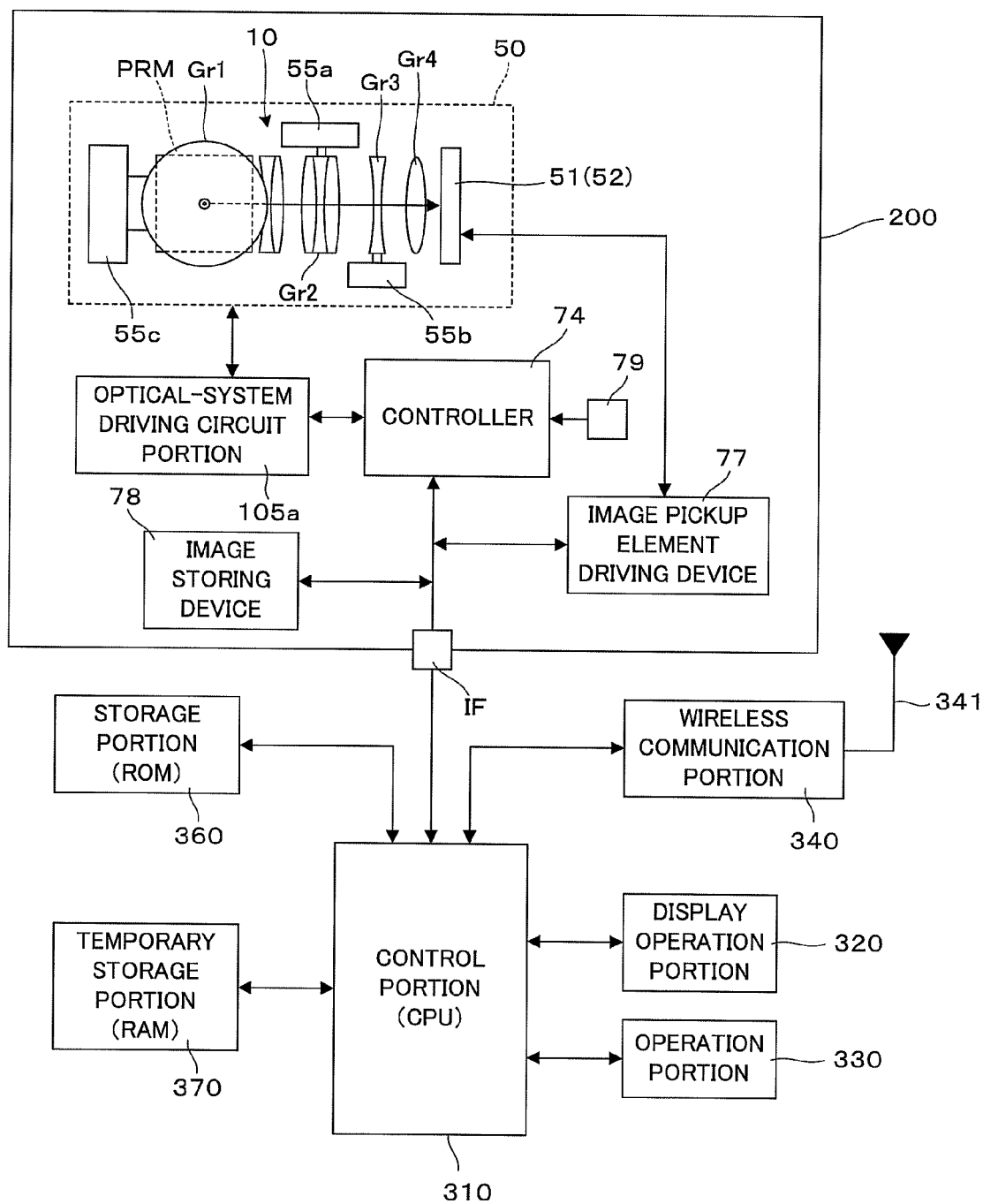
FIG. 2 is a block diagram for illustrating a portable communication terminal provided with the image pickup device in FIG. 1.
Figure 3A:
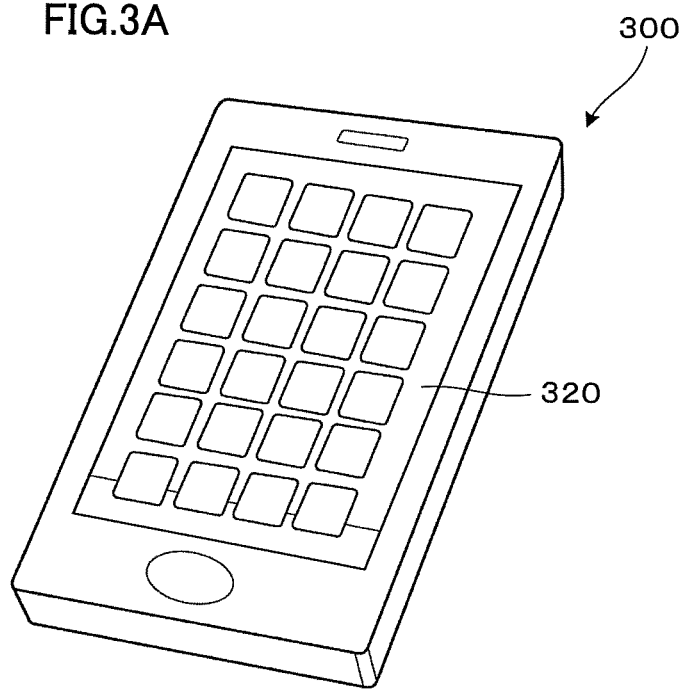
FIGS. 3A and 3B are perspective views on a front surface side and a back surface side of the portable communication terminal.
Figure 3B:
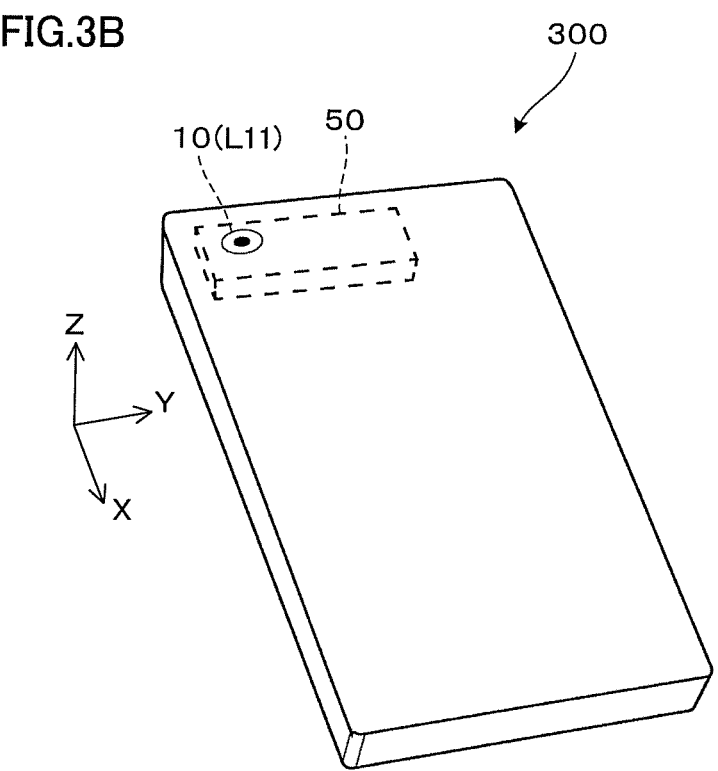

Subsequently, by referring to FIGS. 2, 3A, and 3B, an example of a portable communication terminal 300 which is a portable terminal on which the camera module 50 exemplified in FIG. 1 is mounted will be explained.

The portable communication terminal 300 is a smartphone type or a tablet-type portable communication terminal and includes an image pickup function portion 200 having the camera module 50 which is an image pickup device, a control portion (CPU) 310 integrally controlling each portion and executing a program according to each processing, a display operation portion 320 for displaying data relating to communication, picked-up image and video, and the like and which is a touch panel for receiving an operation by a user, an operation portion 330 including a power switch and the like, a wireless communication portion 340 for realizing various types of information communication with external servers and the like via an antenna 341, a storage portion (ROM) 360 storing various types of required data such as a system program of the portable communication terminal 300, various processing programs, terminal IDs and the like, a temporary storage portion (RAM) 370 used as a work area for temporarily storing various processing programs and data executed by the control portion 310, processing data or image pickup data by the image pickup function portion 200 and the like.

The image pickup function portion 200 includes a controller 74, an optical-system driving circuit portion 105*a*, an image pickup element driving device 77, an image storing device 78, a camera-shake sensor 79 and the like in addition to the camera module 50 already explained.

The controller 74 controls each portion of the image pickup function portion 200. The controller 74 includes a CPU (Central Processing Unit), a RAM (Radom Access Memory), a ROM (Read Only Memory) and the like and executes various types of processing in collaboration with various programs read out from the ROM and extended to the RAM and the CPU. The controller 74 is communicably connected to the control portion 310 outside the image pickup function portion 200 and is capable of transmission and reception of a control signal and image data.

The optical-system driving circuit portion 105*a* controls a state of the zoom lens 10 by operating the first and second driving mechanisms 55*a* and 55*b* of the zoom lens 10 during magnification change, focusing, exposure and the like by means of control of the controller 74. The optical-system driving circuit portion 105*a* moves the second lens group Gr2 along the optical axis AX by operating the first driving mechanism 55*a* as appropriate and moves the third lens group Gr3 along the optical axis AX by operating the second driving mechanism 55*b* as appropriate so that a zoom operation is performed by the zoom lens 10. That is, in the zoom operation, the first and fourth lens groups Gr1 and Gr4 are fixed. In magnification change from the wide-angle end to the telephoto end, in the case of the zoom lens 10 corresponding to FIG. 1, the second lens group Gr2 moves to the object side (the −Y side in FIG. 1) and the third lens group Gr3 also moves to the object side (the −Y side in FIG. 1). On the other hand, the zoom lens 10 is also capable of a focusing operation. That is, the optical-system driving circuit portion 105*a* moves the third lens group Gr3 along the optical axis AX as appropriate by operating the second driving mechanism 55*b* so that the zoom lens 10 performs the focusing operation. In the focusing operation, the first, second, and fourth lens groups Gr1, Gr2, and Gr4 are fixed. In the case of the zoom lens 10 with a three-group configuration, the optical-system driving circuit portion 105*a* moves the second and third lens groups along the optical axis AX by the driving mechanisms 55*a* and 55*b*, for example, so as to perform the zoom operation and moves the third lens group Gr3 along the optical axis AX by the second driving mechanism 55*b* so that the zoom lens 10 performs the focusing operation.

When the zoom lens 10 is made to perform the focusing operation, the optical-system driving circuit portion 105*a* moves the third driving mechanism 55*c* on the basis of a detection output of the camera-shake sensor 79. That is, the optical-system driving circuit portion 105*a* two-dimensionally displaces the first lens L11 of the first lens group Gr1 along an XY plane perpendicular to the optical axis AX by an amount corresponding to the detection output of the camera-shake sensor 79 so that the zoom lens 10 performs a camera-shake correction operation so as to offset camera shake.

The image pickup element driving device 77 controls an operation of the image pickup element 51 when exposure or the like is performed by means of control of the controller 74. Specifically, the image pickup element driving device 77 scan-drives the image pickup element 51 on the basis of a timing signal and controls this. Moreover, the image pickup element driving device 77 coverts a detection signal outputted from the image pickup element 51 or an analog signal as a photoelectric conversion signal to digital image data. Moreover, the image pickup element driving device 77 can execute various types of image processing such as distortion correction, color correction, compression and the like to an image signal sent out from the image pickup element 51.

The image storing device 78 receives a digitalized image signal from the image pickup element driving device 77 and stores as image data capable of reading and writing.

Here, a photographing operation of the portable communication terminal 300 including the above-described image pickup function portion 200 will be explained. When a camera mode in which the portable communication terminal 300 is operated as a camera is set, monitoring (through image display) of the object and image photographing are executed. In monitoring, an image of the object obtained through the zoom lens 10 is formed on the image pickup surface I (see FIG. 1 and the like) of the image pickup element 51. The image pickup element 51 is subjected to scan-driving by the image pickup element driving device 77 and outputs an analog signal as photoelectric conversion output corresponding to a light image formed every certain period for one picture plane.

This analog signal is converted to digital data after being subjected to appropriate gain adjustment for each primary color component of RGB in the image pickup element driving device 77 and the like. The digital data is subjected to color process processing including pixel interpolation processing and Y-correction processing in the image pickup element driving device 77, and a luminance signal Y and color difference signals Cb and Cr (image data) in digital values are generated and stored in the image storing device 78. The stored digital data is periodically read out from the image storing device 78 and its video signal is generated and outputted to the display operation portion 320 through the controller 74 and the control portion 310.

This display operation portion 320 functions as an electronic finder in monitoring and displays a picked-up image on a real-time basis. In this state, magnification change, focusing, exposure and the like of the zoom lens 10 are set by driving of the optical-system driving circuit portion 105*a* on the basis of an operation input made by a user at any time through the display operation portion 320.

In such a monitoring state, when the user operates the display operation portion 320 as appropriate, still image data is photographed. In accordance with operation contents of the display operation portion 320, image data for one frame stored in the image storing device 78 is readout and compressed by the image pickup element driving device 77. The compressed image data is recorded in the RAM 370 or the like, for example, through the controller 74 and the control portion 310.

In the above-described photographing function portion 200 is an example of a preferable configuration of the present invention and the present invention is not limited to that.

That is, the camera module 50 which is the image pickup device on which the zoom lens 10 is mounted is not limited to the one built in portable communication terminal 300 of the smart phone type or tablet type but may be built in a mobile phone, a PHS (Personal Handyphone System) and the like or may be built in a PDA (Personal Digital Assistant), a mobile PC, a digital still camera, a video camera and the like.

Numerical value conditions satisfied by an optical surface and the like of the zoom lens 10 of the embodiment illustrated in FIG. 1 will be explained below.

The zoom lens 10 in FIG. 1 satisfies the already explained conditional expression (1):

$$1.59 < n21 < 2.20 \quad (1)$$

Here, a value n21 indicates refractive index of the fourth lens L21a on the side the closest to the object of the second lens group Gr2.

The zoom lens 10 of the embodiment satisfies the already explained conditional expression (2) in addition to the above-described conditional expression (1):

$$0.6 < d2g/fW < 1.6 \quad (2)$$

Here, a value d2g indicates an axial thickness of the cemented lens L21 of the second lens group Gr2, and a value fW indicates a focal length of the entire system at the wide-angle end.

The zoom lens 10 of the embodiment satisfies the already explained conditional expression (3) in addition to the above-described conditional expression (1):

$$0.1 < n2p1 - n2n < 0.3 \quad (3)$$

Here, a value n2p1 indicates refractive index of the lens L21a having a positive refractive power on the object side of the second lens group Gr2, and a value n2n indicates refractive index of the lens L21b having a negative refractive power of the second lens group Gr2.

The zoom lens 10 of the embodiment satisfies the already explained conditional expression (4) in addition to the above-described conditional expression (1):

$$25 < v2p2 - v2n < 50 \quad (4)$$

Here, a value v2p2 indicates Abbe number of the lens L21c having a positive refractive power on the image side of the second lens group Gr2, and a value v2n indicates Abbe number of the lens L21b having a negative refractive power of the second lens group Gr2.

The zoom lens 10 of the embodiment satisfies the already explained conditional expression (5) in addition to the above-described conditional expression (1):

$$0.45 < d11/fW < 1.10 \quad (5)$$

Here, a value d11 indicates a distance from a vertex of the surface 11a on the side closest to the object of the first lens group Gr1 to an intersection between the reflective surface 12b of the catoptric element PRM and the optical axis AX, and the value fW indicates a focal length of the entire system at the wide-angle end.

The value d11/fW more preferably satisfies the following conditional expression (5)'.

$$0.55 < d11/fW < 1.05 \quad (5)'$$

The zoom lens 10 of the embodiment satisfies the already explained conditional expression (6) in addition to the above-described conditional expression (1):

$$1.60 < nprm < 2.20 \quad (6)$$

Here, a value nprm indicates refractive index of the catoptric element PRM.

The zoom lens 10 of the embodiment satisfies the already explained conditional expression (7) in addition to the above-described conditional expression (1):

$$15 < v1n - v1p < 65 \quad (7)$$

Here, a value v1n indicates Abbe number of the second lens L12a having a negative refractive power of the cemented lens L12 of the first lens group Gr1, and a value v1p indicates Abbe number of the lens L12b having a positive refractive power in the cemented lens L12 of the first lens group Gr1.

The zoom lens 10 of the embodiment satisfies the already explained conditional expression (8) in addition to the above-described conditional expression (1):

$$50 < v3 < 95 \quad (8)$$

Here, a value v3 indicates Abbe number of a single lens L31 of the third lens group Gr3.

EXAMPLES

Examples of a zoom lens according to the present invention will be illustrated below. Reference numerals used in each of the examples are as follows:

f: Focal length of the entire system of the zoom lens
Fno: F-number
2Y: Diagonal length of image pickup surface of image pickup element
R: Paraxial radius of curvature
D: Axial surface distance
Nd: Refractive index of lens material to d-line
vd: Abbe number of lens material
d11: Distance from a vertex of the object side surface of the catoptric element to an intersection between the reflective surface of the catoptric element and the optical axis In each of the examples, a surface with "*" described subsequent to each surface number (Surf. N) is a surface having an aspherical shape, and the aspherical shape is expressed by the following "formula 1" with the vertex of a surface as an origin, the X-axis in the optical axis direction, and a height in a direction perpendicular to the optical axis as h. Moreover, a symbol "inf." means infinity or ∞ and a symbol "stop" means a diaphragm.

$$X = \frac{h^2/R}{1 + \sqrt{1-(1+K)h^2/R^2}} + \sum A_i h^i \quad \text{[Formula 1]}$$

where
Ai: The i-th order aspherical coefficient
R: Radius of curvature
K: Conic constant Specific examples of the zoom lens of the present invention will be explained below.

Example 1

Basic features of a zoom lens in an example 1 are as follows:
Zoom ratio: 2.85
Lens entire length: 28.099
d11: 3.250

Lens data of the example 1 is shown in Table 1. In the following (including the lens data in Tables), a power multiplier of 10 ($2.5 \times 10^{-02}$, for example) is expressed by using E (2.5E-02, for example).

TABLE 1

[Radius of curvature, surface distance and the like]

| Surf. N | R(mm) | D(mm) | Nd | vd | effective radius (mm) |
|---|---|---|---|---|---|
| 1 | inf. | 0.300 | 2.00100 | 29.1 | 2.79 |
| 2 | 10.446 | 0.495 | | | 2.60 |
| 3 | inf. | 4.911 | 2.00069 | 25.5 | 2.55 |
| 4 | inf. | 0.414 | | | 1.79 |
| 5 | −5.382 | 0.300 | 1.88300 | 40.8 | 1.75 |
| 6 | 29.250 | 0.965 | 1.92286 | 20.9 | 1.84 |
| 7 | −9.172 | d1 | | | 1.94 |
| 8(stop) | inf. | 0.000 | | | 1.98 |
| 9* | 5.456 | 2.159 | 1.85135 | 40.1 | 2.09 |
| 10 | −7.846 | 0.600 | 1.69895 | 30.1 | 2.02 |
| 11 | 3.025 | 2.191 | 1.59201 | 67.0 | 1.91 |
| 12* | −13.303 | d2 | | | 1.88 |
| 13* | −14.728 | 0.350 | 1.54470 | 56.2 | 1.86 |
| 14* | 6.588 | d3 | | | 1.89 |
| 15* | 33.048 | 1.931 | 1.54470 | 56.2 | 3.09 |
| 16* | −6.408 | 0.822 | | | 3.17 |
| 17 | inf. | 0.300 | 1.51680 | 64.2 | 3.04 |
| 18 | inf. | 0.500 | | | 3.03 |
| 19 | inf. | 0.210 | 1.51680 | 64.2 | 2.98 |
| 20 | inf. | 0.640 | | | 2.97 |

[Aspherical Coefficient]

Ninth Surface

K = 0.00000E+00, A4 = −0.65103E−03, A6 = 0.50692E−04,
A8 = −0.13360E−04, A10 = 0.89604E−06, A12 = 0.29276E−07

Twelfth Surface

K = 0.00000E+00, A4 = 0.19332E−02, A6 = 0.20588E−03,
A8 = −0.11124E−03, A10 = 0.29492E−04, A12 = −0.30820E−05

Thirteenth Surface

K = 0.00000E+00, A3 = −0.19778E−01, A4 = 0.71783E−01,
A5 = −0.78483E−01, A6 = 0.43431E−01, A8 = −0.11846E−01,
A10 = 0.35947E−02, A12 = −0.68360E−03, A14 = 0.56708E−04

Fourteenth Surface

K = 0.00000E+00, A3 = −0.19135E−01, A4 = 0.68610E−01,
A5 = −0.70134E−01, A6 = 0.37504E−01, A8 = −0.95897E−02,
A10 = 0.26956E−02, A12 = −0.47743E−03, A14 = 0.37482E−04

Fifteenth Surface

K = 0.00000E+00, A4 = 0.91071E−03, A6 = −0.10888E−03,
A8 = 0.34297E−04, A10 = −0.40400E−05, A12 = 0.17798E−06

Sixteenth Surface

K = 0.00000E+00, A4 = 0.26563E−02, A6 = −0.65129E−03,
A8 = 0.12112E−03, A10 = −0.10892E−04, A12 = 0.38674E−06

The focal length (f) of the entire system, F-number (Fno), an angle of view, a diagonal length of image pickup surface (2Y), and group intervals (d1 to d3) at each of positions (Po) 1 to 3 of the zoom lens in the example 1 are shown in Table 2 below. Po=1 indicates a wide-angle end, Po=2 for the middle, and Po=3 for a telephoto end.

TABLE 2

| Po | f | Fno | Angle of View | 2Y |
|---|---|---|---|---|
| 1 | 4.40 | 2.88 | 67.6 | 5.003 |
| 2 | 7.51 | 3.92 | 42.8 | 5.594 |
| 3 | 12.54 | 5.03 | 26.4 | 5.871 |

| Po | d1 | d2 | d3 |
|---|---|---|---|
| 1 | 6.651 | 2.721 | 1.641 |
| 2 | 3.306 | 3.316 | 4.391 |
| 3 | 0.250 | 6.201 | 4.562 |

Data of each of the lens groups of the zoom lens of the example 1 is shown in Table 3 below.

TABLE 3

| Lens Group | First Surface | Focal Length (mm) |
|---|---|---|
| 1 | 1 | −6.36 |
| 2 | 8 | 5.88 |
| 3 | 13 | −8.31 |
| 4 | 15 | 10.03 |

Figure 4:
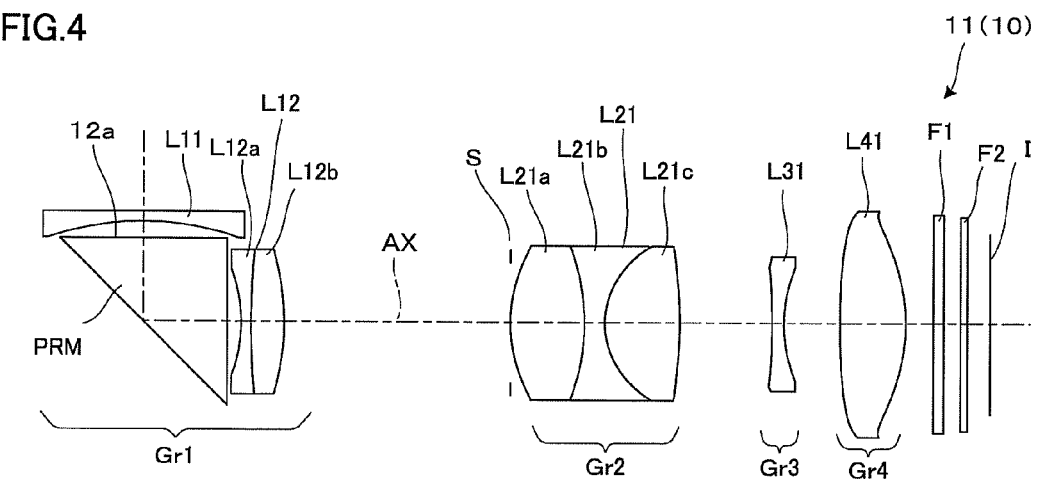
FIG. 4 is a sectional view of the zoom lens of an example 1.

FIG. 4 is a sectional view of the zoom lens of the example 1. The zoom lens 11 of the example 1 is composed of the first lens group Gr1, the second lens group Gr2, the third lens group Gr3, and the fourth lens group Gr4 in order from the object side. Here, the first lens group Gr1 includes the plano-concave and negative first lens L11, the catoptric element PRM which is a right angle prism substantially not having a refractive power, and the cemented lens L12. Among them, the catoptric element PRM bends a light ray incident to the object side surface 12a which is a flat surface at a right angle. Moreover, the cemented lens L12 is obtained by cementing the biconcave and negative second lens L12a and the biconvex and positive third lens L12b. The second lens group Gr2 includes the aperture stop S, and the cemented lens L21. The cemented lens L21 is obtained by cementing the biconvex and positive fourth lens L21a, the biconcave and negative fifth lens L21b, and the biconvex and positive sixth lens L21c. The third lens group Gr3 is composed of the biconcave and negative seventh lens L31, and the fourth lens group Gr4 is composed of the biconvex and positive eighth lens L41.

Moreover, reference symbols F1 and F2 denote parallel flat plates assuming an optical low-pass filter, an IR cut filter, a seal glass of a solid-state imaging element and the like. Moreover, symbol I denotes an image pickup surface which is a projected surface of the image pickup element 51. These parallel flat plates F1 and F2 and the image pickup surface I are similarly applied in the examples explained below.

Figure 5A:
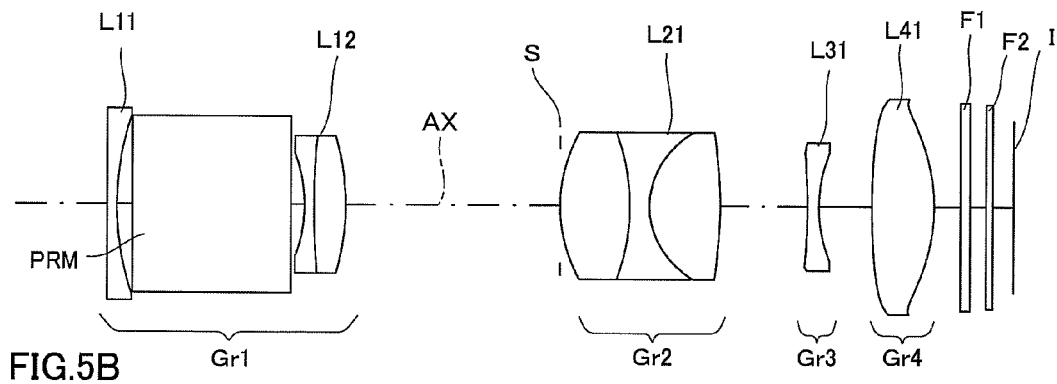
FIG. 5A is a sectional view at a wide-angle end in the example 1.
Figure 5B:
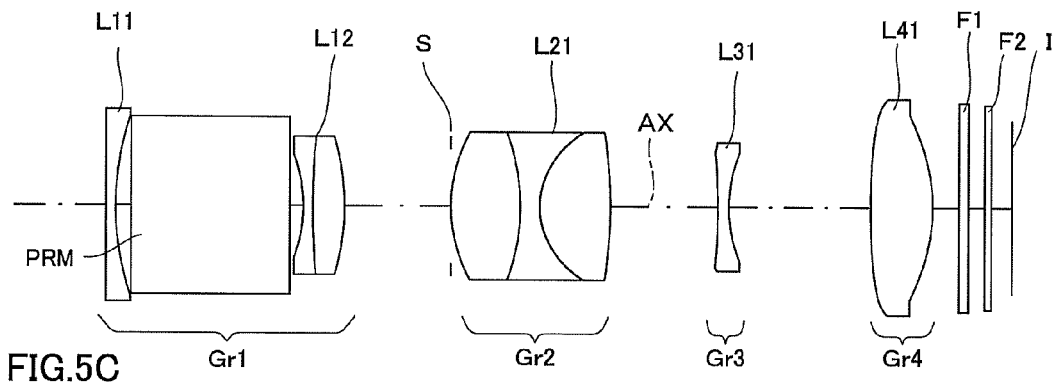
FIG. 5B is a sectional view in the middle.
Figure 5C:
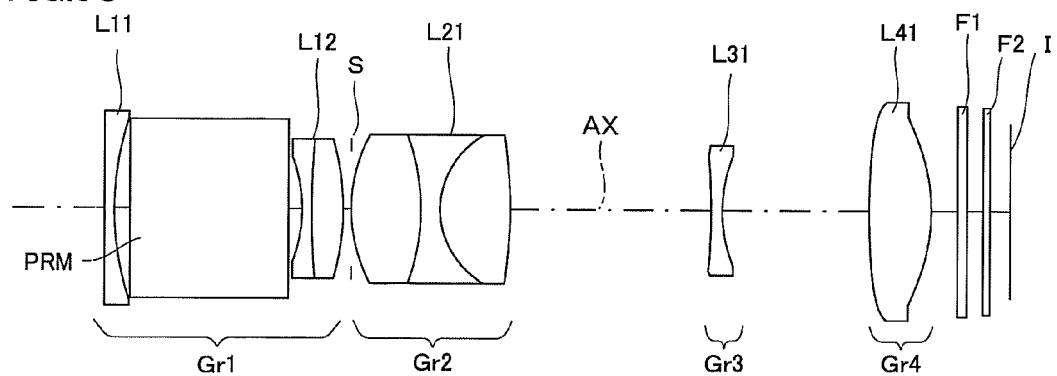
FIG. 5C is a sectional view at a telephoto end.

FIGS. 5A to 5C illustrate positions of the zoom lens 11 in the example 1 in the zoom operation, respectively. That is, FIG. 5A is a sectional view of the zoom lens 11 at the wide-angle end, FIG. 5B is a sectional view in the middle, and FIG. 5C is a sectional view at the telephoto end. In this example 1 and the following examples, the catoptric element PRM is expressed as a flat plate or a single lens equivalent to its optical path length and having a rotary symmetric shape.

Figure 6A:
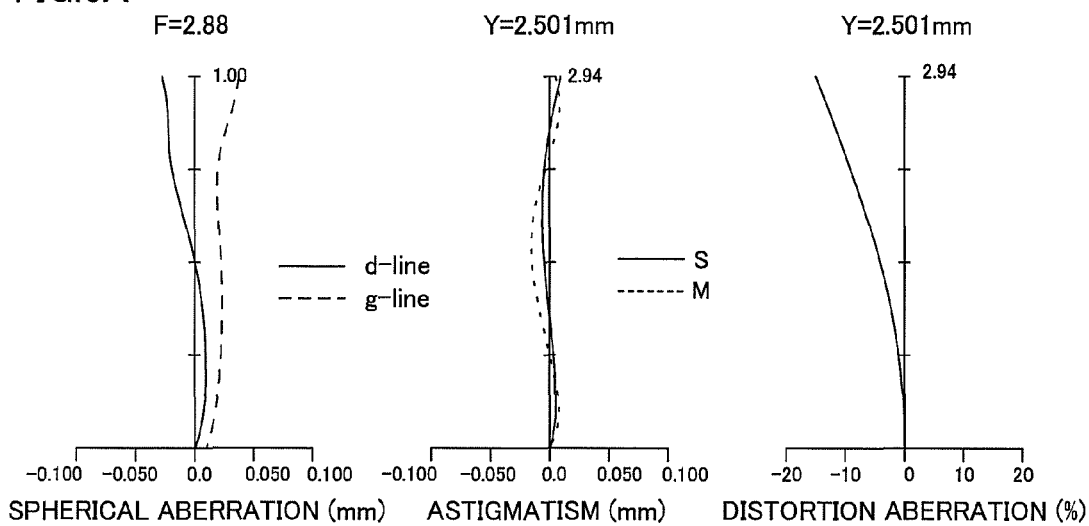
FIG. 6A is an aberration diagram at the wide-angle end in the example 1.
Figure 6B:
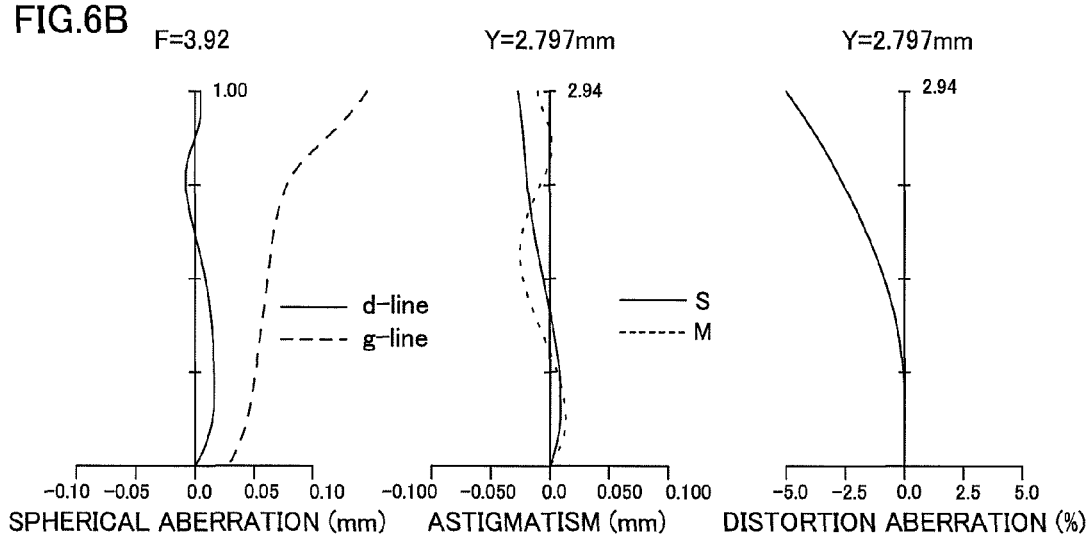
FIG. 6B is an aberration diagram in the middle.
Figure 6C:
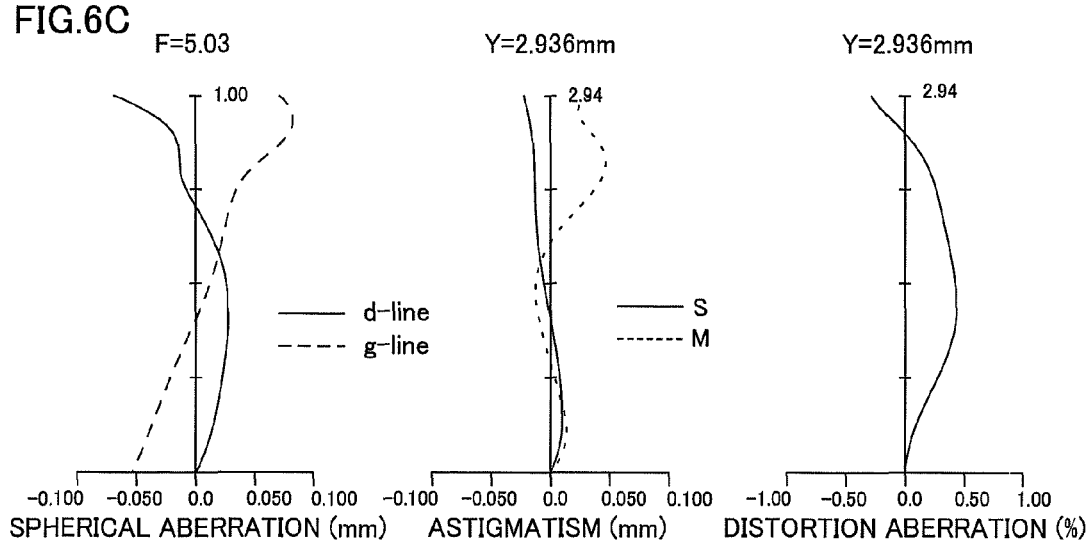
FIG. 6C is an aberration diagram at the telephoto end.

FIG. 6A is an aberration diagram (spherical aberration, astigmatism, and distortion aberration) at the wide-angle end of the zoom lens 11, FIG. 6B is an aberration diagram (spherical aberration, astigmatism, and distortion aberration) in the middle, and FIG. 6C is an aberration diagram (spherical aberration, astigmatism, and distortion aberration) at the telephoto end. In the above-described aberration diagrams and the aberration diagrams below, it is assumed that, in the spherical aberration diagrams, a solid line indicates a d-line, and a dotted line indicates a g-line, while in the astigmatism diagram, a solid line indicates a sagittal image surface, and a dotted line indicates a meridional image surface.

In the zoom lens 11 in the example 1, during magnification change from the wide-angle end to the telephoto end, the second lens group Gr2 moves to the object side along the optical axis AX direction, and the third lens group Gr3 moves along the optical axis AX direction. The other lens groups Gr1 and Gr4 are fixed during magnification change, and magnification change can be realized by changing an interval between each of the lens groups Gr1 to Gr4. Moreover, by moving the third lens group Gr3, focusing from infinity to a finite distance can be performed. It is assumed that the fourth lens L21a and the sixth lens L21c are glass mold lenses, the seventh lens L31 and the eighth lens L41 are plastic lenses, and the other lenses and the like (including a prism. The same applies to the following.) are polished lenses made of glass material. In the example 1, by means of movement of the first lens L11 in an in-plane direction perpendicular to the optical axis AX direction, camera-shake correction is made by correcting motion blur on an image formed on the image pickup surface I.

Example 2

Basic features of a zoom lens of an example 2 are as follows:
Zoom ratio: 2.85
Lens entire length: 27.523
d11: 2. 450
Lens data of the example 2 is shown in Table 4.

TABLE 4

[Radius of curvature, surface distance and the like]

| Surf. N | R(mm) | D(mm) | Nd | vd | effective radius (mm) |
|---|---|---|---|---|---|
| 1 | −13.550 | 5.350 | 2.00069 | 25.5 | 2.88 |
| 2 | inf. | 0.185 | | | 2.08 |
| 3 | −15.480 | 0.400 | 1.83481 | 42.7 | 2.07 |
| 4 | 6.710 | 1.130 | 1.92286 | 20.9 | 1.99 |
| 5 | 529.000 | d1 | | | 1.91 |
| 6(stop) | inf. | 0.000 | | | 1.82 |
| 7* | 6.185 | 1.850 | 1.85135 | 40.1 | 1.88 |
| 8 | −5.500 | 0.400 | 1.69895 | 30.1 | 1.83 |
| 9 | 3.720 | 1.710 | 1.61881 | 63.9 | 1.75 |
| 10* | −11.813 | d2 | | | 1.70 |
| 11* | 19.682 | 0.300 | 1.54470 | 56.2 | 1.71 |
| 12* | 3.765 | d3 | | | 1.70 |
| 13* | −19.945 | 1.730 | 1.54470 | 56.2 | 3.01 |
| 14* | −4.675 | 1.310 | | | 3.14 |
| 15 | inf. | 0.300 | 1.51680 | 64.2 | 3.03 |
| 16 | inf. | 1.000 | | | 3.02 |
| 17 | inf. | 0.210 | 1.51680 | 64.2 | 2.98 |
| 18 | inf. | 0.640 | | | 2.97 |

[Aspherical Coefficient]

Seventh Surface

K = 0.00000E+00, A4 = −0.63372E−03, A6 = −0.74137E−04,
A8 = 0.36010E−04, A10 = −0.10070E−04, A12 = 0.10203E−05

Tenth Surface

K = 0.00000E+00, A4 = 0.16722E−02, A6 = 0.13269E−03,
A8 = −0.90310E−04, A10 = 0.13945E−04, A12 = −0.31151E−07

Eleventh Surface

K = 0.00000E+00, A3 = −0.95856E−02, A4 = 0.33882E−01,
A5 = −0.51337E−01, A6 = 0.32461E−01, A8 = −0.76954E−02,
A10 = 0.11525E−02, A12 = 0.10476E−03, A14 = −0.37235E−04

Twelfth Surface

K = 0.00000E+00, A3 = −0.84388E−02, A4 = 0.35877E−01,
A5 = −0.67400E−01, A6 = 0.50807E−01, A8 = −0.16677E−01,
A10 = 0.46590E−02, A12 = −0.63566E−03, A14 = 0.25778E−04

Thirteenth Surface

K = 0.00000E+00, A3 = 0.28422E−02, A4 = −0.34294E−02,
A5 = 0.12931E−02, A6 = 0.28118E−03, A8 = −0.64517E−04,
A10 = 0.36163E−05, A12 = −0.31094E−07

Fourteenth Surface

K = 0.00000E+00, A3 = 0.22039E−02, A4 = 0.17314E−03,
A5 = 0.35732E−03, A6 = 0.22456E−03, A8 = −0.33075E−05,
A10 = −0.25957E−05, A12 = 0.17587E−06

The focal length (f) of the entire system, F-number (Fno), an angle of view, a diagonal length of the image pickup surface (2Y), and group intervals (d1 to d3) at each of positions (Po) 1 to 3 of the zoom lens in the example 2 are shown in Table 5 below. Po=1 indicates a wide-angle end, Po=2 for the middle, and Po=3 for a telephoto end.

TABLE 5

| Po | f | Fno | Angle of View | 2Y |
|---|---|---|---|---|
| 1 | 4.76 | 2.88 | 63.5 | 4.998 |
| 2 | 7.94 | 3.85 | 40.7 | 5.751 |
| 3 | 13.57 | 5.04 | 23.9 | 5.888 |

| Po | d1 | d2 | d3 |
|---|---|---|---|
| 1 | 7.056 | 1.998 | 1.955 |
| 2 | 3.578 | 2.160 | 5.271 |
| 3 | 0.250 | 3.798 | 6.961 |

Data of each of the lens groups of the zoom lens of the example 2 is shown in Table 6 below.

TABLE 6

| Lens Group | First Surface | Focal Length (mm) |
|---|---|---|
| 1 | 1 | −7.99 |
| 2 | 6 | 5.59 |
| 3 | 11 | −8.61 |
| 4 | 13 | 10.78 |

Figure 7A:
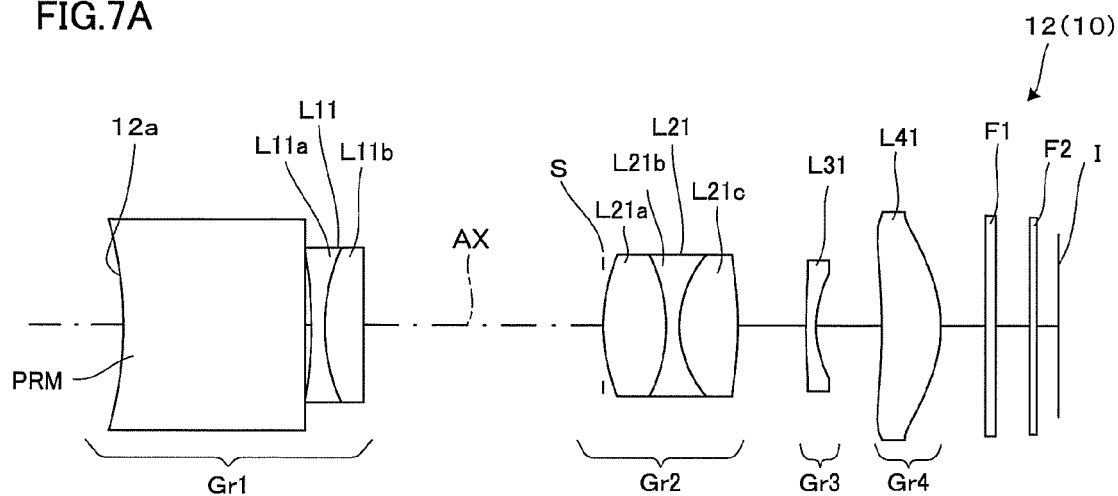
FIG. 7A is a sectional view at the wide-angle end in an example 2.
Figure 7B:
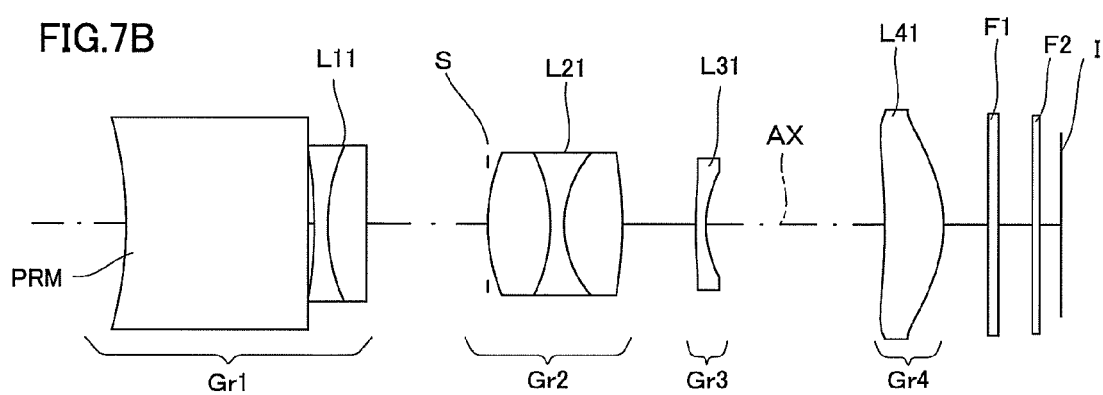
FIG. 7B is a sectional view in the middle.
Figure 7C:
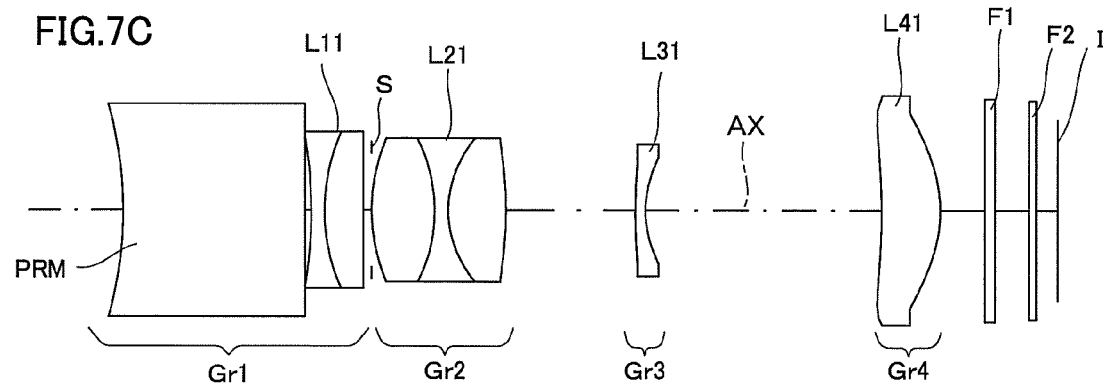
FIG. 7C is a sectional view at the telephoto end.

FIGS. 7A to 7C are sectional views of the zoom lens of the example 2 and illustrate positions of the zoom lens 12 in the example 2 in the zoom operation, respectively. That is, FIG. 7A is a sectional view of the zoom lens 12 at the wide-angle end, FIG. 7B is a sectional view in the middle, and FIG. 7C is a sectional view at the telephoto end.

The zoom lens 12 of the example 2 is composed of the first lens group Gr1, the second lens group Gr2, the third lens group Gr3, and the fourth lens group Gr4 in order from the object side. Here, the first lens group Gr1 includes the catoptric element PRM which is a right angle prism member having a negative refractive power and the cemented lens L11. Among them, the catoptric element PRM bends a light ray incident to the object side surface 12a which is a concave surface at a right angle. Moreover, the cemented lens L11 is obtained by cementing the biconcave and negative first lens L11a and the substantially plano-convex and positive second lens L11b. The second lens group Gr2 includes the aperture stop S and the cemented lens L21. The cemented lens L21 is obtained by cementing the biconvex and positive third lens L21a, the biconcave and negative fourth lens L21b, and the biconvex and positive fifth lens L21c. The third lens group Gr3 is composed of the convex to the object side and negative meniscus sixth lens L31, and the fourth lens group Gr4 is composed of the convex to the image side and positive meniscus seventh lens L41. The zoom lens 12 includes the parallel flat plates F1 and F2 which are filters and the like in addition to them.

Figure 8A:
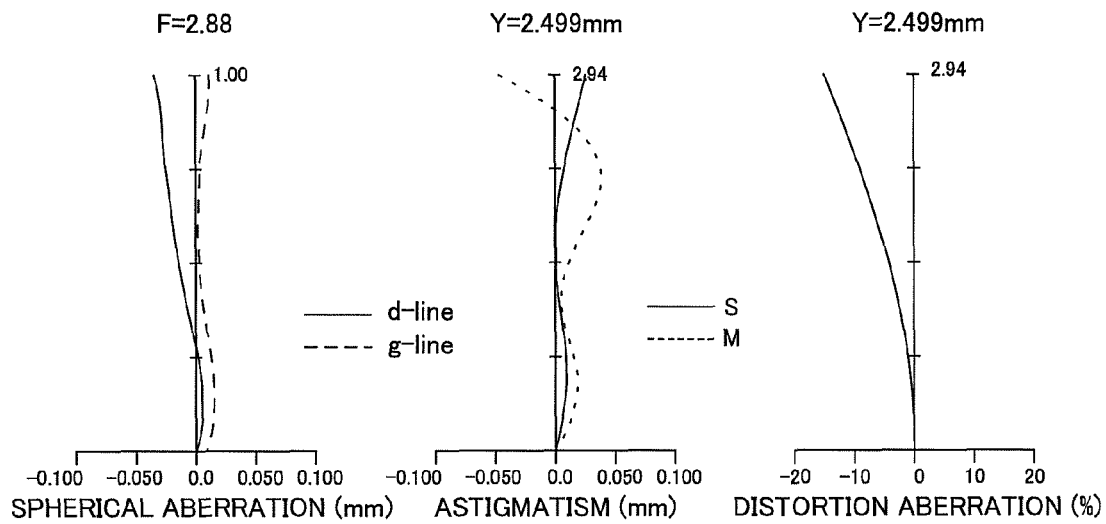
FIG. 8A is an aberration diagram at the wide-angle end in the example 2.
Figure 8B:
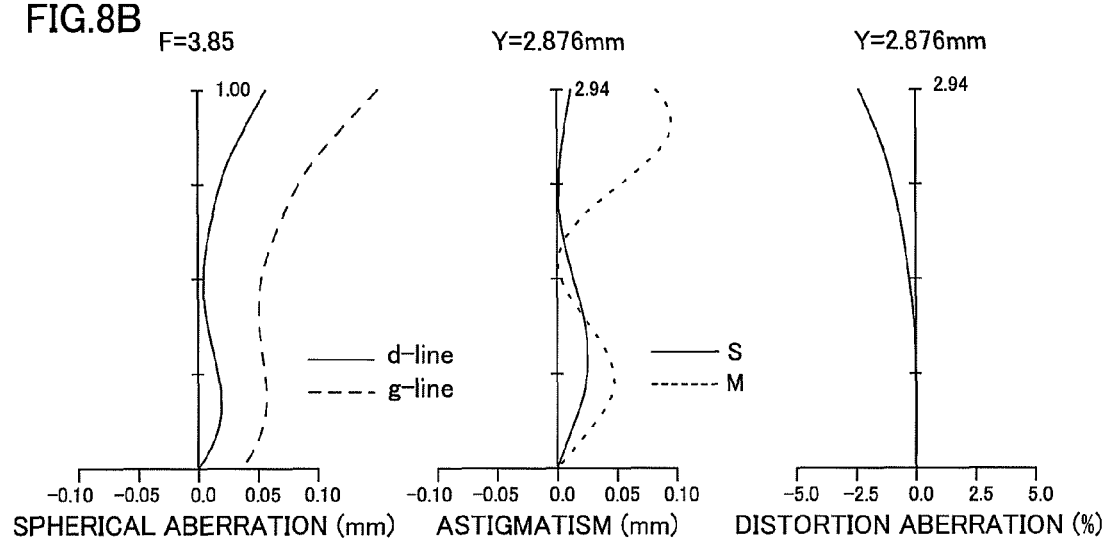
FIG. 8B is an aberration diagram in the middle.
Figure 8C:
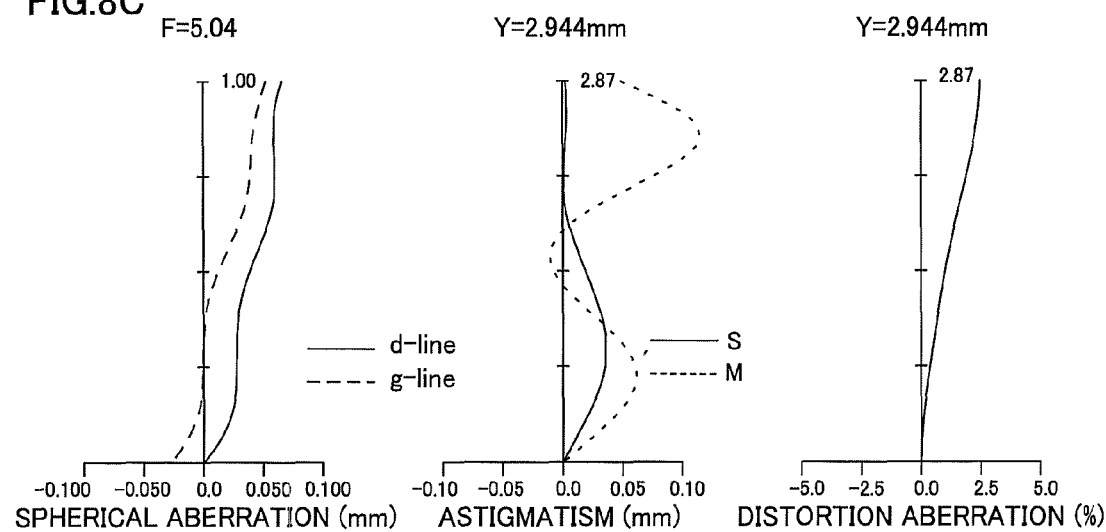
FIG. 8C is an aberration diagram at the telephoto end.

FIG. 8A is an aberration diagram (spherical aberration, astigmatism, and distortion aberration) at the wide-angle end of the zoom lens 12, FIG. 8B is an aberration diagram (spherical aberration, astigmatism, and distortion aberration) in the middle, and FIG. 8C is an aberration diagram (spherical aberration, astigmatism, and distortion aberration) at the telephoto end.

In the zoom lens 12 of the example 2, the second lens group Gr2 moves to the object side along the optical axis AX direction during magnification change from the wide-angle end to the telephoto end and the third lens group Gr3 moves along the optical axis AX direction. The other lens groups Gr1 and Gr4 are fixed during magnification change, and magnification change can be realized by changing the interval between each of the lens groups Gr1 to Gr4. Moreover, by moving the third lens group Gr3, focusing from infinity to a finite distance can be performed. It is assumed that the third lens L21a and the fifth lens L21c are glass mold lenses, the sixth lens L31 and the seventh lens L41 are plastic lenses, and the other lenses are polished lenses made of a glass material.

Example 3

Basic features of a zoom lens of an example 3 are as follows:
Zoom ratio: 2.85
Lens entire length: 28.017
d11: 3.521
Lens data of the example 3 is shown in Table 7.

TABLE 7

[Radius of curvature, surface distance and the like]

| Surf. N | R(mm) | D(mm) | Nd | vd | effective radius (mm) |
|---|---|---|---|---|---|
| 1 | inf. | 0.300 | 1.91082 | 35.3 | 3.05 |
| 2 | 8.527 | 0.696 | | | 2.80 |
| 3 | inf. | 5.049 | 2.00069 | 25.5 | 2.73 |
| 4 | inf. | 0.445 | | | 1.98 |
| 5 | −5.937 | 0.300 | 1.61800 | 63.4 | 1.95 |
| 6 | −91.293 | 0.830 | 1.94594 | 18.0 | 1.92 |
| 7 | −13.577 | d1 | | | 1.90 |
| 8(stop) | inf. | 0.000 | | | 1.80 |
| 9* | 5.905 | 2.025 | 1.82080 | 42.7 | 1.86 |
| 10 | −6.899 | 0.700 | 1.69895 | 30.1 | 1.82 |
| 11 | 3.959 | 1.784 | 1.59201 | 67.0 | 1.76 |
| 12* | −8.647 | d2 | | | 1.75 |
| 13* | −21.083 | 0.300 | 1.54470 | 56.2 | 1.75 |
| 14* | 5.160 | d3 | | | 1.77 |
| 15* | 14.548 | 2.300 | 1.54470 | 56.2 | 3.17 |
| 16* | −7.938 | 1.608 | | | 3.14 |
| 17 | inf. | 0.210 | 1.51680 | 64.2 | 3.00 |
| 18 | inf. | | | | 2.99 |

[Aspherical Coefficient]

Ninth Surface

K = 0.00000E+00, A4 = −0.82229E−03, A6 = 0.13210E−03,
A8 = −0.69276E−04, A10 = 0.16105E−05, A12 = −0.13852E−05

Twelfth Surface

K = 0.00000E+00, A4 = 0.18236E−02, A6 = −0.12125E−03,
A8 = 0.47657E−04, A10 = −0.12781E−04, A12 = 0.15336E−05

Thirteenth Surface

K = 0.00000E+00, A3 = −0.12209E−01, A4 = 0.51245E−01,
A5 = −0.77423E−01, A6 = 0.49824E−01, A8 = −0.12798E−01,
A10 = 0.32326E−02, A12 = −0.46735E−03, A14 = 0.27327E−04

Fourteenth Surface

K = 0.00000E+00, A3 = −0.13583E−01, A4 = 0.50722E−01,
A5 = −0.69709E−01, A6 = 0.41709E−01, A8 = −0.94091E−02,
A10 = 0.20649E−02, A12 = −0.23940E−03, A14 = 0.87788E−05

Fifteenth Surface

K = 0.00000E+00, A4 = 0.18367E−02, A6 = 0.35552E−04,
A8 = −0.13027E−04, A10 = 0.12547E−05, A12 = −0.36204E−07

Sixteenth Surface

K = 0.00000E+00, A4 = 0.37182E−02, A6 = 0.14023E−03,
A8 = −0.48150E−04, A10 = 0.40143E−05, A12 = −0.11101E−06

The focal length (f) of the entire system, F-number (Fno), an angle of view, a diagonal length of the image pickup surface (2Y), and group intervals (d1 to d3) at each of positions (Po) 1 to 3 of the zoom lens in the example 3 are shown in Table 8 below.

TABLE 8

| Po | f | Fno | Angle of View | 2Y |
|---|---|---|---|---|
| 1 | 4.00 | 2.88 | 72.7 | 5.002 |
| 2 | 6.66 | 3.87 | 47.7 | 5.723 |
| 3 | 11.40 | 5.07 | 28.3 | 5.888 |

| Po | d1 | d2 | d3 |
|---|---|---|---|
| 1 | 6.922 | 2.448 | 1.460 |
| 2 | 3.575 | 2.674 | 4.581 |
| 3 | 0.250 | 4.378 | 6.202 |

Data of each of the lens groups of the zoom lens of the example 3 is shown in Table 9.

TABLE 9

| Lens Group | First Surface | Focal Length (mm) |
|---|---|---|
| 1 | 1 | −6.71 |
| 2 | 8 | 5.68 |
| 3 | 13 | −7.58 |
| 4 | 15 | 9.78 |

Figure 9A:
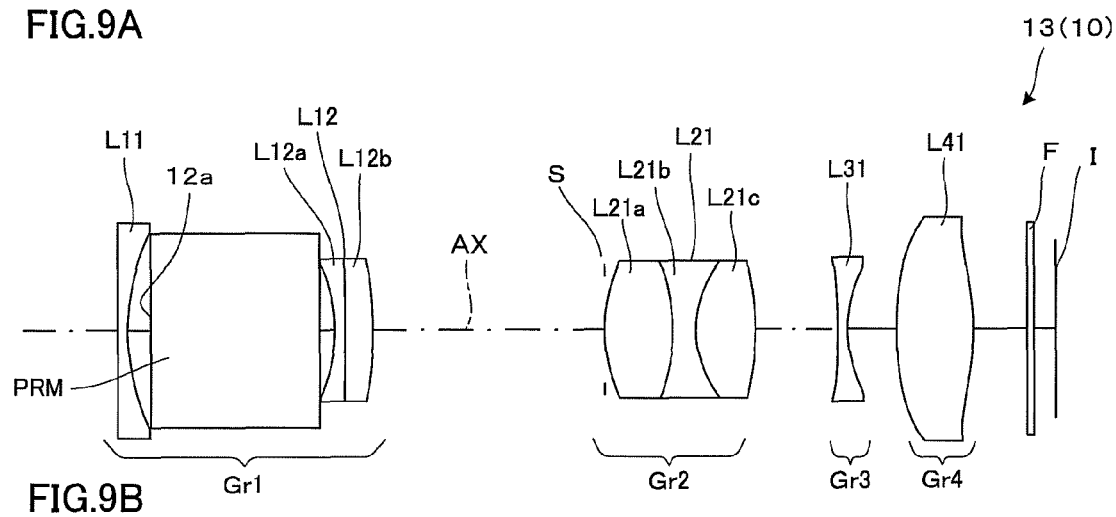
FIG. 9A is a sectional view at the wide-angle end in an example 3.
Figure 9B:
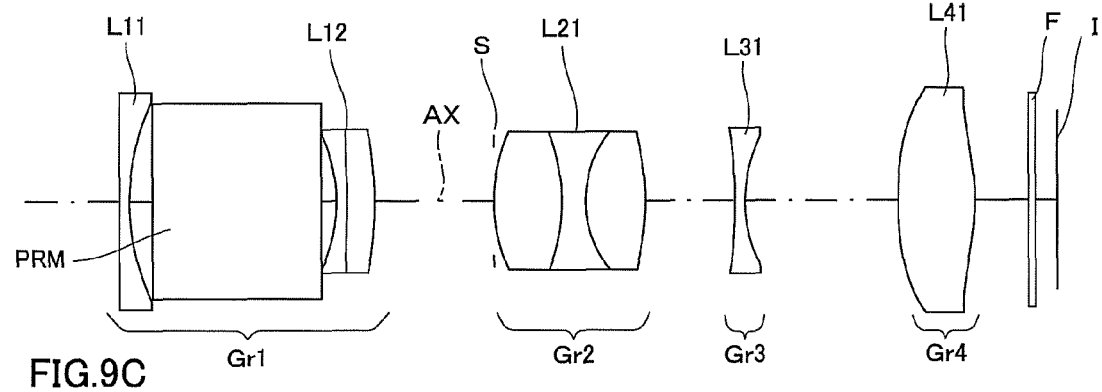
FIG. 9B is a sectional view in the middle.
Figure 9C:
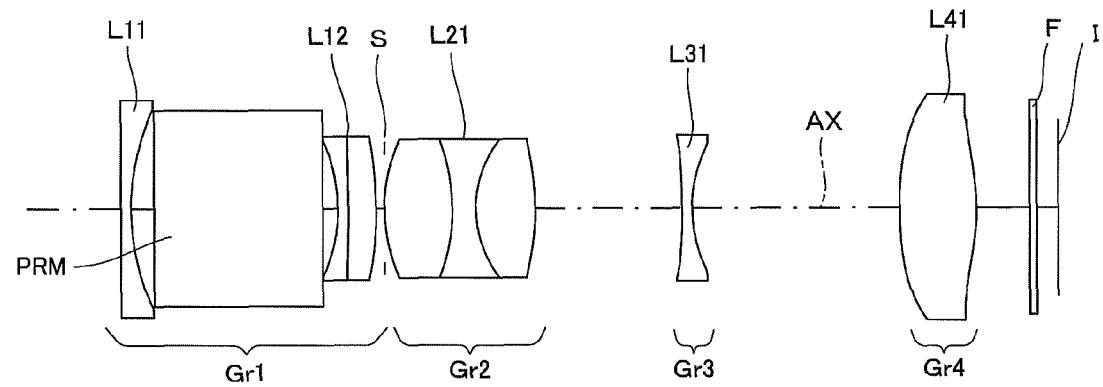
FIG. 9C is a sectional view at the telephoto end.

FIGS. 9A to 9C are sectional views of the zoom lens of the example 3 and illustrate positions of the zoom lens 13 in the example 3 in the zoom operation, respectively. That is, FIG. 9A is a sectional view of the zoom lens 13 at the wide-angle end, FIG. 9B is a sectional view in the middle, and FIG. 9C is a sectional view at the telephoto end.

The zoom lens 13 of the example 3 is composed of the first lens group Gr1, the second lens group Gr2, the third lens group Gr3, and the fourth lens group Gr4 in order from the object side. Here, the first lens group Gr1 includes a plano-concave and negative first lens L11, the catoptric element PRM which is a right angle prism substantially not having a refractive power, and the cemented lens L12. Among them, the catoptric element PRM bends a light ray incident to the object side surface 12a which is a flat surface at a right angle. Moreover, the cemented lens L12 is obtained by cementing the negative meniscus second lens L12a having the concave surface faced with the object side and the positive meniscus third lens L12b with the convex surface faced with the image side. The second lens group Gr2 includes the aperture stop S and the cemented lens L21. The cemented lens L21 is obtained by cementing the biconvex and positive fourth lens L21a, the biconcave and negative fifth lens L21b, and the biconvex and positive sixth lens L21c. The third lens group Gr3 is composed of the biconcave and negative seventh lens L31, and the fourth lens group Gr4 is composed of the biconvex and positive eighth lens L41. The zoom lens 13 includes the parallel flat plate F for which an optical low-pass filter, an IR cut filter, a seal glass of a solid-state imaging element and the like are assumed in addition to them.

Figure 10A:
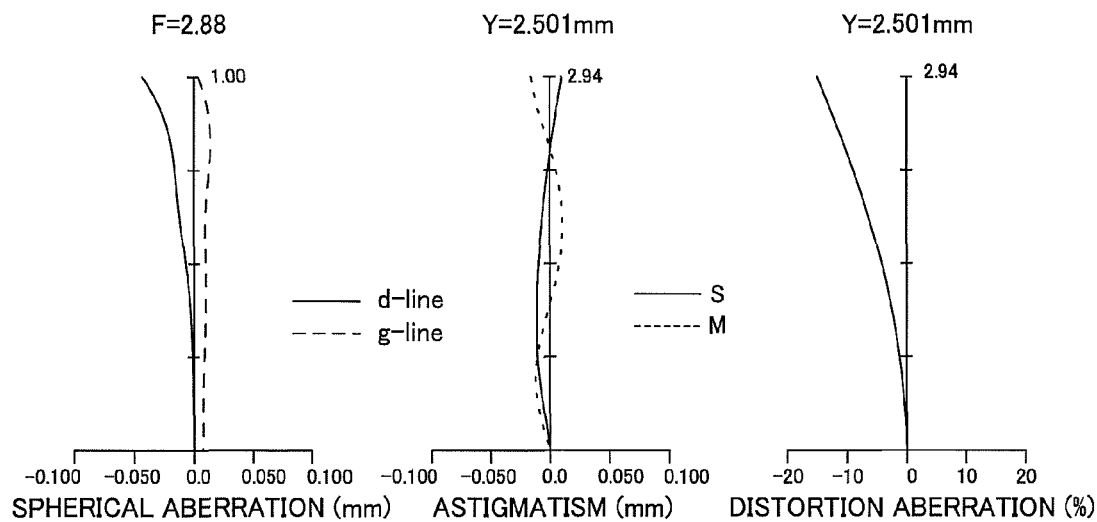
FIG. 10A is an aberration diagram at the wide-angle end in the example 3.
Figure 10B:
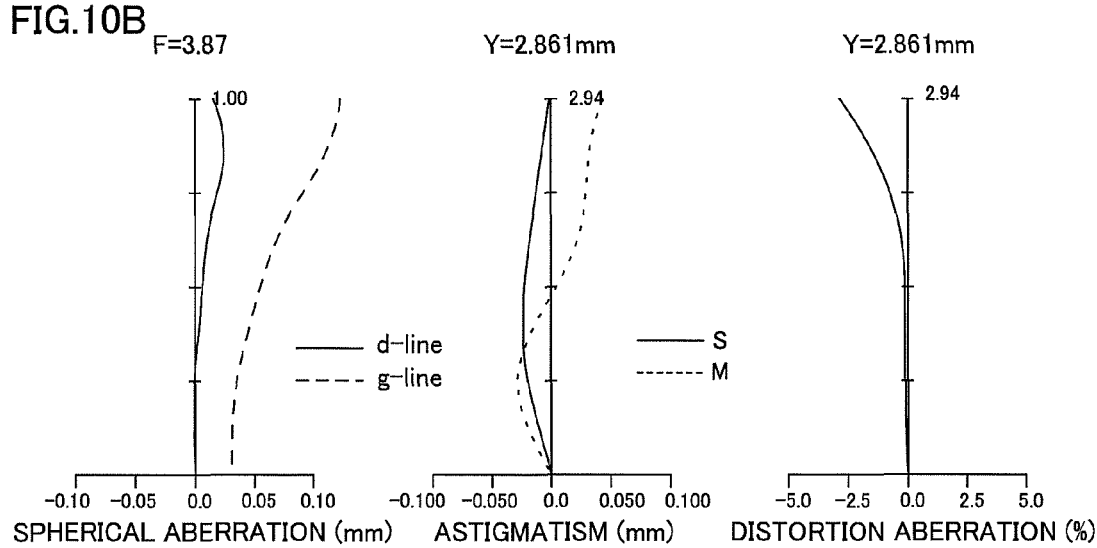
FIG. 10B is an aberration diagram in the middle.
Figure 10C:
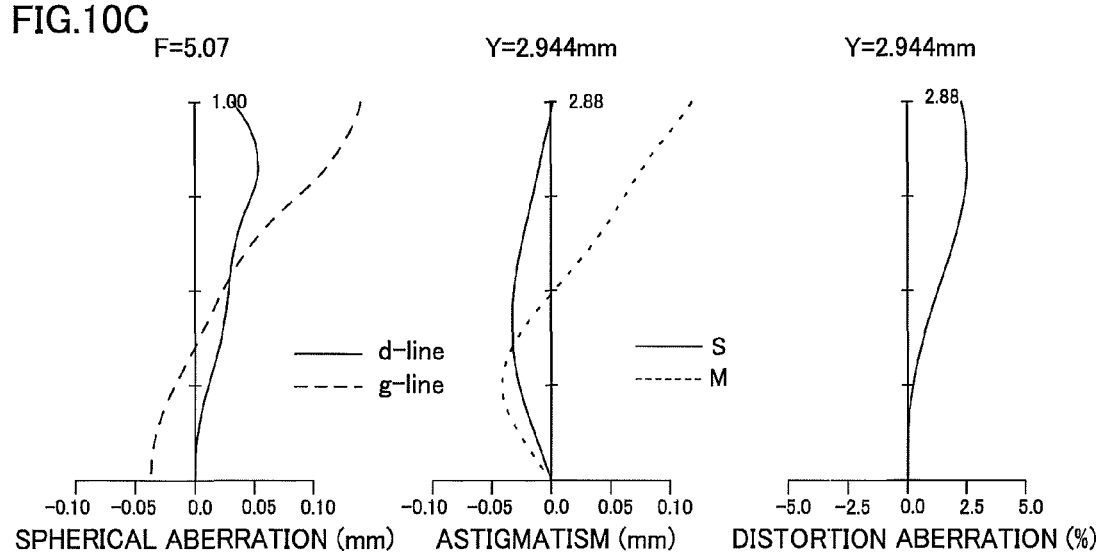
FIG. 10C is an aberration diagram at the telephoto end.

FIG. 10A is an aberration diagram (spherical aberration, astigmatism, and distortion aberration) at the wide-angle end of the zoom lens 13, FIG. 10B is an aberration diagram (spherical aberration, astigmatism, and distortion aberration) in the middle, and FIG. 10C is an aberration diagram (spherical aberration, astigmatism, and distortion aberration) at the telephoto end.

In the zoom lens 13 of the example 3, the second lens group Gr2 moves to the object side along the optical axis AX direction during magnification change from the wide-angle end to the telephoto end and the third lens group Gr3 moves along the optical axis AX direction. The other lens groups Gr1 and Gr4 are fixed during magnification change, and magnification change can be realized by changing the interval between each of the lens groups Gr1 to Gr4. Moreover, by moving the third lens group Gr3, focusing from infinity to a finite distance can be performed. It is assumed that the fourth lens L21$a$ and the sixth lens L21$c$ are glass mold lenses, the seventh lens L31 and the eighth lens L41 are plastic lenses, and the other lenses are polished lenses made of a glass material. In the example 3, by means of movement of the first lens L11 in an in-plane direction perpendicular to the optical axis AX direction, camera-shake correction is made by correcting motion blur on an image formed on the image pickup surface I.

Example 4

Basic features of a zoom lens of an example 4 are as follows:
Zoom ratio: 2.85
Lens entire length: 28.805
d11: 2.260
Lens data of the example 4 is shown in Table 10.

TABLE 10

[Radius of curvature, surface distance and the like]

| Surf. N | R(mm) | D(mm) | Nd | vd | effective radius (mm) |
|---|---|---|---|---|---|
| 1* | −7.004 | 5.260 | 1.63469 | 23.9 | 2.93 |
| 2* | −26.807 | 0.242 | | | 2.04 |
| 3 | −10.221 | 0.400 | 1.88300 | 40.8 | 2.00 |
| 4 | 8.794 | 1.005 | 1.92286 | 20.9 | 1.96 |
| 5 | −41.173 | d1 | | | 1.93 |
| 6(stop) | inf. | 0.000 | | | 1.98 |
| 7* | 7.152 | 1.727 | 1.85135 | 40.1 | 2.06 |
| 8 | −6.300 | 1.556 | 1.69895 | 30.1 | 2.06 |
| 9 | 4.365 | 1.975 | 1.55332 | 71.7 | 2.02 |
| 10* | −9.128 | d2 | | | 2.05 |
| 11* | −38.212 | 0.409 | 1.54470 | 56.2 | 1.98 |
| 12* | 6.654 | d3 | | | 1.99 |
| 13* | 141.151 | 1.999 | 1.54470 | 56.2 | 3.05 |
| 14* | −3.872 | 0.370 | | | 3.09 |
| 15 | inf. | 0.210 | 1.51680 | 64.2 | 3.01 |
| 16 | inf. | 0.640 | | | 3.00 |

[Aspherical Coefficient]

First Surface

K = 0.00000E+00, A3 = 0.30415E−03, A4 = 0.93706E−03,
A5 = −0.13316E−03, A6 = −0.72305E−05, A7 = 0.21185E−04,
A8 = 0.24039E−05, A9 = −0.16328E−05, A10 = −0.60887E−06,
A11 = −0.18507E−07, A12 = 0.69414E−07
Second Surface K = 0.00000E+00, A3 = −0.60509E−03, A4 = 0.15194E−02,
A5 = −0.54214E−03, A6 = −0.97458E−05, A7 = 0.32105E−04,
A8 = 0.25701E−04, A9 = 0.45126E−05, A10 = 0.32305E−05,
A11 = −0.13288E−04, A12 = 0.42920E−05
Seventh Surface K = 0.00000E+00, A4 = −0.67308E−03, A6 = −0.20088E−04,
A8 = 0.53569E−05, A10 = −0.10676E−05, A12 = 0.88836E−07
Tenth Surface K = 0.00000E+00, A4 = 0.44341E−03, A6 = 0.96837E−04,
A8 = −0.56452E−04, A10 = 0.12639E−04, A12 = −0.10420E−05
Eleventh Surface K = 0.00000E+00, A3 = −0.95909E−02, A4 = 0.57502E−02,
A5 = −0.34205E−02, A6 = −0.57008E−03, A7 = −0.34815E−03, TABLE 10-continued

[Radius of curvature, surface distance and the like]

A8 = 0.15278E−02, A9 = 0.11811E−03, A10 = −0.48468E−03,
A11 = −0.85866E−05, A12 = 0.69085E−04, A13 = −0.12173E−04,
A14 = 0.14815E−05
Twelfth Surface K = 0.00000E+00, A3 = −0.59580E−02, A4 = 0.34186E−02,
A5 = −0.99786E−02, A6 = 0.80679E−02, A7 = 0.40538E−03,
A8 = −0.25016E−02, A9 = −0.99705E−04, A10 = 0.87888E−03,
A11 = 0.24221E−05, A12 = −0.18726E−03, A13 = 0.95408E−05,
A14 = 0.12534E−04
Thirteenth Surface K = 0.00000E+00, A3 = 0.88270E−02, A4 = −0.12078E−03,
A5 = −0.17833E−02, A6 = 0.50219E−03, A7 = −0.27033E−04,
A8 = −0.84889E−05, A9 = 0.60775E−05, A10 = −0.14033E−05,
A11 = 0.82564E−06, A12 = −0.16128E−06
Fourteenth Surface K = 0.00000E+00, A3 = 0.30019E−01, A4 = 0.10280E−01,
A5 = −0.44236E−02, A6 = −0.48310E−03, A7 = 0.92021E−05,
A8 = 0.10966E−03, A9 = 0.93331E−05, A10 = −0.58663E−05,
A11 = −0.20636E−06, A12 = 0.13950E−06

The focal length (f) of the entire system, F-number (Fno), an angle of view, a diagonal length of the image pickup surface (2Y), and group intervals (d1 to d3) at each of positions (Po) 1 to 3 of the zoom lens in the example 4 are shown in Table 11 below.

TABLE 11

| Po | f | Fno | Angle of View | 2Y |
|---|---|---|---|---|
| 1 | 4.76 | 2.87 | 63.5 | 4.998 |
| 2 | 7.95 | 3.92 | 40.7 | 5.744 |
| 3 | 13.55 | 5.04 | 23.5 | 5.888 |

| Po | d1 | d2 | d3 |
|---|---|---|---|
| 1 | 7.063 | 4.241 | 1.710 |
| 2 | 3.818 | 4.269 | 4.927 |
| 3 | 0.250 | 7.338 | 5.426 |

Data of each of the lens groups of the zoom lens of the example 4 is shown in Table 12 below.

TABLE 12

| Lens Group | First Surface | Focal Length (mm) |
|---|---|---|
| 1 | 1 | −7.42 |
| 2 | 6 | 6.56 |
| 3 | 11 | −10.37 |
| 4 | 13 | 6.95 |

Figure 11A:
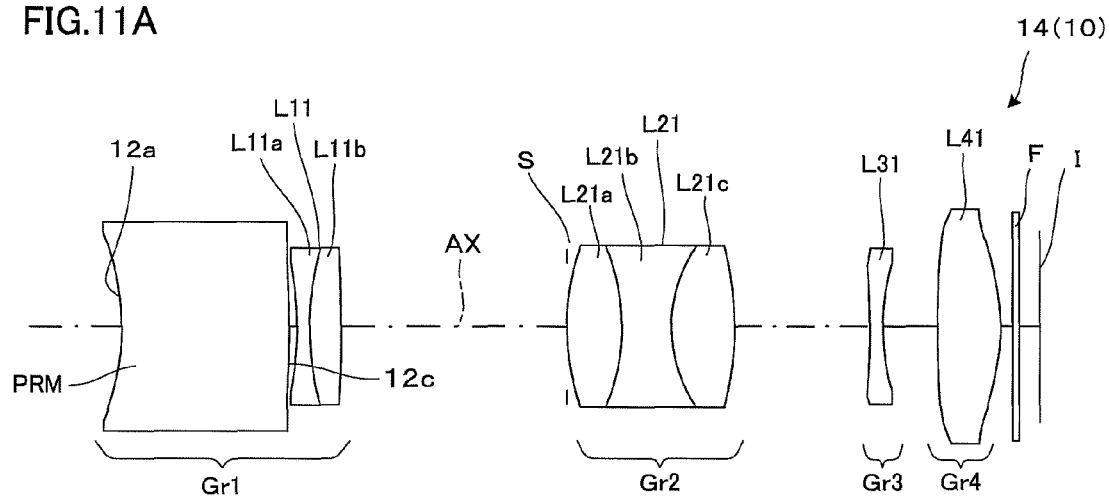
FIG. 11A is a sectional view at the wide-angle end in an example 4.
Figure 11B:
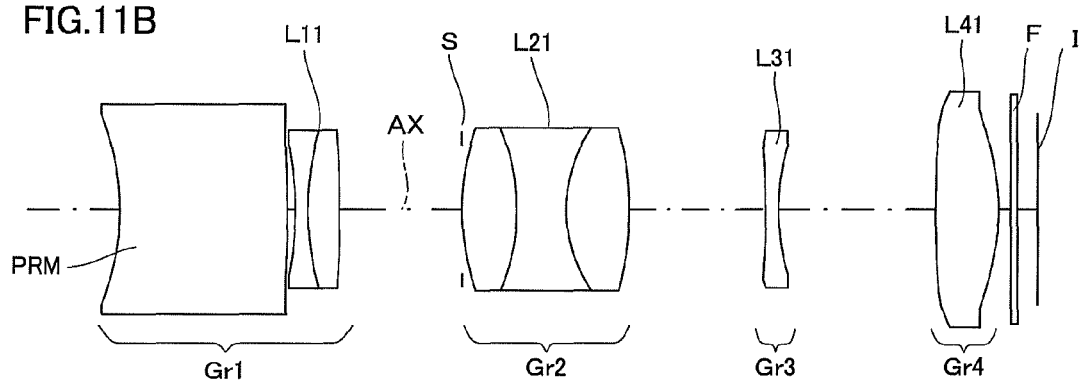
FIG. 11B is a sectional view in the middle.
Figure 11C:
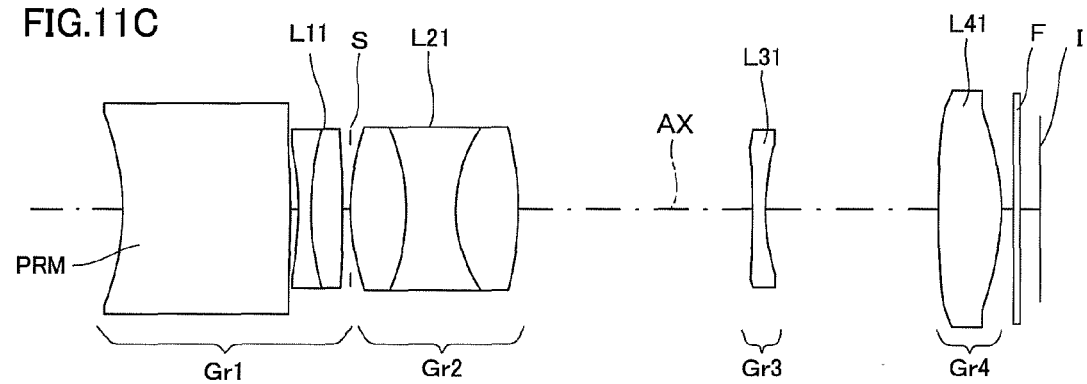
FIG. 11C is a sectional view at the telephoto end.

FIGS. 11A to 11C are sectional views of the zoom lens of the example 4 and illustrate positions of the zoom lens 14 in the example 4 in the zoom operation, respectively. That is, FIG. 11A is a sectional view of the zoom lens 14 at the wide-angle end, FIG. 11B is a sectional view in the middle, and FIG. 11C is a sectional view at the telephoto end.

The zoom lens 14 of the example 4 is composed of the first lens group Gr1, the second lens group Gr2, the third lens group Gr3, and the fourth lens group Gr4 in order from the object side. Here, the first lens group Gr1 includes the catoptric element PRM which is a member with a right angle prism shape having a negative refractive power and the cemented lens L11. Among them, the catoptric element PRM bends a light ray incident to the object side surface 12$a$ which is a concave aspherical surface at a right angle and emits it from the image side surface 12c which is a convex aspherical surface. Moreover, the cemented lens L11 is obtained by cementing the biconcave and negative first lens L11a and the biconvex and positive second lens L11b. The second lens group Gr2 includes the aperture stop S and the cemented lens L21. The cemented lens L21 is obtained by cementing the biconvex and positive third lens L21a, the biconcave and negative fourth lens L21b, and the biconvex and positive fifth lens L21c. The third lens group Gr3 is composed of the biconcave and negative sixth lens L31, and the fourth lens group Gr4 is composed of the substantially plano-convex and positive seventh lens L41 having the convex surface faced with the image side. The zoom lens 14 includes the parallel flat plate F which is a filter or the like in addition to them.

Figure 12A:
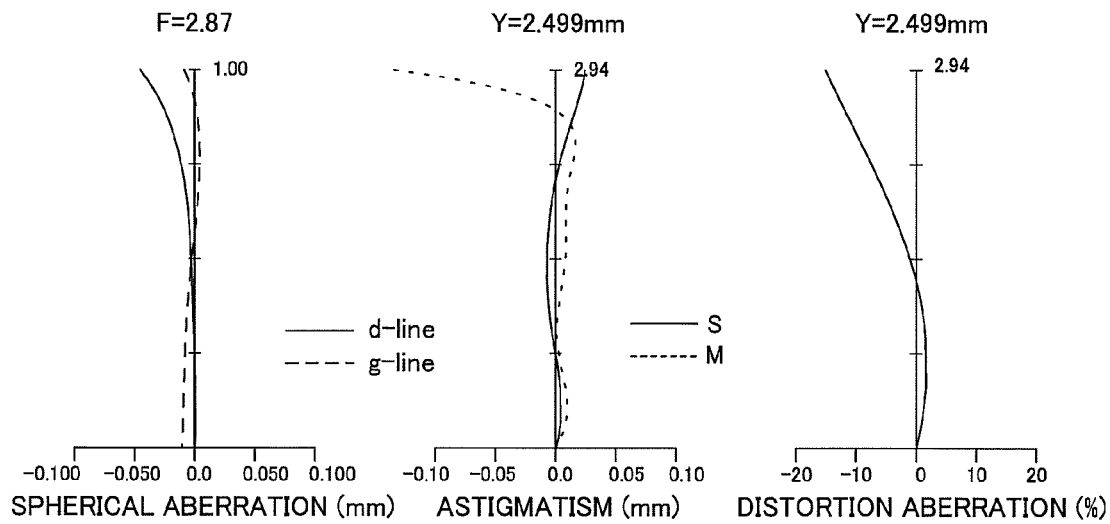
FIG. 12A is an aberration diagram at the wide-angle end in the example 4.
Figure 12B:
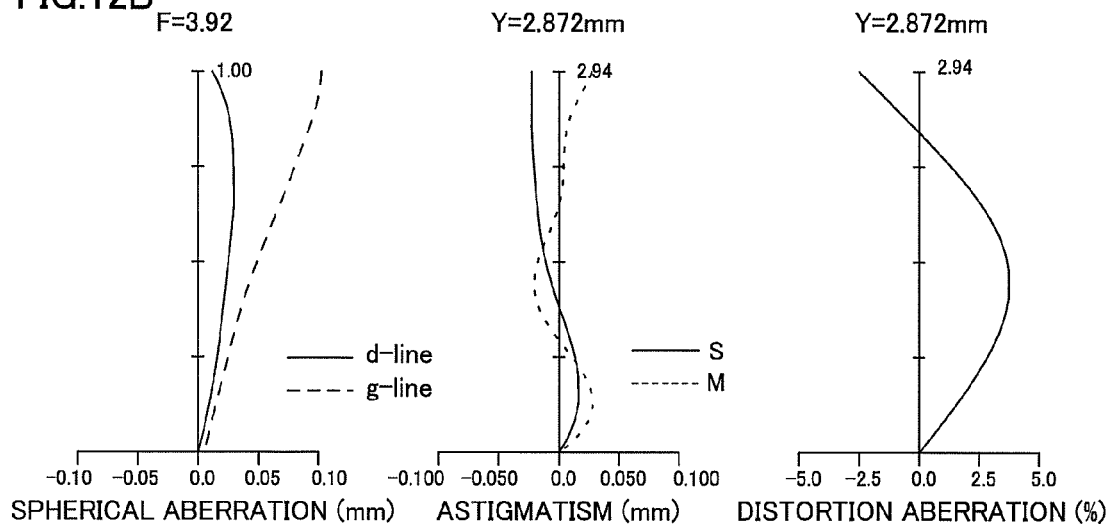
FIG. 12B is an aberration diagram in the middle.
Figure 12C:
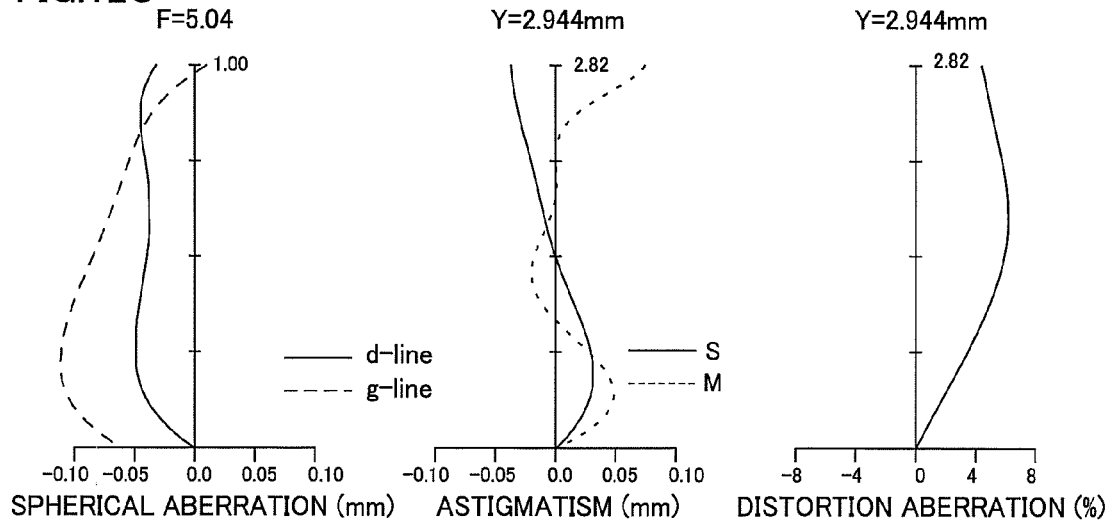
FIG. 12C is an aberration diagram at the telephoto end.

FIG. 12A is an aberration diagram (spherical aberration, astigmatism, and distortion aberration) at the wide-angle end of the to zoom lens 14, FIG. 12B is an aberration diagram (spherical aberration, astigmatism, and distortion aberration) in the middle, and FIG. 12C is an aberration diagram (spherical aberration, astigmatism, and distortion aberration) at the telephoto end.

In the zoom lens 14 of the example 4, the second lens group Gr2 moves to the object side along the optical axis AX direction during magnification change from the wide-angle end to the telephoto end and the third lens group Gr3 moves along the optical axis AX direction. The other lens groups Gr1 and Gr4 are fixed during magnification change, and magnification change can be realized by changing the interval between each of the lens groups Gr1 to Gr4. Moreover, by moving the third lens group Gr3, focusing from infinity to a finite distance can be performed. It is assumed that the third lens L21a and the fifth lens L21c are glass mold lenses, the sixth lens L31 and the seventh lens L41 are plastic lenses, and the other lenses are polished lenses made of a glass material. The catoptric element PRM is assumed to be formed of a plastic material.

Example 5

Basic features of a zoom lens of an example 5 are as follows:
Zoom ratio: 2.85
Lens entire length: 26.68
d11: 2.520
Lens data of the example 5 is shown in Table 13.

TABLE 13

[Radius of curvature, surface distance and the like]

| Surf. N | R(mm) | D(mm) | Nd | vd | effective radius (mm) |
|---|---|---|---|---|---|
| 1 | −13.446 | 5.520 | 2.00100 | 29.1 | 2.98 |
| 2 | inf. | 0.267 | | | 2.19 |
| 3 | −14.169 | 0.444 | 1.88100 | 40.1 | 2.16 |
| 4 | 7.945 | 1.082 | 1.92286 | 20.9 | 2.10 |
| 5 | −75.652 | d1 | | | 2.04 |
| 6(stop) | inf. | 0.000 | | | 1.83 |
| 7* | 5.169 | 1.501 | 1.85135 | 40.1 | 1.91 |
| 8 | −6.525 | 0.400 | 1.69895 | 30.1 | 1.86 |
| 9 | 3.529 | 1.755 | 1.55332 | 71.7 | 1.76 |
| 10* | −11.612 | d2 | | | 1.71 |
| 11* | 43.503 | 0.300 | 1.54470 | 56.2 | 1.71 |
| 12* | 3.813 | d3 | | | 1.72 |
| 13* | −126.616 | 1.824 | 1.54470 | 56.2 | 3.10 |
| 14* | −5.417 | 2.151 | | | 3.18 |
| 15 | inf. | 0.210 | 1.51680 | 64.2 | 2.99 |
| 16 | inf. | 0.640 | | | 2.98 |

TABLE 13-continued

[Radius of curvature, surface distance and the like]

[Aspherical Coefficient]

Seventh Surface

K = 0.00000E+00, A4 = −0.87692E−03, A6 = 0.16829E−03, A8 = −0.84290E−04, A10 = 0.18603E−04, A12 = −0.15379E−05
Tenth Surface K = 0.00000E+00, A4 = 0.24303E−02, A6 = 0.31616E−03, A8 = −0.20108E−03, A10 = 0.56246E−04, A12 = −0.53437E−05
Eleventh Surface K = 0.00000E+00, A4 = −0.51291E−02, A6 = 0.34615E−02, A8 = −0.74235E−03, A10 = −0.97684E−03, A12 = 0.57324E−03, A14 = −0.86845E−04
Twelfth Surface K = 0.00000E+00, A4 = −0.69461E−02, A6 = 0.54279E−02, A8 = −0.22337E−02, A10 = −0.35815E−03, A12 = 0.44179E−03, A14 = −0.75570E−04
Thirteenth Surface K = 0.00000E+00, A4 = 0.39213E−03, A6 = 0.27314E−03, A8 = −0.19763E−04, A10 = −0.70509E−06, A12 = 0.10416E−06
Fourteenth Surface K = 0.00000E+00, A4 = 0.22495E−02, A6 = 0.51919E−06, A8 = 0.29743E−04, A10 = −0.49330E−05, A12 = 0.23231E−06

The focal length (f) of the entire system, F-number (Fno), an angle of view, a diagonal length of the image pickup surface (2Y), and group intervals (d1 to d3) at each of positions (Po) 1 to 3 of the zoom lens in the example 5 are shown in Table 14 below.

TABLE 14

| Po | f | Fno | Angle of View | 2Y |
|---|---|---|---|---|
| 1 | 4.76 | 2.88 | 63.5 | 5.002 |
| 2 | 7.94 | 3.89 | 40.7 | 5.704 |
| 3 | 13.56 | 5.11 | 24.2 | 5.888 |

| Po | d1 | d2 | d3 |
|---|---|---|---|
| 1 | 6.792 | 2.232 | 1.563 |
| 2 | 3.479 | 2.434 | 4.674 |
| 3 | 0.250 | 4.057 | 6.280 |

Data of each of the lens groups of the zoom lens of the example 5 is shown in Table 15 below.

TABLE 15

| Lens Group | First Surface | Focal Length (mm) |
|---|---|---|
| 1 | 1 | −7.84 |
| 2 | 6 | 5.49 |
| 3 | 11 | −7.69 |
| 4 | 13 | 10.34 |

Figure 13A:
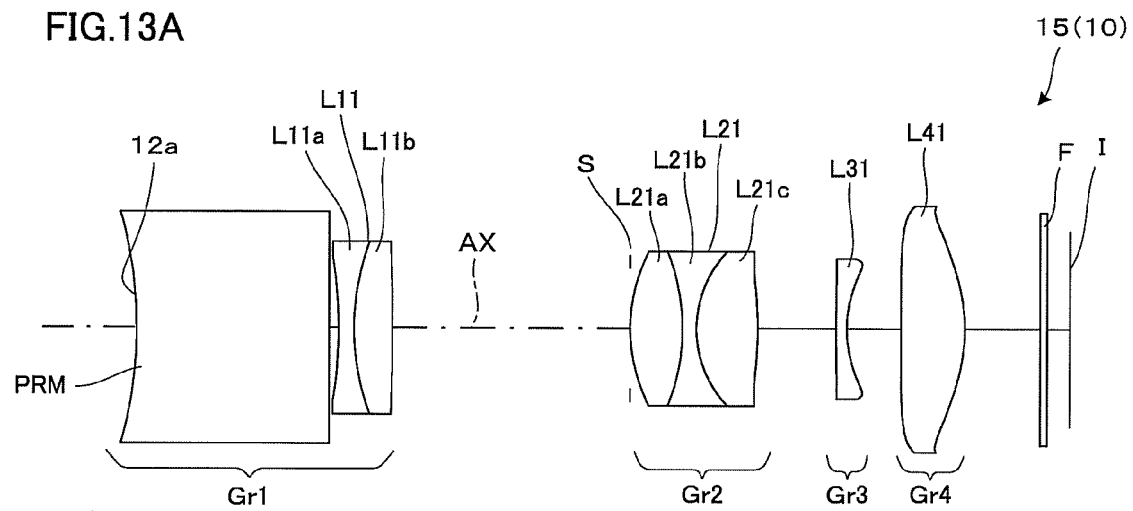
FIG. 13A is a sectional view at the wide-angle end in an example 5.
Figure 13B:
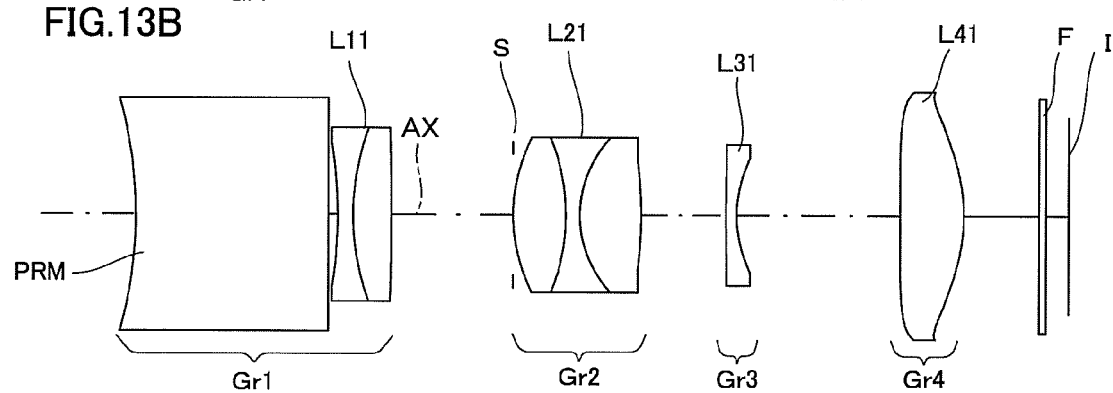
FIG. 13B is a sectional view in the middle.
Figure 13C:
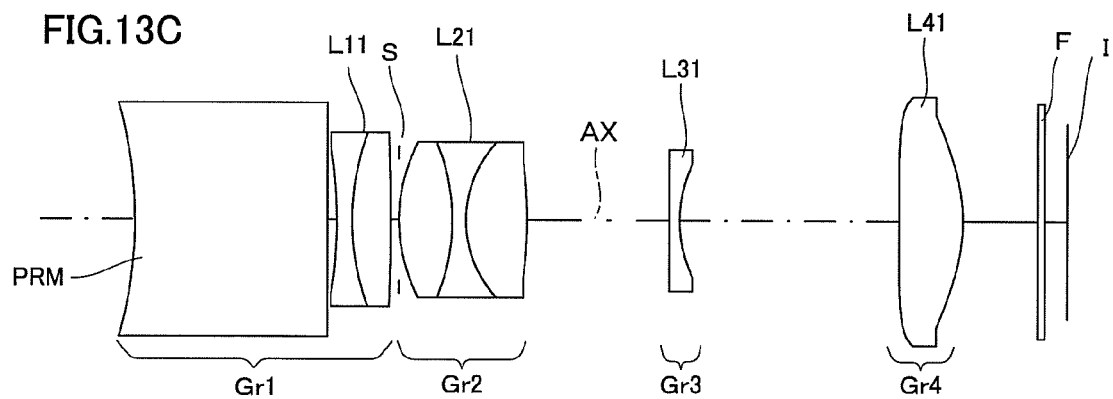
FIG. 13C is a sectional view at the telephoto end.

FIGS. 13A to 13C are sectional views of the zoom lens of the example 5 and illustrate positions of the zoom lens 15 in the example 5 in the zoom operation, respectively. That is, FIG. 13A is a sectional view of the zoom lens 15 at the wide-angle end, FIG. 13B is a sectional view in the middle, and FIG. 13C is a sectional view at the telephoto end.

The zoom lens 15 of the example 5 is composed of the first lens group Gr1, the second lens group Gr2, the third lens group Gr3, and the fourth lens group Gr4 in order from the object side. Here, the first lens group Gr1 includes the catoptric element PRM which is a member with a right angle prism shape having a negative refractive power and the cemented lens L11. Among them, the catoptric element PRM bends a light ray incident to the object side surface 12a which is a concave surface at a right angle. Moreover, the cemented lens L11 is obtained by cementing the biconcave and negative first lens L11a and the biconvex and positive second lens L11b. The second lens group Gr2 includes the aperture stop S and the cemented lens L21. The cemented lens L21 is obtained by cementing the biconvex and positive third lens L21a, the biconcave and negative fourth lens L21b, and the biconvex and positive fifth lens L21c. The third lens group Gr3 is composed of the convex to the object side and negative meniscus sixth lens L31, and the fourth lens group Gr4 is composed of the substantially plano-convex and positive seventh lens L41 having the convex surface faced with the image side. The zoom lens 15 includes the parallel flat plate F which is a filter or the like in addition to them.

Figure 14A:
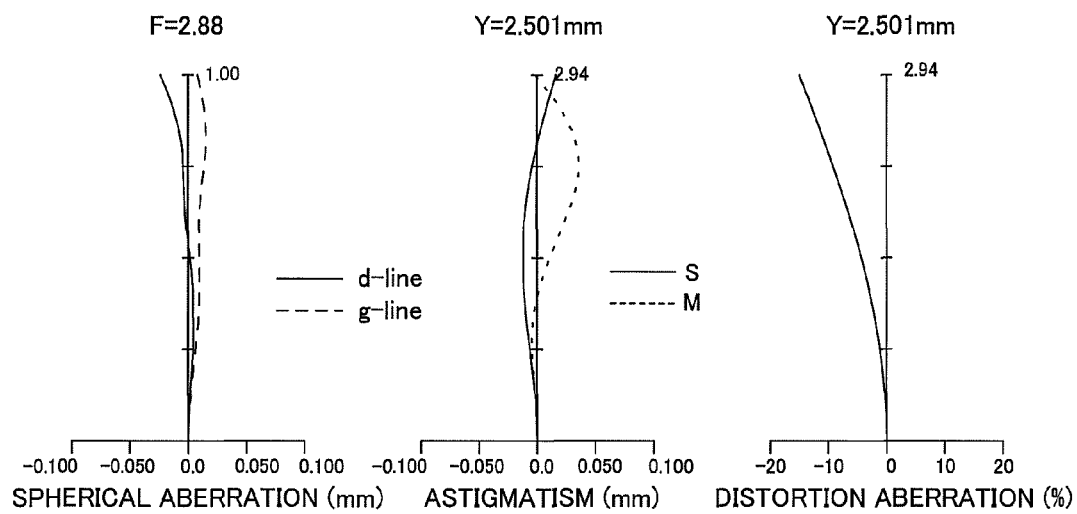
FIG. 14A is an aberration diagram at the wide-angle end in the example 5.
Figure 14B:
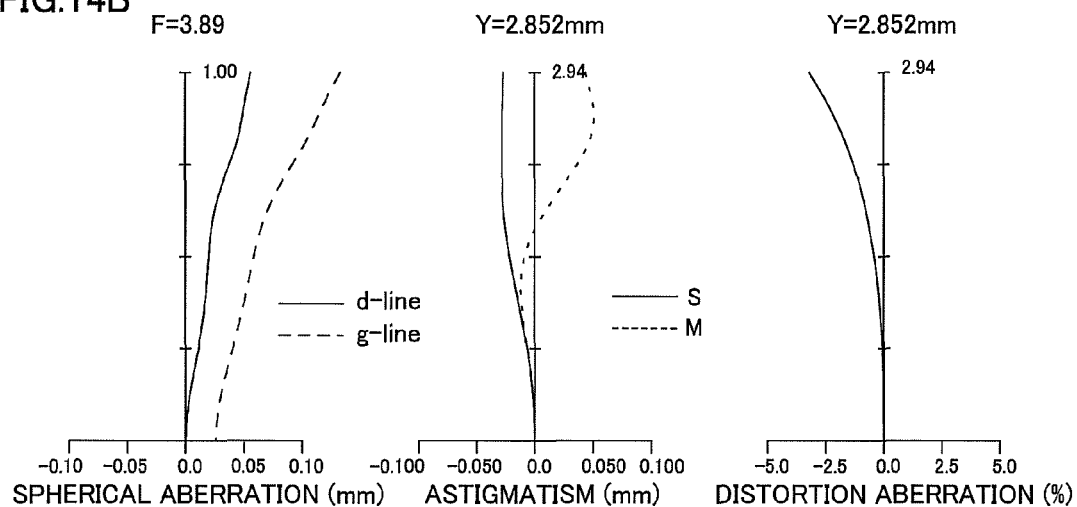
FIG. 14B is an aberration diagram in the middle.
Figure 14C:
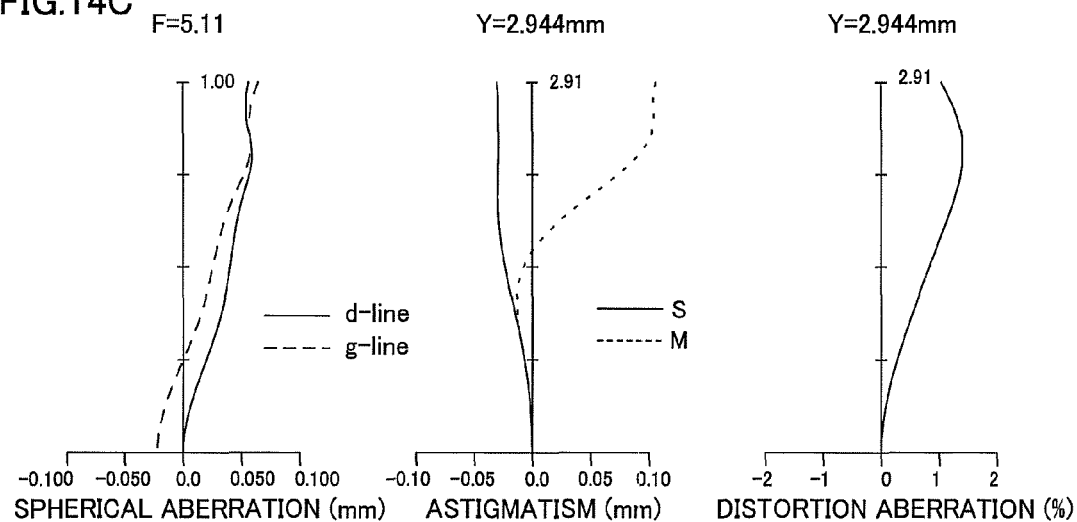
FIG. 14C is an aberration diagram at the telephoto end.

FIG. 14A is an aberration diagram (spherical aberration, astigmatism, and distortion aberration) at the wide-angle end of the zoom lens 15, FIG. 14B is an aberration diagram (spherical aberration, astigmatism, and distortion aberration) in the middle, and FIG. 14C is an aberration diagram (spherical aberration, astigmatism, and distortion aberration) at the telephoto end.

In the zoom lens 15 of the example 5, the second lens group Gr2 moves to the object side along the optical axis AX direction during magnification change from the wide-angle end to the telephoto end and the third lens group Gr3 moves along the optical axis AX direction. The other lens groups Gr1 and Gr4 are fixed during magnification change, and magnification change can be realized by changing the interval between each of the lens groups Gr1 to Gr4. Moreover, by moving the third lens group Gr3, focusing from infinity to a finite distance can be performed. It is assumed that the third lens L21a and the fifth lens L21c are glass mold lenses, the sixth lens L31 and the seventh lens L41 are plastic lenses, and the other lenses are polished lenses made of a glass material.

Example 6

Basic features of a zoom lens of an example 6 are as follows:
Zoom ratio: 2.85
Lens entire length: 26.905
d11: 2.505
Lens data of the example 6 is shown in Table 16.

TABLE 16

[Radius of curvature, surface distance and the like]

| Surf. N | R(mm) | D(mm) | Nd | vd | effective radius (mm) |
|---|---|---|---|---|---|
| 1 | −12.889 | 5.505 | 2.00100 | 29.1 | 2.96 |
| 2 | inf. | 0.260 | | | 2.19 |
| 3 | −14.798 | 0.431 | 1.72916 | 54.7 | 2.17 |
| 4 | 8.822 | 0.871 | 1.92286 | 20.9 | 2.10 |
| 5* | 81.248 | d1 | | | 2.03 |
| 6(stop) | inf. | 0.000 | | | 1.81 |
| 7* | 5.545 | 1.497 | 1.88202 | 37.2 | 1.89 |
| 8 | −5.838 | 0.400 | 1.69895 | 30.1 | 1.86 |
| 9 | 3.147 | 1.923 | 1.55332 | 71.7 | 1.77 |
| 10* | −12.326 | d2 | | | 1.75 |
| 11* | 22.208 | 0.600 | 1.54470 | 56.2 | 1.77 |
| 12* | 4.108 | d3 | | | 1.75 |
| 13* | −16.339 | 1.645 | 1.54470 | 56.2 | 2.95 |

TABLE 16-continued

[Radius of curvature, surface distance and the like]

| | | | | | |
|---|---|---|---|---|---|
| 14* | −4.443 | 2.255 | | | 3.06 |
| 15 | inf. | 0.210 | 1.51680 | 64.2 | 2.96 |
| 16 | inf. | 0.640 | | | 2.96 |

[Aspherical Coefficient]

Fifth Surface

K = 0.00000E+00, A4 = −0.68918E−05, A6 = −0.33667E−04,
A8 = 0.27741E−04, A10 = −0.73213E−05, A12 = 0.68653E−06
Seventh Surface K = 0.00000E+00, A4 = −0.77433E−03, A6 = −0.10230E−03,
A8 = 0.59375E−04, A10 = −0.16900E−04, A12 = 0.17207E−05
Tenth Surface K = 0.00000E+00, A4 = 0.19917E−02, A6 = −0.26111E−03,
A8 = 0.15949E−03, A10 = −0.56655E−04, A12 = 0.73203E−05
Eleventh Surface K = 0.00000E+00, A4 = −0.25429E−02, A6 = 0.16094E−02,
A8 = −0.68504E−03, A10 = 0.76711E−05, A12 = 0.45683E−04,
A14 = −0.57687E−05
Twelfth Surface K = 0.00000E+00, A4 = −0.36850E−02, A6 = 0.23568E−02,
A8 = −0.12634E−02, A10 = 0.26332E−03, A12 = −0.12637E−04,
A14 = −0.29213E−06
Thirteenth Surface K = 0.00000E+00, A4 = −0.50568E−03, A6 = 0.45863E−03,
A8 = −0.55366E−04, A10 = 0.35663E−05, A12 = −0.54453E−07
Fourteenth Surface K = 0.00000E+00, A4 = 0.25747E−02, A6 = 0.16404E−03,
A8 = 0.26729E−06, A10 = −0.16367E−05, A12 = 0.13692E−06

The focal length (f) of the entire system, F-number (Fno), an angle of view, a diagonal length of image pickup surface (2Y), and group intervals (d1 to d3) at each of positions (Po) 1 to 3 of the zoom lens in the example 6 are shown in Table 17 below.

TABLE 17

| Po | f | Fno | Angle of View | 2Y |
|---|---|---|---|---|
| 1 | 4.76 | 2.88 | 63.4 | 5.004 |
| 2 | 7.94 | 3.87 | 40.7 | 5.786 |
| 3 | 13.57 | 5.08 | 23.7 | 5.888 |

| Po | d1 | d2 | d3 |
|---|---|---|---|
| 1 | 6.902 | 1.859 | 1.908 |
| 2 | 3.523 | 1.951 | 5.195 |
| 3 | 0.250 | 3.751 | 6.668 |

Data of each of the lens groups of the zoom lens of the example 6 is shown in Table 18 below.

TABLE 18

| Lens Group | First Surface | Focal Length (mm) |
|---|---|---|
| 1 | 1 | −7.96 |
| 2 | 6 | 5.65 |
| 3 | 11 | −9.36 |
| 4 | 13 | 10.68 |

Figure 15A:
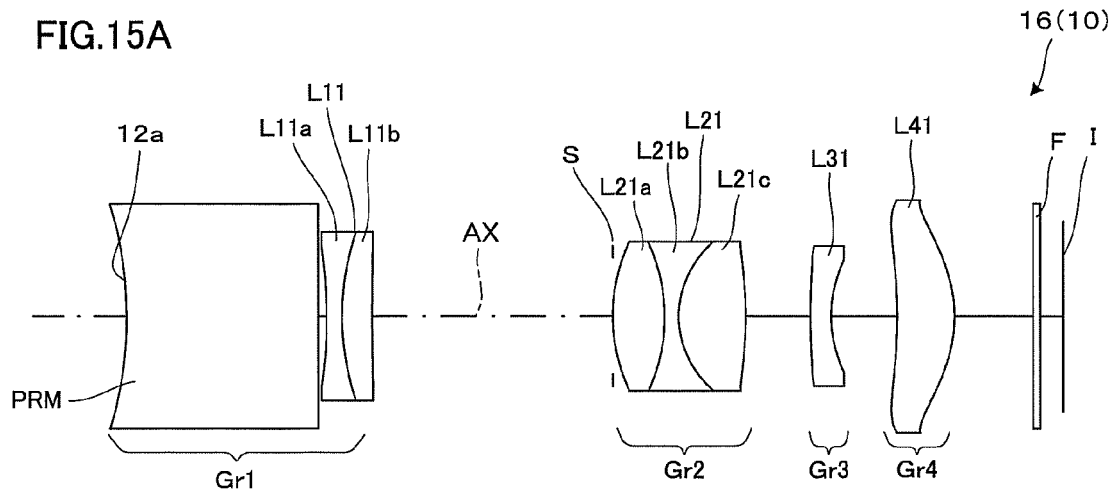
FIG. 15A is a sectional view at the wide-angle end in an example 6.
Figure 15B:
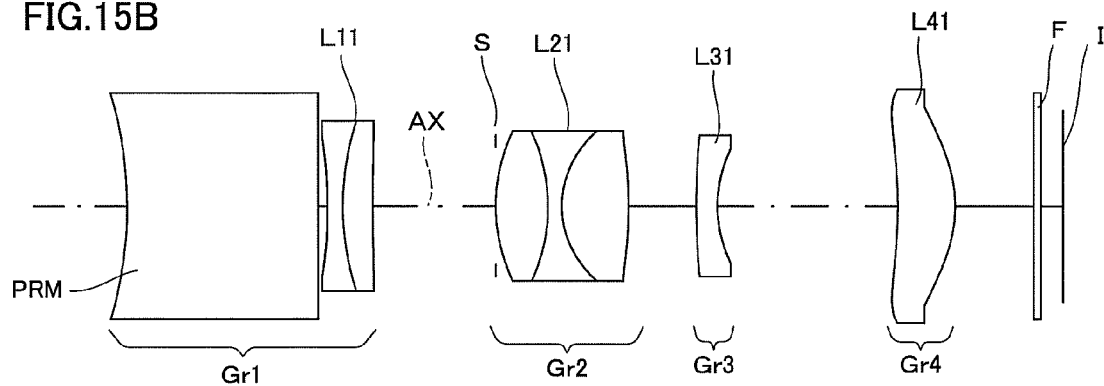
FIG. 15B is a sectional view in the middle.
Figure 15C:
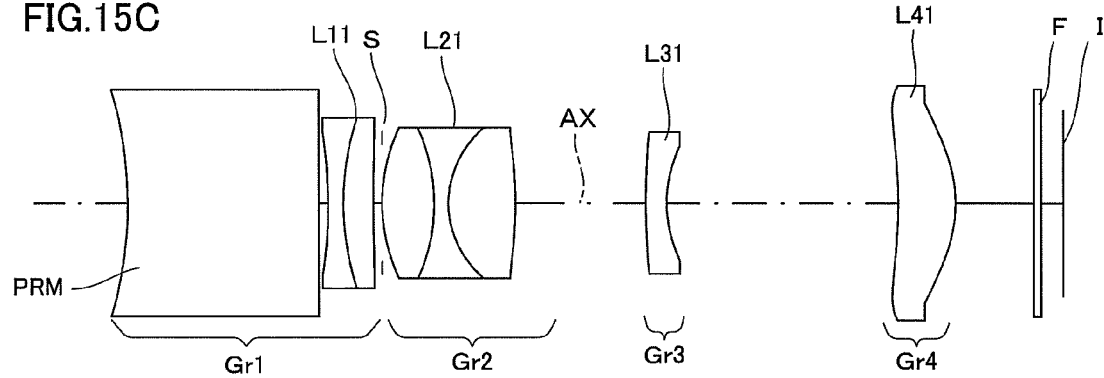
FIG. 15C is a sectional view at the telephoto end.

FIGS. 15A to 15C are sectional views of the zoom lens of the example 6 and illustrate positions of the zoom lens 16 in the example 6 in the zoom operation, respectively. That is, FIG. 15A is a sectional view of the zoom lens 16 at the wide-angle end, FIG. 15B is a sectional view in the middle, and FIG. 15C is a sectional view at the telephoto end.

The zoom lens 16 of the example 6 is composed of the first lens group Gr1, the second lens group Gr2, the third lens group Gr3, and the fourth lens group Gr4 in order from the object side. Here, the first lens group Gr1 includes the catoptric element PRM which is a member with a right angle prism shape having a negative refractive power and the cemented lens L11. Among them, the catoptric element PRM bends a light ray incident to the object side surface 12a which is a concave surface at a right angle. Moreover, the cemented lens L11 is obtained by cementing the biconcave and negative first lens L11a and the biconvex and positive second lens L11b. The second lens group Gr2 includes the aperture stop S and the cemented lens L21. The cemented lens L21 is obtained by cementing the biconvex and positive third lens L21a, the biconcave and negative fourth lens L21b, and the biconvex and positive fifth lens L21c. The third lens group Gr3 is composed of the convex to the object side and negative meniscus sixth lens L31, and the fourth lens group Gr4 is composed of the convex to the image side and positive meniscus seventh lens L41. The zoom lens 16 includes the parallel flat plate F which is a filter or the like in addition to them.

Figure 16A:
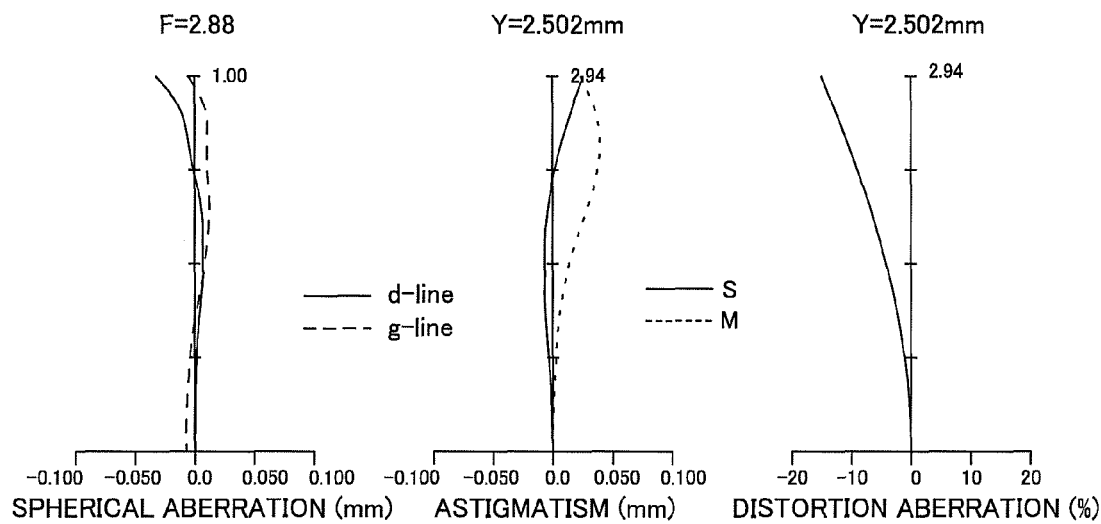
FIG. 16A is an aberration diagram at the wide-angle end in the example 6.
Figure 16B:
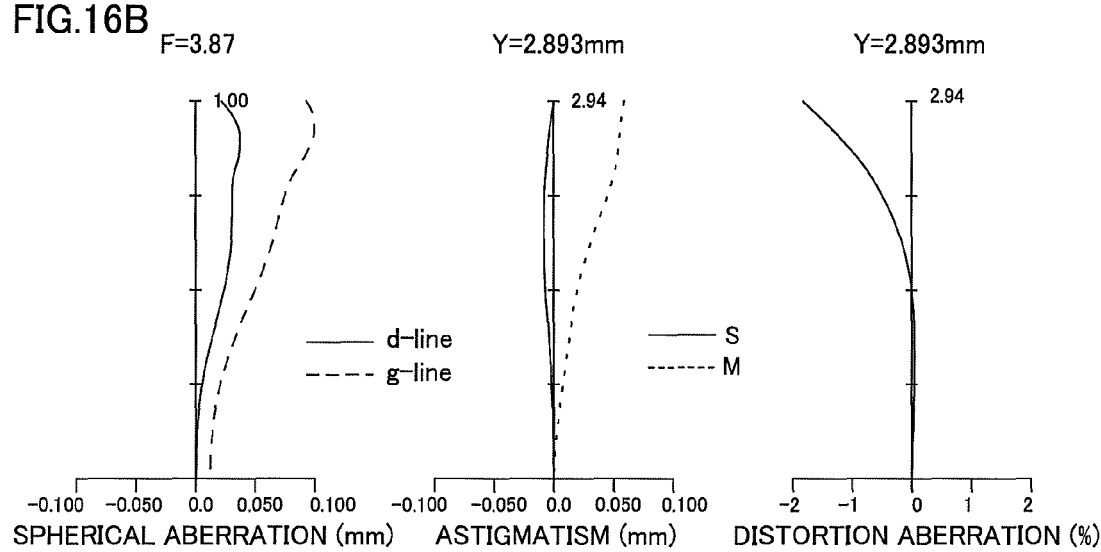
FIG. 16B is an aberration diagram in the middle.
Figure 16C:
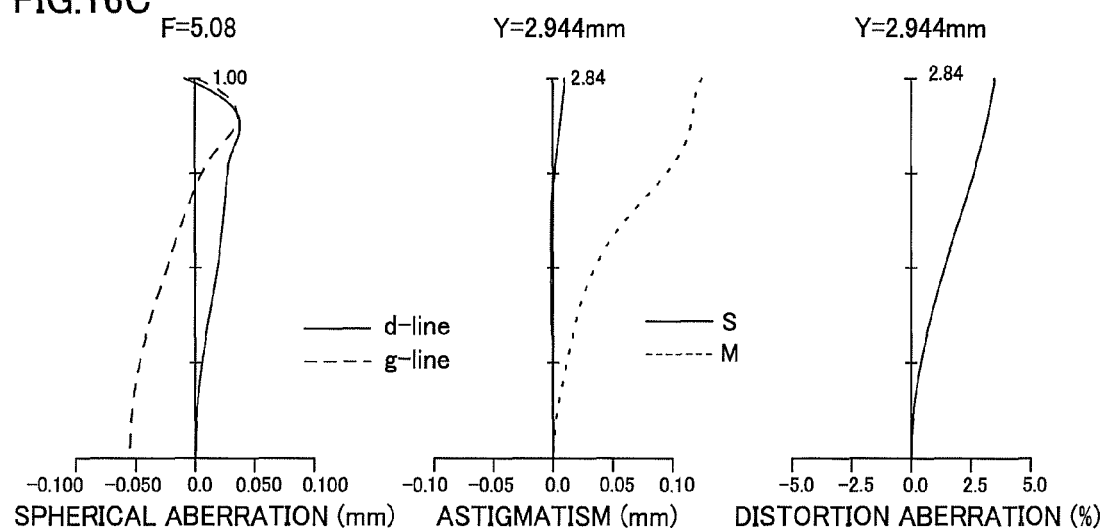
FIG. 16C is an aberration diagram at the telephoto end.

FIG. 16A is an aberration diagram (spherical aberration, astigmatism, and distortion aberration) at the wide-angle end of the zoom lens 16, FIG. 16B is an aberration diagram (spherical aberration, astigmatism, and distortion aberration) in the middle, and FIG. 16C is an aberration diagram (spherical aberration, astigmatism, and distortion aberration) at the telephoto end.

In the zoom lens 16 of the example 6, the second lens group Gr2 moves to the object side along the optical axis AX direction during magnification change from the wide-angle end to the telephoto end and the third lens group Gr3 moves along the optical axis AX direction. The other lens groups Gr1 and Gr4 are fixed during magnification change, and magnification change can be realized by changing the interval between each of the lens groups Gr1 to Gr4. Moreover, by moving the third lens group Gr3, focusing from infinity to a finite distance can be performed. It is assumed that the second lens L11b, the third lens L21a, and the fifth lens L21c are glass mold lenses, the sixth lens L31 and the seventh lens L41 are plastic lenses, and the other lenses are polished lenses made of a glass material.

Example 7

Basic features of a zoom lens of an example 7 are as follows:
Zoom ratio: 2.85
Lens entire length: 50.000
d11: 6.283
Lens data of the example 7 is shown in Table 19.

TABLE 19

[Radius of curvature, surface distance and the like]

| Surf. N | R(mm) | D(mm) | Nd | vd | effective radius (mm) |
|---|---|---|---|---|---|
| 1* | 33.582 | 0.500 | 1.69350 | 53.2 | 4.97 |
| 2* | 5.674 | 2.100 | | | 4.13 |
| 3 | inf. | 7.367 | 1.84666 | 23.8 | 4.07 |
| 4 | inf. | 1.570 | | | 3.38 |
| 5 | −11.041 | 0.800 | 1.74077 | 27.8 | 3.19 |
| 6 | 10.789 | 2.107 | 1.84666 | 23.8 | 3.25 |
| 7 | −15.868 | d1 | | | 3.26 |

TABLE 19-continued

[Radius of curvature, surface distance and the like]

| | | | | | |
|---|---|---|---|---|---|
| 8(stop) | inf. | 0.000 | | | 3.06 |
| 9* | 5.746 | 2.898 | 1.59201 | 67.0 | 3.17 |
| 10 | 13.033 | 1.569 | 1.91082 | 35.3 | 2.98 |
| 11 | 4.596 | 2.717 | 1.49710 | 81.6 | 2.75 |
| 12* | −20.472 | d2 | | | 2.86 |
| 13 | −9.606 | 0.600 | 1.51680 | 64.2 | 3.05 |
| 14 | −45.237 | 0.300 | | | 3.21 |
| 15* | 23.963 | 1.799 | 1.49710 | 81.6 | 3.32 |
| 16* | −8.673 | d3 | | | 3.47 |
| 17 | inf. | 0.500 | 1.51680 | 64.2 | 3.09 |
| 18 | inf. | 1.066 | | | 3.06 |

[Aspherical Coefficient]

First Surface

K = 0.00000E+00, A4 = 0.22504E−03, A6 = 0.99592E−05,
A8 = −0.40416E−06, A10 = 0.48764E−08

Second Surface

K = 0.00000E+00, A4 = −0.57120E−04, A6 = 0.81611E−05,
A8 = 0.18221E−06, A10 = −0.21702E−07

Ninth Surface

K = 0.00000E+00, A4 = −0.23169E−03, A6 = −0.53384E−05,
A8 = 0.14788E−06, A10 = −0.12215E−07

Twelfth Surface

K = 0.00000E+00, A4 = 0.62284E−03, A6 = 0.16555E−04,
A8 = 0.94622E−06, A10 = 0.72847E−07

Fifteenth Surface

K = 0.00000E+00, A4 = −0.65137E−03, A6 = −0.36076E−04,
A8 = 0.39978E−05, A10 = −0.40918E−06

Sixteenth Surface

K = 0.00000E+00, A4 = −0.33503E−03, A6 = −0.28457E−04,
A8 = 0.29327E−05, A10 = 0.29755E−06

The focal length (f) of the entire system, F-number (Fno), an angle of view, a diagonal length of image pickup surface (2Y), and group intervals (d1 to d3) at each of positions (Po) 1 to 3 of the zoom lens in the example 7 are shown in Table 20 below.

TABLE 20

| Po | f | Fno | Angle of View | 2Y |
|---|---|---|---|---|
| 1 | 4.74 | 2.60 | 65.8 | 5.888 |
| 2 | 7.91 | 3.74 | 41.5 | 5.888 |
| 3 | 13.50 | 5.06 | 24.7 | 5.888 |

| Po | d1 | d2 | d3 |
|---|---|---|---|
| 1 | 13.869 | 2.862 | 7.376 |
| 2 | 8.674 | 13.157 | 2.277 |
| 3 | 1.844 | 20.989 | 1.275 |

Data of each of the lens groups of the zoom lens of the example 7 is shown in Table 21 below.

TABLE 21

| Lens Group | First Surface | Focal Length (mm) |
|---|---|---|
| 1 | 1 | −11.22 |
| 2 | 8 | 13.60 |
| 3 | 13 | 25.00 |

Figure 17A:
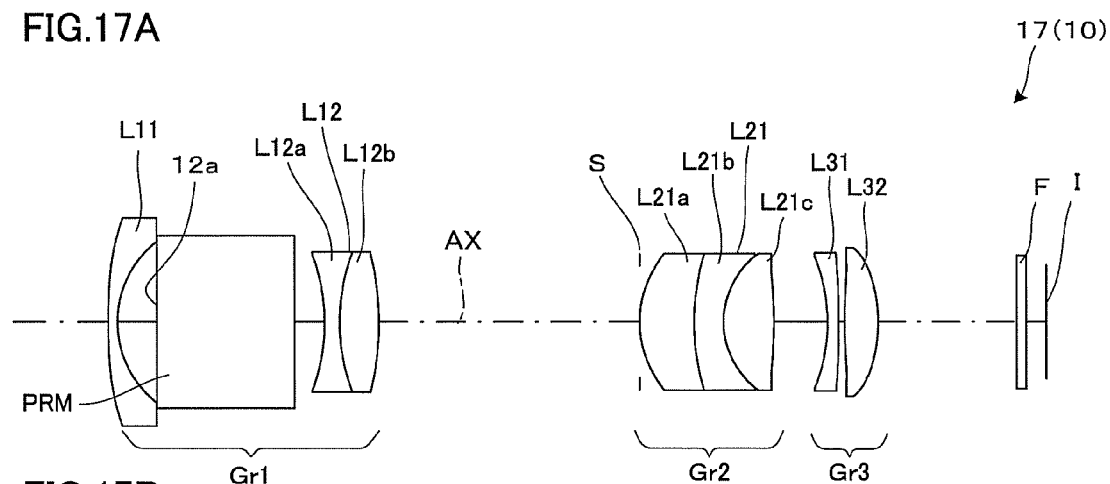
FIG. 17A is a sectional view at the wide-angle end in an example 7.
Figure 17B:
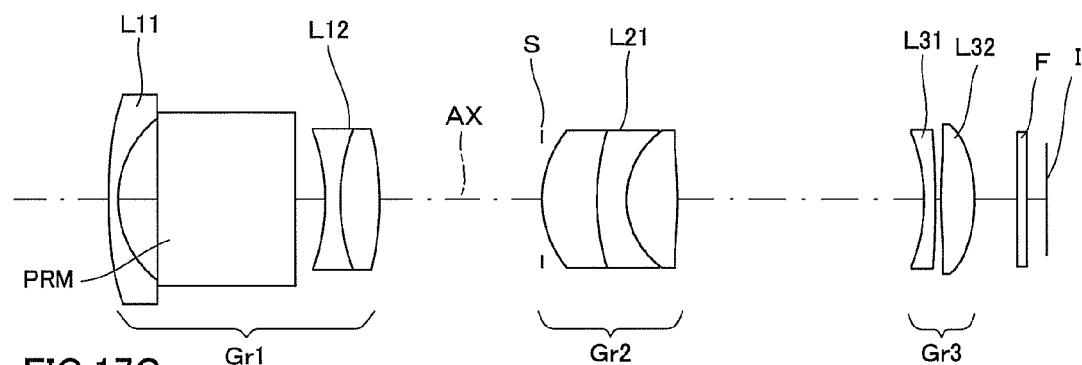
FIG. 17B is a sectional view in the middle.
Figure 17C:
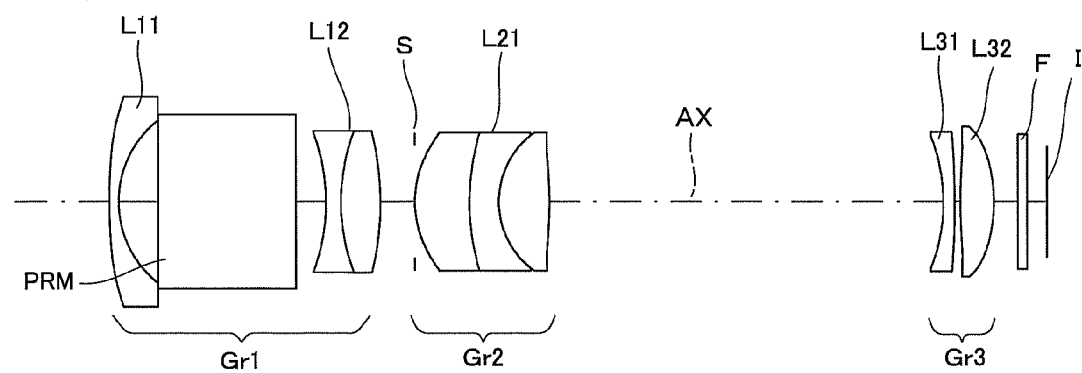
FIG. 17C is a sectional view at the telephoto end.

FIGS. 17A to 17C are sectional views of the zoom lens of the example 7 and illustrate positions of the zoom lens 17 in the example 7 in the zoom operation, respectively. That is, FIG. 17A is a sectional view of the zoom lens 17 at the wide-angle end, FIG. 17B is a sectional view in the middle, and FIG. 17C is a sectional view at the telephoto end.

The zoom lens 17 of the example 7 is composed of the first lens group Gr1, the second lens group Gr2, and the third lens group Gr3 in order from the object side. Here, the first lens group Gr1 includes the convex to the object side and negative meniscus first lens L11, the catoptric element PRM which is a right angle prism substantially not having a refractive power, and the cemented lens L12. Among them, the catoptric element PRM bends a light ray incident to the object side surface 12a which is a flat surface at a right angle. Moreover, the cemented lens L12 is obtained by cementing the biconcave and negative second lens L12a and the biconvex and positive third lens L12b. The second lens group Gr2 includes the aperture stop S and the cemented lens L21. The cemented lens L21 is obtained by cementing the convex to the object side and positive meniscus fourth lens L21a, the convex and negative meniscus fifth lens L21b, and the biconvex and positive sixth lens L21c. The third lens group Gr3 is composed of the convex to the image side and negative meniscus seventh lens L31 and the biconvex and positive eighth lens L41. The zoom lens 17 includes the parallel flat plate F which is a filter or the like in addition to them.

Figure 18A:
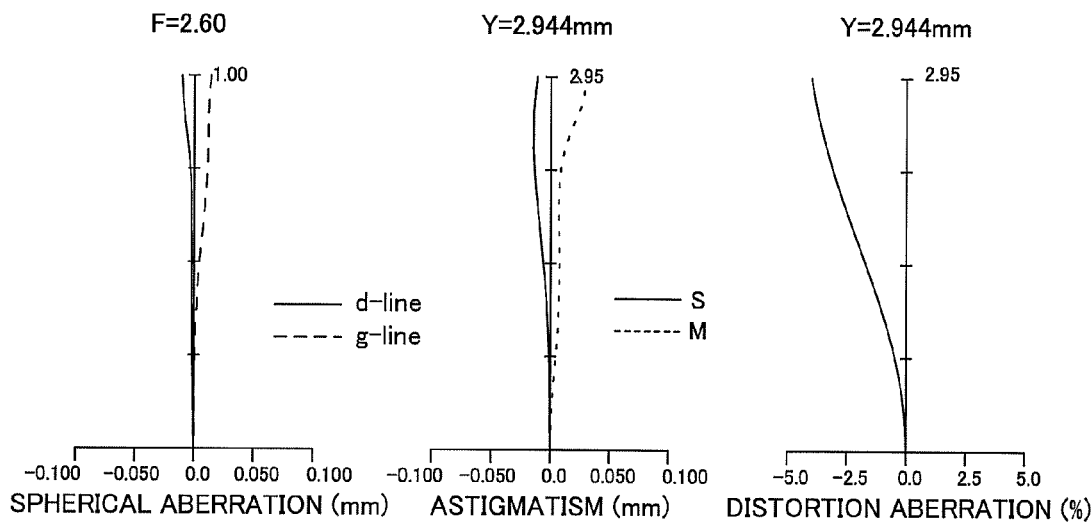
FIG. 18A is an aberration diagram at the wide-angle end in the example 7.
Figure 18B:
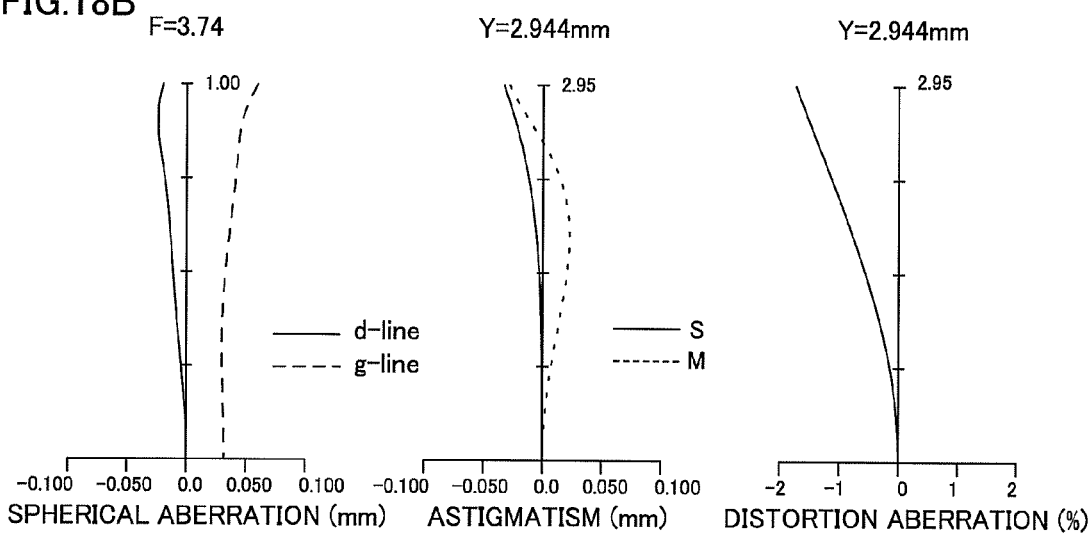
FIG. 18B is an aberration diagram in the middle.
Figure 18C:
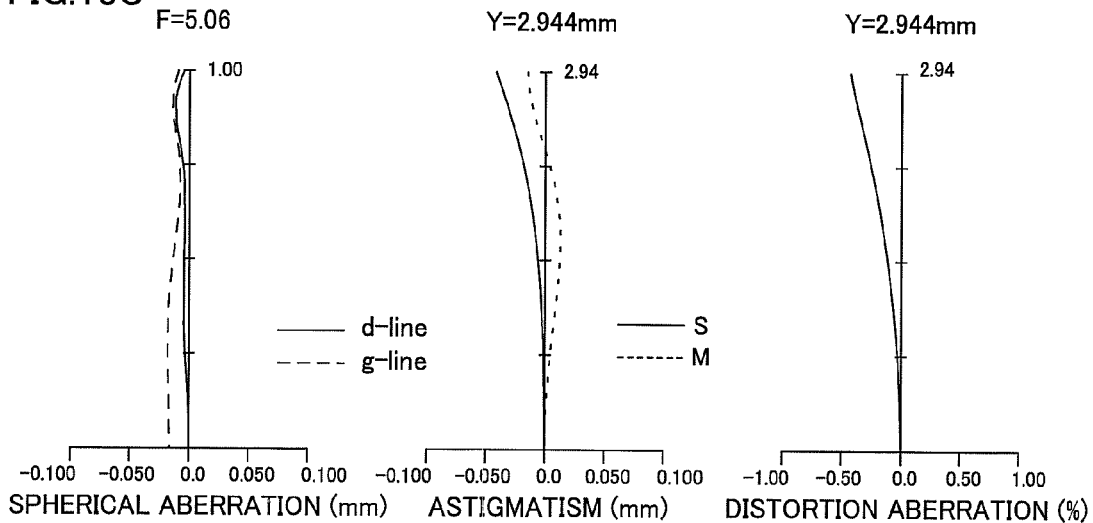
FIG. 18C is an aberration diagram at the telephoto end.

FIG. 18A is an aberration diagram (spherical aberration, astigmatism, and distortion aberration) at the wide-angle end of the zoom lens 17, FIG. 18B is an aberration diagram (spherical aberration, astigmatism, and distortion aberration) in the middle, and FIG. 18C is an aberration diagram (spherical aberration, astigmatism, and distortion aberration) at the telephoto end.

In the zoom lens 17 of the example 7, the second lens group Gr2 moves to the object side along the optical axis AX direction during magnification change from the wide-angle end to the telephoto end and the third lens group Gr3 moves along the optical axis AX direction. The remaining lens group Gr1 is fixed during magnification change, and magnification change can be realized by changing the interval between each of the lens groups Gr1 to Gr3. Moreover, by moving the third lens group Gr3, focusing from infinity to a finite distance can be performed. It is assumed that the first lens L11, the fourth lens L21a, the sixth lens L21c, and the eighth lens L41 are glass mold lenses, and the other lenses are polished lenses made of a glass material. In Example 7, by means of movement of the first lens L11 in the in-plane direction perpendicular to the optical axis AX direction, camera-shake correction is made by correcting motion blur on an image formed on the image pickup surface I.

Example 8

Basic features of a zoom lens of an example 8 are as follows:
Zoom ratio: 2.87
Lens entire length: 29.684
d11: 3.895
Lens data of the example 8 is shown in Table 22.

TABLE 22

[Radius of curvature, surface distance and the like]

| Surf. N | R(mm) | D(mm) | Nd | vd | effective radius (mm) |
|---|---|---|---|---|---|
| 1 | 22.852 | 0.400 | 1.92286 | 20.9 | 3.23 |
| 2 | 7.394 | 0.891 | | | 2.94 |

TABLE 22-continued

[Radius of curvature, surface distance and the like]

| 3 | inf. | 5.210 | 2.00069 | 25.5 | 2.84 |
|---|---|---|---|---|---|
| 4 | inf. | 0.456 | | | 2.01 |
| 5 | −5.962 | 0.300 | 1.75500 | 52.3 | 1.97 |
| 6 | 19.112 | 0.936 | 1.92286 | 20.9 | 1.96 |
| 7 | −13.580 | d1 | | | 1.94 |
| 8(stop) | inf. | 0.000 | | | 1.98 |
| 9* | 5.492 | 2.500 | 1.82080 | 42.7 | 2.09 |
| 10 | −23.340 | 1.046 | 1.69895 | 30.1 | 1.99 |
| 11 | 3.125 | 2.170 | 1.55332 | 71.7 | 1.89 |
| 12* | −11.910 | d2 | | | 1.91 |
| 13* | 75.690 | 1.200 | 1.85135 | 40.1 | 2.21 |
| 14* | 17.720 | d3 | | | 2.25 |
| 15 | inf. | 0.500 | 1.51680 | 64.2 | 2.81 |
| 16 | inf. | 0.640 | | | 2.84 |

[Aspherical Coefficient]

Ninth Surface

K = 0.00000E+00, A4 = −0.47938E−03, A6 = −0.13396E−04, A8 = 0.78268E−05, A10 = −0.21285E−05, A12 = 0.20018E−06
Twelfth Surface K = 0.00000E+00, A4 = 0.14036E−02, A6 = 0.22875E−03, A8 = −0.12310E−03, A10 = 0.31666E−04, A12 = −0.29419E−05
Thirteenth Surface K = 0.00000E+00, A4 = −0.38992E−03, A6 = 0.10211E−03, A8 = −0.19904E−04, A10 = 0.35517E−06, A12 = −0.71607E−07
Fourteenth Surface K = 0.00000E+00, A4 = −0.63465E−03, A6 = 0.34545E−03, A8 = −0.10732E−03, A10 = 0.15049E−04, A12 = −0.10340E−05

The focal length (f) of the entire system, F-number (Fno), an angle of view, a diagonal length of the image pickup surface (2Y), and group intervals (d1 to d3) at each of positions (Po) 1 to 3 of the zoom lens in the example 8 are shown in Table 23 below.

TABLE 23

| Po | f | Fno | Angle of View | 2Y |
|---|---|---|---|---|
| 1 | 4.53 | 2.86 | 66.1 | 4.985 |
| 2 | 7.57 | 3.93 | 42.5 | 5.626 |
| 3 | 12.97 | 5.02 | 25.6 | 5.857 |

| Po | d1 | d2 | d3 |
|---|---|---|---|
| 1 | 7.281 | 5.241 | 0.915 |
| 2 | 4.064 | 2.275 | 7.098 |
| 3 | 0.250 | 8.247 | 4.940 |

Data of each of the lens groups of the zoom lens of the example 8 is shown in Table 24 below.

TABLE 24

| Lens Group | First Surface | Focal Length (mm) |
|---|---|---|
| 1 | 1 | −7.24 |
| 2 | 8 | 6.87 |
| 3 | 13 | −27.44 |

Figure 19A:
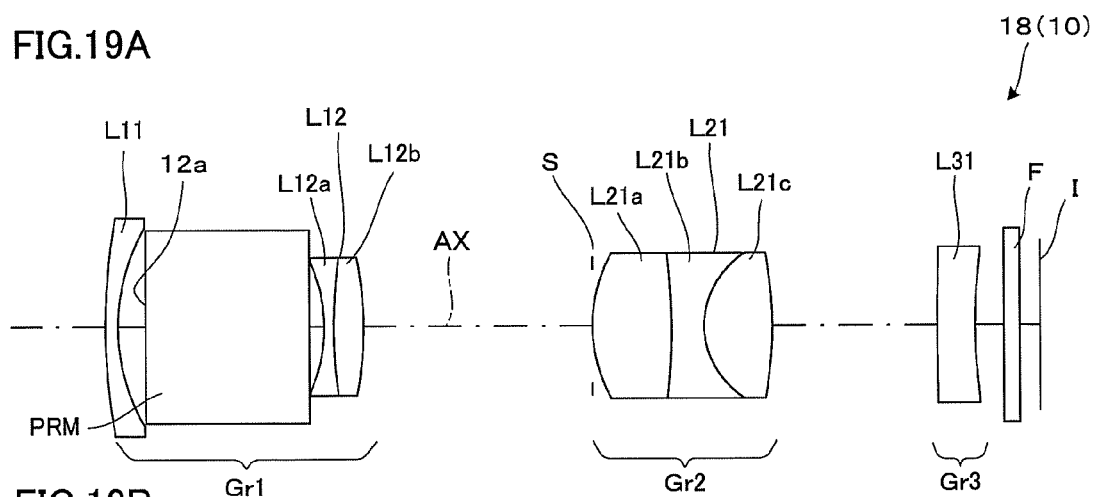
FIG. 19A is a sectional view at the wide-angle end in an example 8.
Figure 19B:
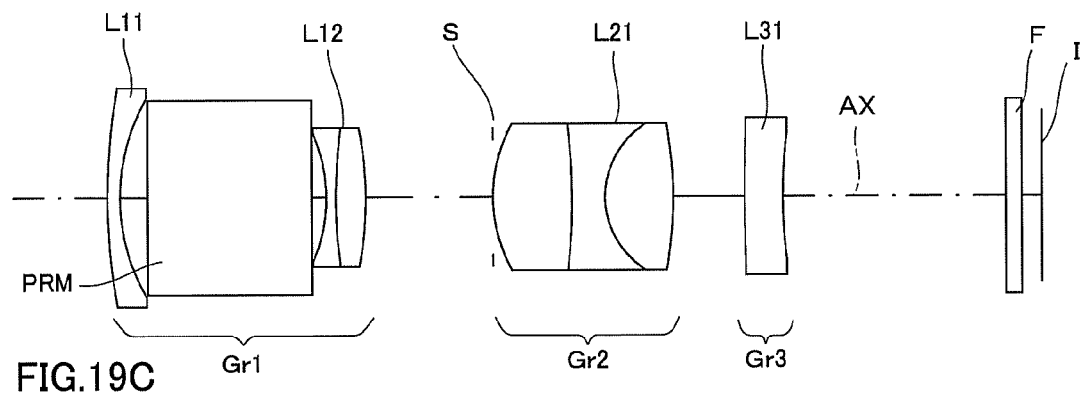
FIG. 19B is a sectional view in the middle.
Figure 19C:
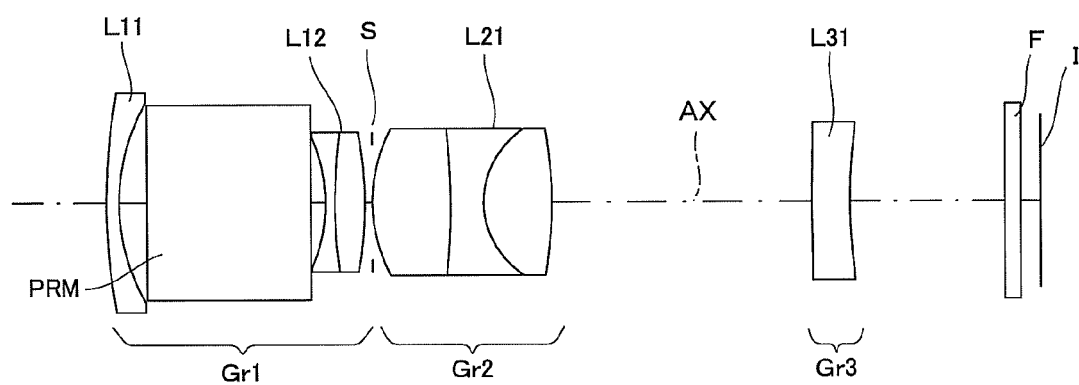
FIG. 19C is a sectional view at the telephoto end.

FIGS. 19A to 19C are sectional views of the zoom lens of the example 8 and illustrate positions of the zoom lens 18 in the example 8 in the zoom operation, respectively. That is, FIG. 19A is a sectional view of the zoom lens 18 at the wide-angle end, FIG. 19B is a sectional view in the middle, and FIG. 19C is a sectional view at the telephoto end.

The zoom lens 18 of the example 8 is composed of the first lens group Gr1, the second lens group Gr2, and the third lens group Gr3 in order from the object side. Here, the first lens group Gr1 includes the convex to the object side and negative meniscus first lens L11, the catoptric element PRM which is a right angle prism substantially not having a refractive power, and the cemented lens L12. Among them, the catoptric element PRM bends a light ray incident to the object side surface 12a which is a flat surface at a right angle. Moreover, the cemented lens L12 is obtained by cementing the biconcave and negative second lens L12a and the biconvex and positive third lens L12b. The second lens group Gr2 includes the aperture stop S and the cemented lens L21. The cemented lens L21 is obtained by cementing the biconvex and positive fourth lens L21a, the biconcave and negative fifth lens L21b, and the biconvex and positive sixth lens L21c. The third lens group Gr3 is composed of the concave to the image side and negative meniscus seventh lens L31. The zoom lens 18 includes the parallel flat plate F which is a filter or the like in addition to them.

Figure 20A:
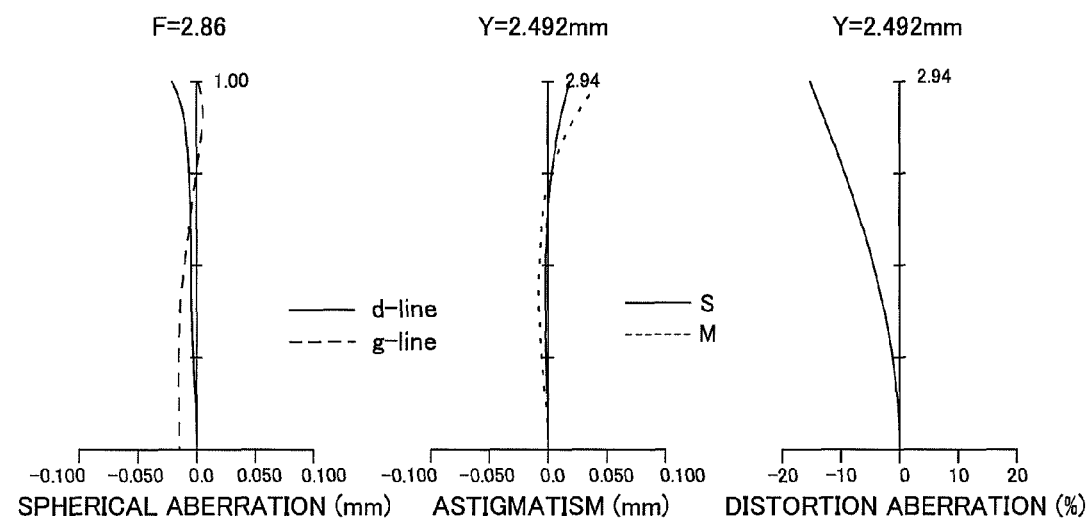
FIG. 20A is an aberration diagram at the wide-angle end in the example 8.
Figure 20B:
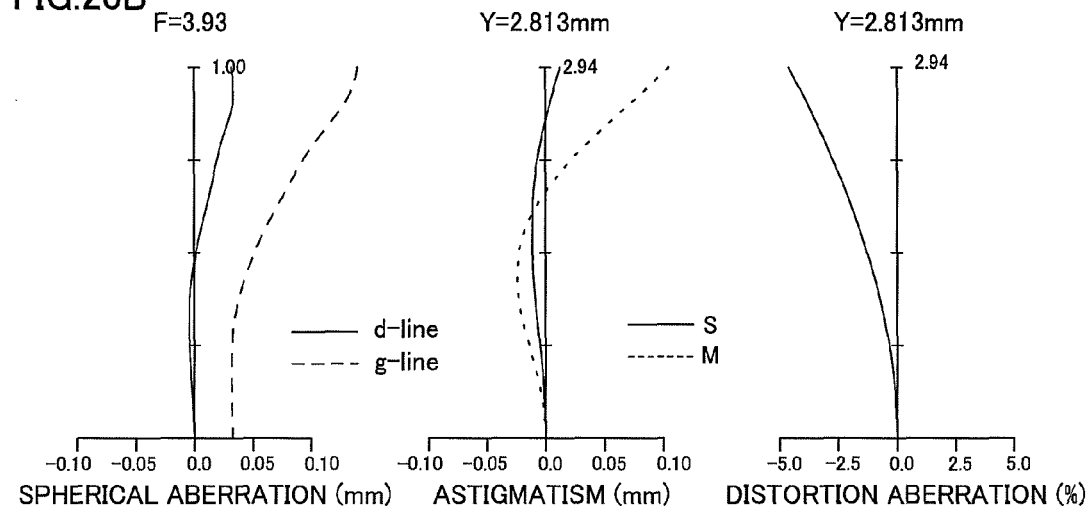
FIG. 20B is an aberration diagram in the middle.
Figure 20C:
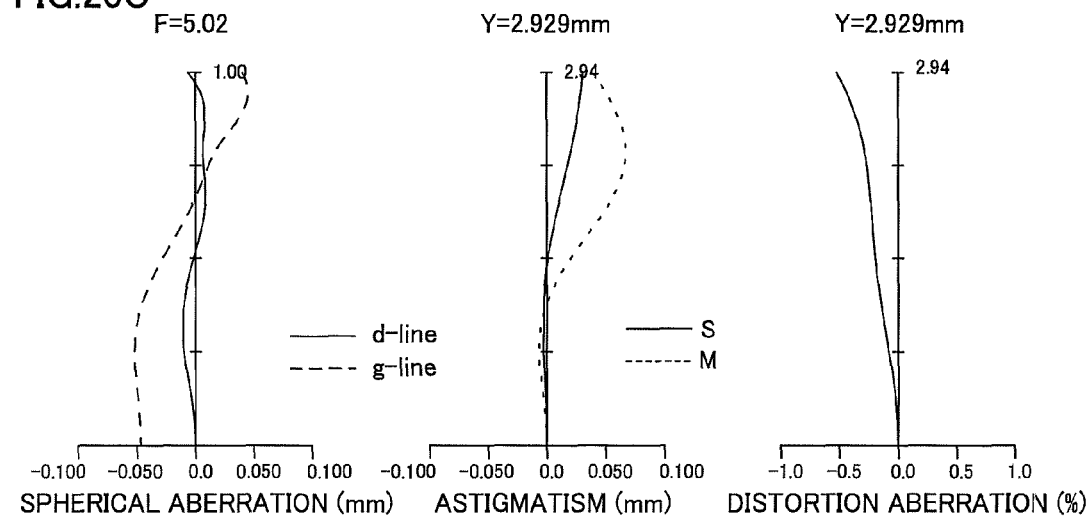
FIG. 20C is an aberration diagram at the telephoto end.

FIG. 20A is an aberration diagram (spherical aberration, astigmatism, and distortion aberration) at the wide-angle end of the zoom lens 18, FIG. 20B is an aberration diagram (spherical aberration, astigmatism, and distortion aberration) in the middle, and FIG. 20C is an aberration diagram (spherical aberration, astigmatism, and distortion aberration) at the telephoto end.

In the zoom lens 18 of the example 8, the second lens group Gr2 moves to the object side along the optical axis AX direction during magnification change from the wide-angle end to the telephoto end and the third lens group Gr3 moves along the optical axis AX direction. The remaining lens group Gr1 is fixed during magnification change, and magnification change can be realized by changing the interval between each of the lens groups Gr1 to Gr3. Moreover, by moving the third lens group Gr3, focusing from infinity to a finite distance can be performed. It is assumed that the fourth lens L21a, the sixth lens L21c, and the seventh lens L31 are glass mold lenses, and the other lenses are polished lenses made of a glass material. In Example 8, by means of movement of the first lens L11 in the in-plane direction perpendicular to the optical axis AX direction, camera-shake correction is made by correcting motion blur on an image formed on the image pickup surface I.

Example 9

Basic features of a zoom lens of an example 9 are as follows:
Zoom ratio: 2.85
Lens entire length: 49.000
d11: 8.471
Lens data of the example 9 is shown in Table 25.

TABLE 25

[Radius of curvature, surface distance and the like]

| Surf. N | R(mm) | D(mm) | Nd | vd | effective radius (mm) |
|---|---|---|---|---|---|
| 1 | 16.586 | 0.792 | 1.92286 | 20.9 | 6.99 |
| 2 | 10.300 | 2.508 | | | 6.23 |
| 3 | inf. | 10.342 | 2.00100 | 29.1 | 6.07 |
| 4 | inf. | 0.213 | | | 4.15 |
| 5* | −378.623 | 0.500 | 1.58313 | 59.5 | 4.10 |
| 6* | 5.497 | 1.235 | | | 3.71 |
| 7 | 9.695 | 1.316 | 1.92286 | 20.9 | 3.73 |
| 8 | 24.398 | d1 | | | 3.58 |
| 9(stop) | inf. | 0.000 | | | 2.72 |
| 10* | 6.968 | 2.000 | 1.92286 | 20.9 | 2.88 |
| 11 | 5.195 | 3.676 | 1.72916 | 54.7 | 2.68 |

TABLE 25-continued

[Radius of curvature, surface distance and the like]

| 12 | −9.874 | 1.500 | 1.82115 | 24.1 | 2.58 |
|---|---|---|---|---|---|
| 13* | 149.401 | d2 | | | 2.54 |
| 14* | −21.920 | 3.900 | 1.49710 | 81.6 | 2.85 |
| 15* | −4.875 | d3 | | | 3.40 |
| 16 | −8.420 | 1.079 | 1.48749 | 70.4 | 2.98 |
| 17 | −50.959 | 0.200 | | | 2.98 |
| 18 | inf. | 0.500 | 1.51680 | 64.2 | 2.97 |
| 19 | inf. | 0.640 | | | 2.97 |

[Aspherical Coefficient]

Fifth Surface

K = 0.00000E+00, A4 = −0.60249E−03, A6 = 0.32973E−04,
A8 = −0.64690E−06, A10 = 0.55828E−09
Sixth Surface K = 0.00000E+00, A4 = −0.12216E−02, A6 = 0.16619E−04,
A8 = −0.39413E−07, A10 = −0.41273E−07
Tenth Surface K = 0.00000E+00, A4 = 0.57857E−05, A6 = −0.11307E−05,
A8 = 0.30011E−06, A10 = −0.13429E−07
Thirteenth Surface K = 0.00000E+00, A4 = 0.85839E−03, A6 = 0.12342E−04,
A8 = 0.36096E−05, A10 = −0.14433E−06
Fourteenth Surface K = 0.00000E+00, A4 = −0.21128E−02, A6 = −0.11389E−03,
A8 = 0.79878E−05, A10 = −0.10004E−05
Fifteenth Surface K = 0.00000E+00, A4 = 0.19970E−03, A6 = −0.22548E−04,
A8 = 0.19615E−05, A10 = −0.72686E−07

The focal length (f) of the entire system, F-number (Fno), an angle of view, a diagonal length of the image pickup surface (2Y), and group intervals (d1 to d3) at each of positions (Po) 1 to 3 of the zoom lens in the example 9 are shown in Table 26 below.

TABLE 26

| Po | f | Fno | Angle of View | 2Y |
|---|---|---|---|---|
| 1 | 4.76 | 2.23 | 66.0 | 5.888 |
| 2 | 7.91 | 3.21 | 40.7 | 5.888 |
| 3 | 13.58 | 4.30 | 23.9 | 5.888 |

| Po | d1 | d2 | d3 |
|---|---|---|---|
| 1 | 12.935 | 2.115 | 3.549 |
| 2 | 8.811 | 8.331 | 1.457 |
| 3 | 2.942 | 14.343 | 1.315 |

Data of each of the lens groups of the zoom lens of the example 9 is shown in Table 27 below.

TABLE 27

| Lens Group | First Surface | Focal Length (mm) |
|---|---|---|
| 1 | 1 | −12.02 |
| 2 | 9 | 10.98 |
| 3 | 14 | 11.72 |
| 4 | 16 | −20.86 |

Figure 21A:
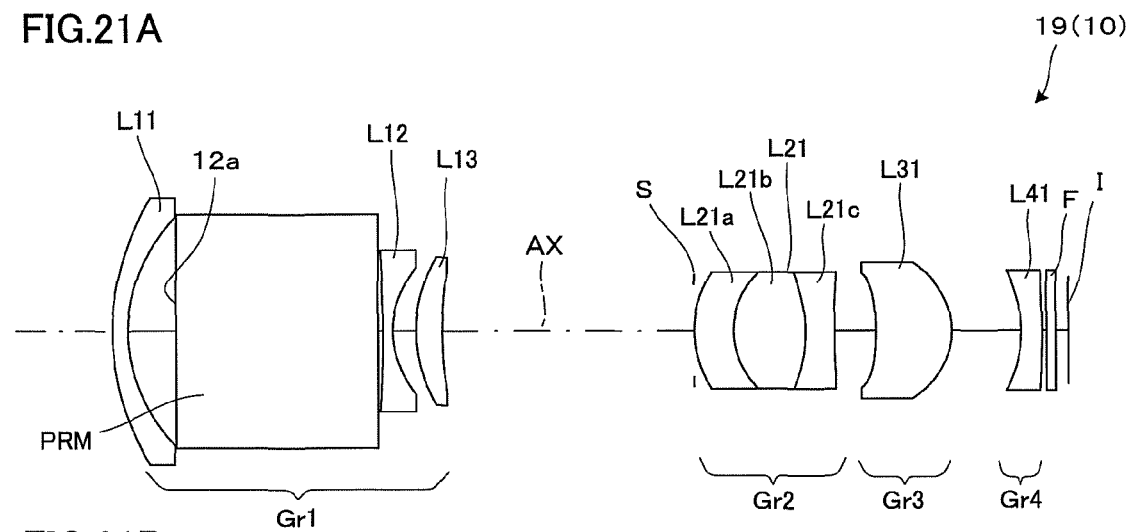
FIG. 21A is a sectional view at the wide-angle end in an example 9.
Figure 21B:
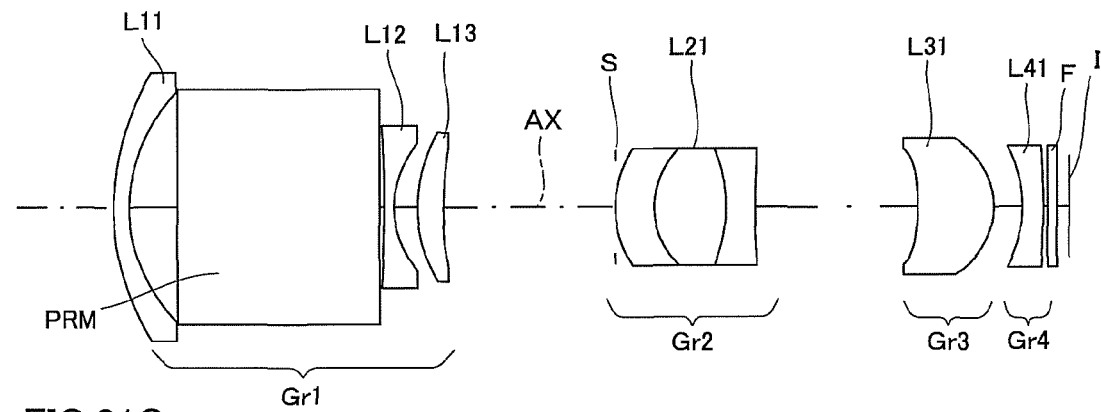
FIG. 21B is a sectional view in the middle.
Figure 21C:
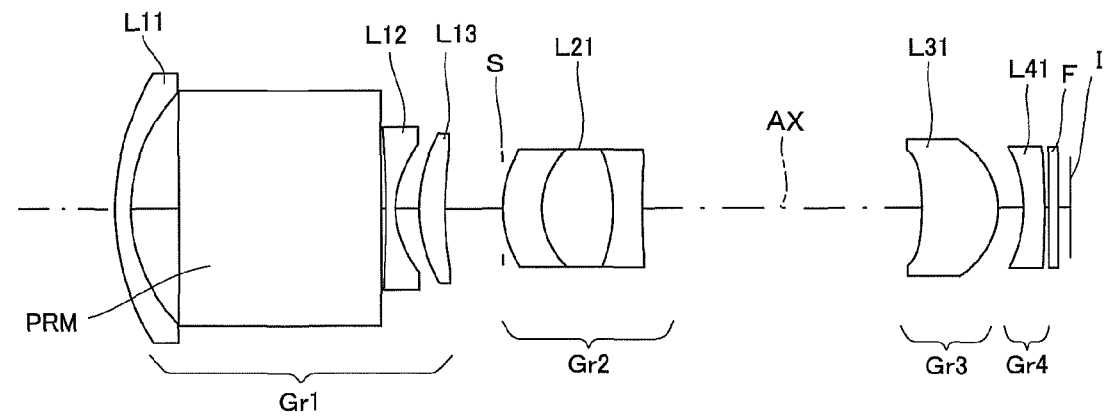
FIG. 21C is a sectional view at the telephoto end.

FIGS. 21A to 21C are sectional views of the zoom lens of the example 9 and illustrate positions of the zoom lens 19 in the example 9 in the zoom operation, respectively. That is, FIG. 21A is a sectional view of the zoom lens 19 at the wide-angle end, FIG. 21B is a sectional view in the middle, and FIG. 21C is a sectional view at the telephoto end.

The zoom lens 19 of the example 9 is composed of the first lens group Gr1, the second lens group Gr2, the third lens group Gr3, and the fourth lens group Gr4 in order from the object side. Here, the first lens group Gr1 includes the convex to the object side and negative meniscus first lens L11, the catoptric element PRM which is a right angle prism substantially not having a refractive power, the substantially plano-concave negative second lens L12 with the concave surface faced with the image side, and the convex to the object side and positive meniscus third lens L13. Among them, the catoptric element PRM bends a light ray incident to the object side surface 12a which is a flat surface at a right angle. The second lens group Gr2 includes the aperture stop S and the cemented lens L21. The cemented lens L21 is obtained by cementing the convex to the object side and negative meniscus fourth lens L21a, the biconvex and positive fifth lens L21b, and the substantially plano-concave and negative sixth lens L21c with the concave surface faced with the object side. The third lens group Gr3 is composed of the convex to the image side and positive meniscus seventh lens L31, and the fourth lens group Gr4 is composed of the convex to the image side and negative meniscus eighth lens L41. The zoom lens 19 includes the parallel flat plate F which is a filter or the like in addition to them.

Figure 22A:
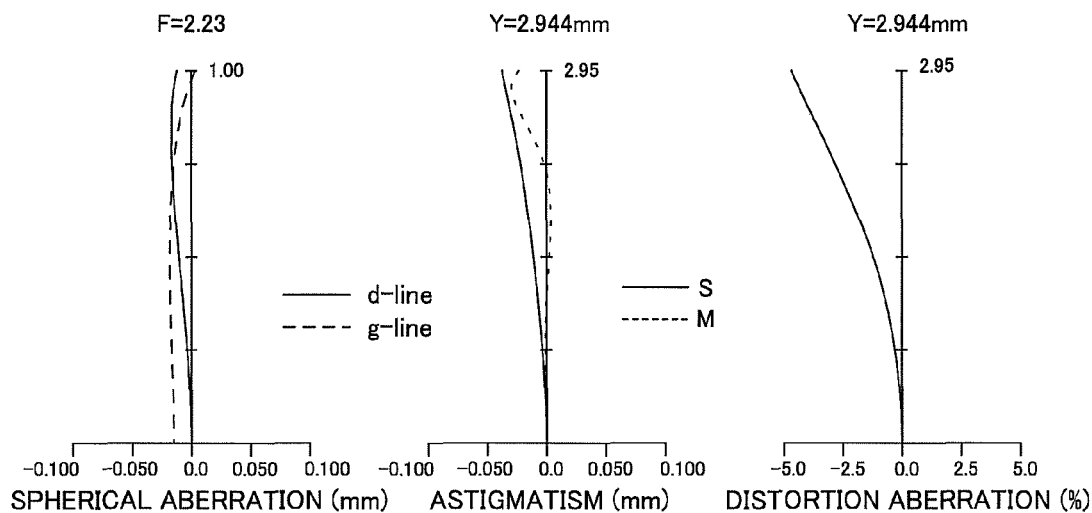
FIG. 22A, is an aberration diagram at the wide-angle end in the example 9.
Figure 22B:
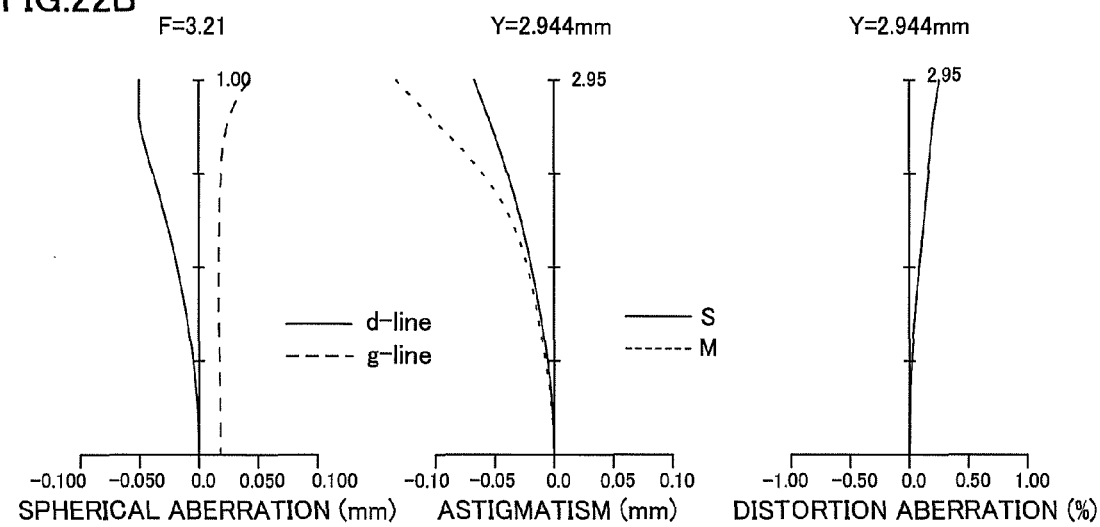
FIG. 22B is an aberration diagram in the middle.
Figure 22C:
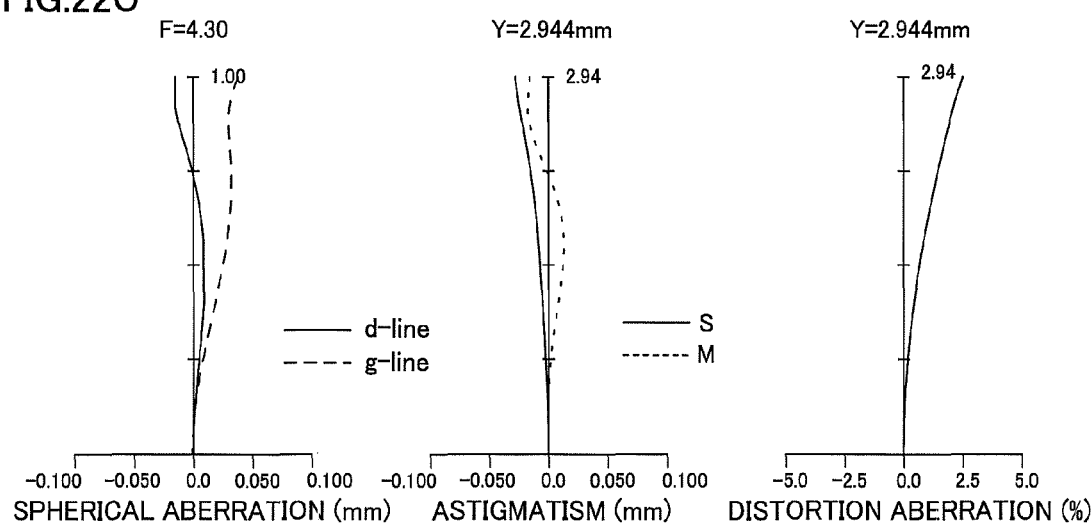
FIG. 22C is an aberration diagram at the telephoto end.

FIG. 22A is an aberration diagram (spherical aberration, astigmatism, and distortion aberration) at the wide-angle end of the zoom lens 19, FIG. 22B is an aberration diagram (spherical aberration, astigmatism, and distortion aberration) in the middle, and FIG. 22C is an aberration diagram (spherical aberration, astigmatism, and distortion aberration) at the telephoto end.

In the zoom lens 19 of the example 9, the second lens group Gr2 moves to the object side along the optical axis AX direction during magnification change from the wide-angle end to the telephoto end and the third lens group Gr3 moves along the optical axis AX direction. The other lens groups Gr1 and Gr4 are fixed during magnification change, and magnification change can be realized by changing the interval between each of the lens groups Gr1 to Gr4. Moreover, by moving the third lens group Gr3, focusing from infinity to a finite distance can be performed. It is assumed that the fourth lens L21a, the sixth lens L21c, and the seventh lens L31 are glass mold lenses, and the other lenses are polished lenses made of a glass material. In Example 9, by means of movement of the first lens L11 in the in-plane direction perpendicular to the optical axis AX direction, camera-shake correction is made by correcting motion blur on an image formed on the image pickup surface I.

Example 10

Basic features of a zoom lens of an example 10 are as follows:
Zoom ratio: 2.85
Lens entire length: 46.790
d11: 4.779
Lens data of the example 10 is shown in Table 28.

TABLE 28

[Radius of curvature, surface distance and the like]

| Surf. N | R(mm) | D(mm) | Nd | vd | effective radius (mm) |
|---|---|---|---|---|---|
| 1* | −27.971 | 0.500 | 1.55332 | 71.7 | 4.84 |
| 2* | 29.881 | 0.573 | | | 4.43 |

TABLE 28-continued

[Radius of curvature, surface distance and the like]

| 3 | inf. | 7.413 | 2.00100 | 29.1 | 4.38 |
|---|---|---|---|---|---|
| 4 | inf. | 0.743 | | | 2.90 |
| 5 | −8.405 | 1.072 | 1.88300 | 40.8 | 2.78 |
| 6 | 12.070 | 1.489 | 1.84666 | 23.8 | 2.73 |
| 7 | −20.390 | d1 | | | 2.70 |
| 8(stop) | inf. | 0.303 | | | 2.26 |
| 9* | 7.301 | 2.579 | 1.82115 | 24.1 | 2.38 |
| 10 | 4.991 | 1.899 | 1.80420 | 46.5 | 2.19 |
| 11 | −14.591 | 0.623 | 1.82115 | 24.1 | 2.11 |
| 12* | 21.384 | d2 | | | 2.05 |
| 13 | 13.671 | 1.391 | 1.49700 | 81.6 | 3.58 |
| 14 | −107.269 | d3 | | | 3.59 |
| 15* | 13.208 | 3.215 | 1.88202 | 37.2 | 3.60 |
| 16 | −9.889 | 0.300 | | | 3.33 |
| 17 | −7.192 | 0.500 | 1.59270 | 35.5 | 3.24 |
| 18 | 13.326 | 0.583 | | | 3.02 |
| 19 | inf. | 0.500 | 1.51680 | 64.2 | 3.00 |
| 20 | inf. | 0.640 | | | 2.97 |

[Aspherical Coefficient]

First Surface

K = 0.00000E+00, A4 = 0.39097E−03, A6 = 0.58999E−05, A8 = −0.20518E−06, A10 = 0.78773E−09
Second Surface K = 0.00000E+00, A4 = 0.27630E−03, A6 = 0.16378E−05, A8 = 0.29846E−06, A10 = −0.13811E−07
Ninth Surface K = 0.00000E+00, A4 = 0.18114E−03, A6 = −0.14763E−05, A8 = 0.87917E−06, A10 = −0.50916E−07
Twelfth Surface K = 0.00000E+00, A4 = 0.11730E−02, A6 = 0.85417E−05, A8 = 0.50405E−05, A10 = −0.28922E−06
Fifteenth Surface K = 0.00000E+00, A4 = 0.10601E−05, A6 = 0.12129E−04, A8 = −0.99816E−06, A10 = 0.54884E−07

The focal length (f) of the entire system, F-number (Fno), an angle of view, a diagonal length of image pickup surface (2Y), and group intervals (d1 to d3) at each of positions (Po) 1 to 3 of the zoom lens in the example 10 are shown in Table 29 below.

TABLE 29

| Po | f | Fno | Angle of View | 2Y |
|---|---|---|---|---|
| 1 | 4.76 | 2.88 | 63.4 | 5.006 |
| 2 | 7.94 | 3.52 | 40.7 | 5.501 |
| 3 | 13.58 | 4.42 | 24.5 | 5.810 |

| Po | d1 | d2 | d3 |
|---|---|---|---|
| 1 | 11.923 | 8.496 | 2.050 |
| 2 | 5.217 | 10.566 | 6.686 |
| 3 | 0.300 | 4.416 | 17.753 |

Data of each of the lens groups of the zoom lens of the example 10 is shown in Table 30 below.

TABLE 30

| Lens Group | First Surface | Focal Length (mm) |
|---|---|---|
| 1 | 1 | −9.18 |
| 2 | 8 | 12.14 |
| 3 | 13 | 24.49 |
| 4 | 15 | 25.00 |

Figure 23A:
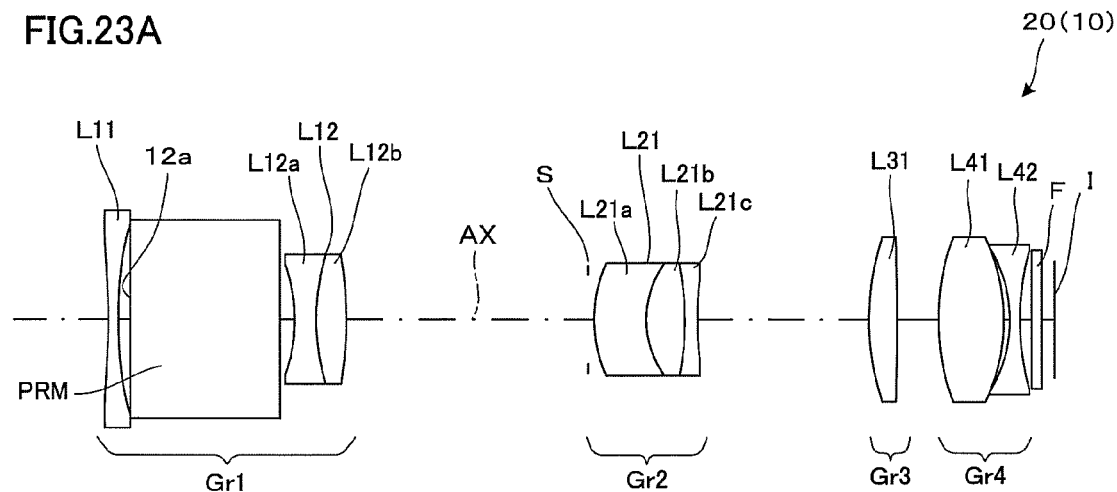
FIG. 23A is a sectional view at the wide-angle end in an example 10.
Figure 23B:
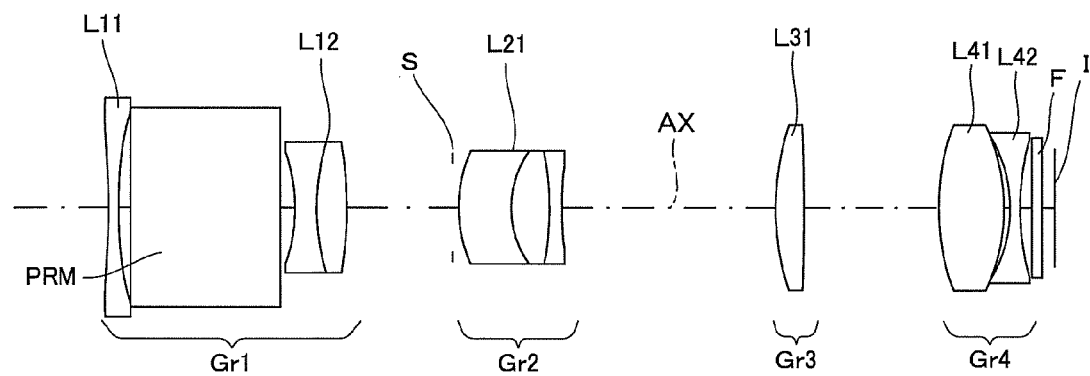
FIG. 23B is a sectional view in the middle.
Figure 23C:
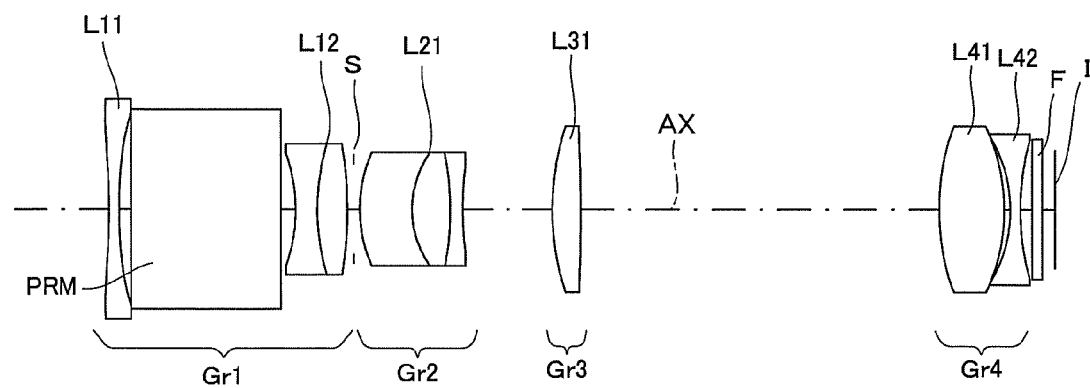
FIG. 23C is a sectional view at the telephoto end.

FIGS. 23A to 23C are sectional views of the zoom lens of the example 10 and illustrate positions of the zoom lens 20 in the example 10 in the zoom operation, respectively. That is, FIG. 23A is a sectional view of the zoom lens 20 at the wide-angle end, FIG. 23B is a sectional view in the middle, and FIG. 23C is a sectional view at the telephoto end.

The zoom lens 20 of the example 10 is composed of the first lens group Gr1, the second lens group Gr2, the third lens group Gr3, and the fourth lens group Gr4 in order from the object side. Here, the first lens group Gr1 includes the biconcave and negative first lens L11, the catoptric element PRM which is a right angle prism substantially not having a refractive power, and the cemented lens L12. Among them, the catoptric element PRM bends a light ray incident to the object side surface 12a which is a flat surface at a right angle. The cemented lens L12 is obtained by cementing the biconcave and negative second lens L12a and the biconvex and positive third lens L12b. The second lens group Gr2 includes the aperture stop S and the cemented lens L21. The cemented lens L21 is obtained by cementing the convex to the object side and negative meniscus fourth lens L21a, the biconvex and positive fifth lens L21b, and the biconcave and negative sixth lens L21c. The third lens group Gr3 is composed of the substantially plano-convex and positive seventh lens L31 with the convex surface faced with the object side, and the fourth lens group Gr4 is composed of the biconvex and positive eighth lens L41 and a biconcave and negative ninth lens L42. The zoom lens 20 includes the parallel flat plate F which is a filter or the like in addition to them.

Figure 24A:
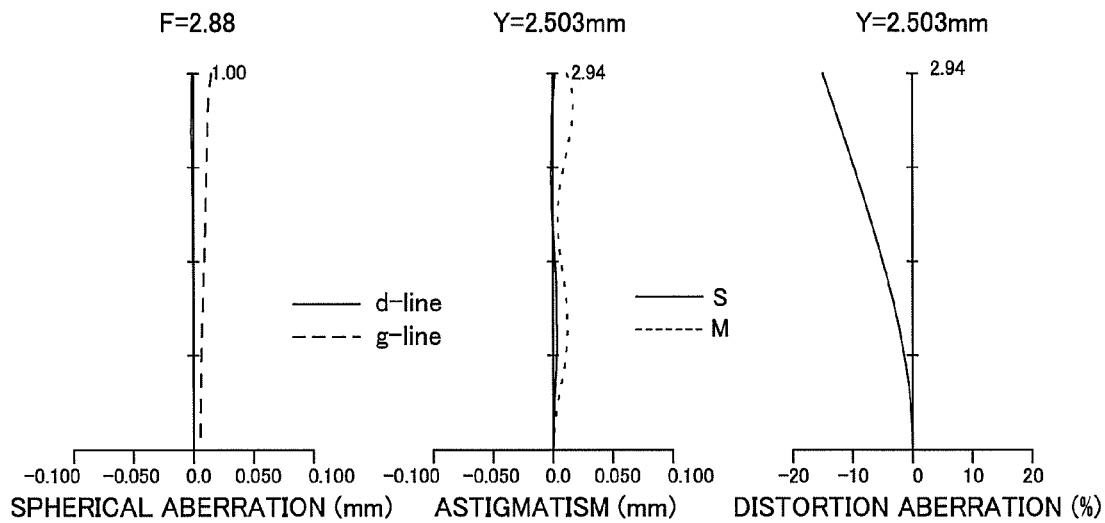
FIG. 24A is an aberration diagram at the wide-angle end in the example 10.
Figure 24B:
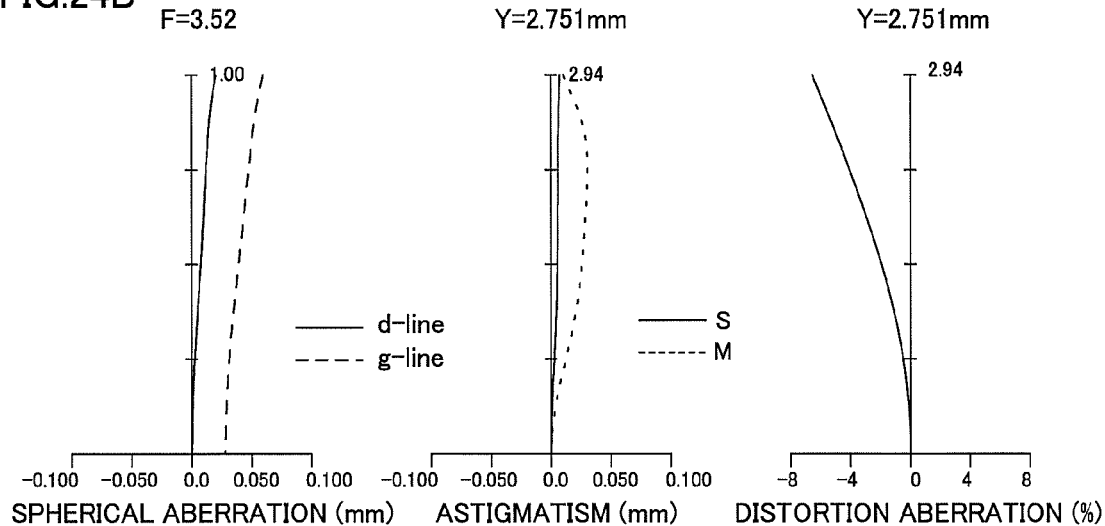
FIG. 24B is an aberration diagram in the middle.
Figure 24C:
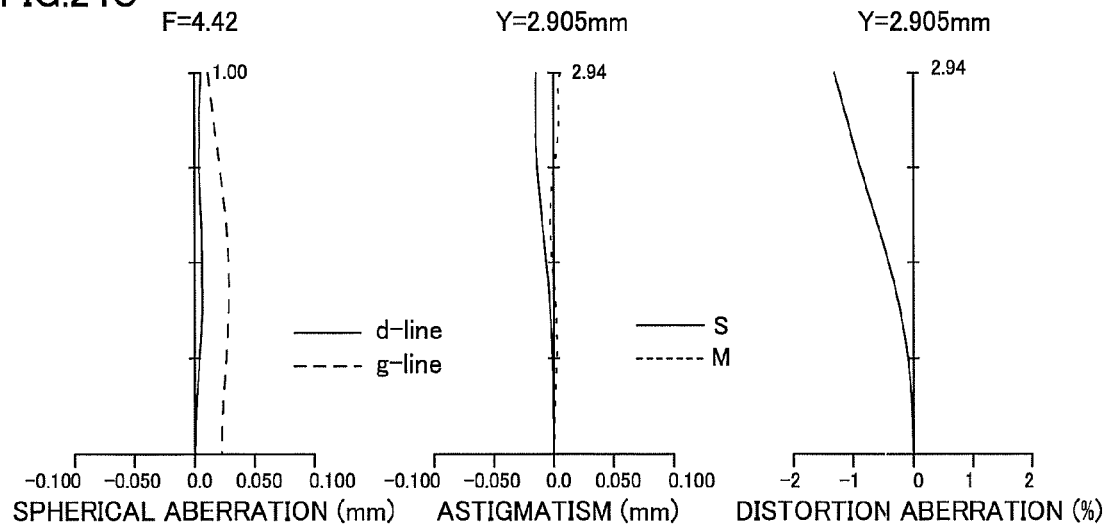
FIG. 24C is an aberration diagram at the telephoto end.

FIG. 24A is an aberration diagram (spherical aberration, astigmatism, and distortion aberration) at the wide-angle end of the zoom lens 20, FIG. 24B is an aberration diagram (spherical aberration, astigmatism, and distortion aberration) in the middle, and FIG. 24C is an aberration diagram (spherical aberration, astigmatism, and distortion aberration) at the telephoto end.

In the zoom lens 20 of the example 10, the second lens group Gr2 moves to the object side along the optical axis AX direction during magnification change from the wide-angle end to the telephoto end and the third lens group Gr3 moves along the optical axis AX direction. The other lens groups Gr1 and Gr4 are fixed during magnification change, and magnification change can be realized by changing the interval between each of the lens groups Gr1 to Gr4. Moreover, by moving the third lens group Gr3, focusing from infinity to a finite distance can be performed. It is assumed that the fourth lens L21a, the sixth lens L21c, and the seventh lens L31 are glass mold lenses, and the other lenses are polished lenses made of a glass material. In Example 10, by means of movement of the first lens L11 in the in-plane direction perpendicular to the optical axis AX direction, camera-shake correction is made by correcting motion blur on an image formed on the image pickup surface I.

The following Table 31 collects values of each of the examples 1 to 10 corresponding to each of the conditional expressions (1) to (8) for reference.

TABLE 31

| | Conditional Expression | | | | | | | |
|---|---|---|---|---|---|---|---|---|
| | (1) $n21$ | (2) $d2g/fW$ | (3) $n2p1 - n2n$ | (4) $v2p2 - v2n$ | (5) $d11/fW$ | (6) $nprm$ | (7) $v1n - v1p$ | (8) $v3$ |
| Example 1 | 1.851 | 1.125 | 0.152 | 37.0 | 0.738 | 2.001 | 19.9 | 56.2 |

TABLE 31-continued

| | Conditional Expression | | | | | | | |
|---|---|---|---|---|---|---|---|---|
| | (1) $n21$ | (2) $d2g/fW$ | (3) $n2p1 - n2n$ | (4) $v2p2 - v2n$ | (5) $d11/fW$ | (6) $nprm$ | (7) $v1n - v1p$ | (8) $v3$ |
| Example 2 | 1.851 | 0.832 | 0.152 | 33.8 | 0.514 | 2.001 | 21.8 | 56.2 |
| Example 3 | 1.821 | 1.127 | 0.122 | 37.0 | 0.880 | 2.001 | 45.4 | 56.2 |
| Example 4 | 1.851 | 1.104 | 0.152 | 41.6 | 0.475 | 1.635 | 19.9 | 56.2 |
| Example 5 | 1.851 | 0.768 | 0.152 | 41.6 | 0.529 | 2.001 | 19.3 | 56.2 |
| Example 6 | 1.882 | 0.802 | 0.183 | 41.6 | 0.526 | 2.001 | 33.8 | 56.2 |
| Example 7 | 1.592 | 1.516 | −0.319 | 46.3 | 1.326 | 1.847 | 4.0 | — |
| Example 8 | 1.821 | 1.263 | 0.122 | 41.6 | 0.861 | 2.001 | 31.4 | — |
| Example 9 | 1.923 | 1.508 | — | — | 1.780 | 2.001 | 38.6 | 81.6 |
| Example 10 | 1.821 | 1.071 | — | — | 1.003 | 2.001 | 17.0 | 81.6 |

In the above Table 31, the symbol "−" relating to the conditional expressions (3) and (4) means that the second lens group has a configuration other than positive-negative-positive, and the symbol "−" relating to the conditional expression (8) means that the third lens group has a configuration other than a single lens or that a group configuration of the zoom lens is other than negative-positive-negative-positive or negative-positive-positive.

In the above, the present invention is explained on the basis of the examples and examples but the present invention is not limited to the above-described examples and the like.

Recently, it was known that a temperature change in a plastic material can be made small by mixing inorganic minute particles in the plastic material. In more detail, if minute particles are mixed in a transparent plastic material, in general, light scattering occurs and transmittance lowers, and thus, it was difficult to be used as an optical material, but by making the size of the minute particle smaller than a wavelength of the transmitted light, scattering can be substantially prevented from occurring. When a temperature rises, refractive index of the plastic material lowers, but the refractive index of the inorganic particles rises with a rise of a temperature. Thus, by causing them to act to cancel each other out by using these temperature dependences, a refractive index change can be substantially prevented from occurring. Specifically, by distributing inorganic particles having a maximum length of 20 nanometers or less in a plastic material which becomes a base, a plastic material with extremely low temperature dependence of the refractive index can be obtained. By distributing the minute particles of niobium oxide ($Nb_2O_5$) in acryl, for example, a refractive index change caused by a temperature change can be made smaller. In the present invention, by using the plastic material in which such inorganic particles are distributed for a plastic lens such as the seventh and eighth lenses L31 and L41 of Example 1, for example, fluctuation in an image point position in a temperature change of the entire zoom lens system can be kept lower.

Recently, as a method of mounting an image pickup device with a low cost and in a large quantity, a technology of applying reflow processing (heating processing) to a substrate on which solder is potted in advance in a state where an IC chip and other electronic components and the optical element on the substrate are placed and of simultaneously mounting the electronic components and the optical element by melting the solder is proposed. For mounting by using such reflow processing, the optical element needs to be heated with the electronic components to approximately 200 to 260° C., but under such a high temperature, a lens using a thermoplastic resin is thermally deformed or discolored, and there is a problem that its optical performance lowers. As one of methods for solving such a problem, a technology of using a glass mold lens excellent in a heat resistance performance and of realizing both size reduction and the optical performance under a high-temperature environment is proposed, but its cost is generally higher than a lens using a thermoplastic resin. Thus, by using an energy curing resin for a material of the zoom lens (specifically, the seventh and eighth lenses L31 and L41 in example 1, for example), a drop of the optical performance when being exposed to a high temperature is smaller than that of the lens using a thermoplastic resin such as a polycarbonate, polyolefin and the like, and thus, it is effective for the reflow processing, and is easier to be manufactured than the glass mold lens and inexpensive, and both a lower cost and mass productivity of the image pickup device incorporating the zoom lens can be realized. The energy curing resin is assumed to refer to both of a thermosetting resin and an ultraviolet curing resin.

It is obvious for those skilled in the art of this field that the present invention is not limited to the examples described in Specification but includes other examples and variations from the examples and idea described in this Specification. For example, addition of a dummy lens and any other optical element substantially not having a power is also within an application scope of the present invention.

The invention claimed is:

1. A zoom lens comprising at least a first lens group having a negative refractive power and a second lens group having a positive refractive power in order from an object side and performing magnification change by changing an interval between each of the lens groups, wherein an interval between the first lens group and the second lens group is reduced by magnification change from a wide-angle end to a telephoto end;

wherein the first lens group includes a catoptric element having a function of bending an optical path by reflecting a light ray;

wherein the second lens group includes a cemented lens obtained by cementing three lenses, and a lens having a positive refractive power, a lens having a negative refractive power, and a lens having a positive refractive power in order from the object side; and wherein the following conditions are satisfied:

$$1.59 < n21 < 2.20 \quad (1)$$

$$0.1 < n2p1 - n2n < 0.3 \quad (3)$$

where n21 is a refractive index of a lens on a side closest to an object in the second lens group, n2p1 is a refractive index of the lens having the positive refractive power on the object side in the second lens group, and n2n is a refractive index of the lens having the negative refractive power in the second lens group.

2. The zoom lens according to claim 1, wherein the following condition is satisfied:

$$0.6 < d2g/fW < 1.6 \quad (2)$$

where d2g is an axial thickness of a cemented lens of the second lens group, and fW is a focal length of an entire system at the wide-angle end.

3. The zoom lens according to claim 1, wherein the second lens group has an aperture stop on a side closest to the object.

4. The zoom lens according to claim 1, wherein the following condition is satisfied:

$$25 < v2p2 - v2n < 50 \quad (4)$$

where v2p2 is an Abbe number of the lens having the positive refractive power on an image side in the second lens group, and v2n is an Abbe number of the lens having the negative refractive power in the second lens group.

5. The zoom lens according to claim 1, wherein a negative lens having a negative refractive power on the object side of the catoptric element is provided and the negative lens is moved in a direction perpendicular to an optical axis so as to correct motion blur of image formation on an image plane.

6. The zoom lens according to claim 1, wherein the following condition is satisfied:

$$0.45 < d11/fW < 1.10 \quad (5)$$

where d11 is a distance from a vertex of a surface on a side closest to an object in the first lens group to an intersection between a reflective surface of the catoptric element and the optical axis, and fW is a focal length of the entire system at the wide-angle end.

7. The zoom lens according to claim 1, wherein the following condition is satisfied:

$$1.60 < nprm < 2.20 \quad (6)$$

where nprm is a refractive index of the catoptric element.

8. The zoom lens according to claim 1, wherein the first lens group has a cemented lens including a lens having a negative refractive power and a lens having a positive refractive power on an image side of the catoptric element.

9. The zoom lens according to claim 8, wherein the following condition is satisfied:

$$15 < v1n - v1p < 65 \quad (7)$$

where v1n is an Abbe number of the lens having the negative refractive power in the cemented lens of the first lens group, and v1p is an Abbe number of the lens having the positive refractive power in the cemented lens of the first lens group.

10. The zoom lens according to claim 1, wherein the zoom lens includes the first lens group having a negative refractive power, the second lens group having a positive refractive power, a third lens group having a negative refractive power, and a fourth lens group having a positive refractive power in order from the object side.

11. The zoom lens according to claim 1, wherein the zoom lens has at least the first lens group having a negative refractive power, the second lens group having a positive refractive power, and a third lens group having a positive refractive power in order from the object side.

12. The zoom lens according to claim 10, wherein the zoom lens performs focusing by moving the third lens group.

13. The zoom lens according to claim 11, wherein the zoom lens performs focusing by moving the third lens group.

14. The zoom lens according to claim 10, wherein the third lens group is a single lens.

15. The zoom lens according to claim 11, wherein the third lens group is a single lens.

16. A zoom lens comprising at least a first lens group having a negative refractive power and a second lens group having a positive refractive power in order from an object side and performing magnification change by changing an interval between each of the lens groups,
- wherein an interval between the first lens group and the second lens group is reduced by magnification change from a wide-angle end to a telephoto end;
- wherein the first lens group includes a catoptric element having a function of bending an optical path by reflecting a light ray;
- wherein the second lens group includes a cemented lens obtained by cementing three lenses;
- wherein the zoom lens includes the first lens group having a negative refractive power, the second lens group having a positive refractive power, a third lens group having a negative refractive power, and a fourth lens group having a positive refractive power in order from the object side; and
- wherein the third lens group is a single lens, and
- wherein the following condition is satisfied:

$$1.59 < n21 < 2.20 \quad (1)$$

where n21 is a refractive index of a lens on a side closest to an object in the second lens group,
- wherein the single lens of the third lens group satisfies the following condition:

$$50 < v3 < 95 \quad (8)$$

where $v3$ is an Abbe number of the single lens of the third lens group.

17. The zoom lens according to claim 10, wherein the third lens group is made of plastic and has at least one aspherical surface.

18. The zoom lens according to claim 11, wherein the third lens group is made of plastic and has at least one aspherical surface.

19. The zoom lens according to claim 10, wherein the fourth lens group does not move in an optical axis direction both during magnification change and in focusing.

20. The zoom lens according to claim 10, wherein the fourth lens group is a single lens made of plastic and has at least one aspherical surface.

21. The zoom lens according to claim 11, wherein the fourth lens group is a single lens made of plastic and has at least one aspherical surface.

22. The zoom lens according to claim 1, further comprising an optical element having substantially no power.

23. An image pickup device comprising a zoom lens according to claim 1 and an image pickup element for photoelectrically converting an image formed on an image pickup surface by the zoom lens.

* * * * *